(12) United States Patent
Hancock et al.

(10) Patent No.: US 7,275,548 B2
(45) Date of Patent: Oct. 2, 2007

(54) EQUIPMENT FOR MANUFACTURING CIGARETTES

(75) Inventors: Lloyd Harmon Hancock, Walnut Cove, NC (US); Vernon Brent Barnes, Advance, NC (US); Carl Carlton Greene, Jr., Winston-Salem, NC (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 718 days.

(21) Appl. No.: 10/645,996

(22) Filed: Aug. 22, 2003

(65) Prior Publication Data

US 2004/0129281 A1    Jul. 8, 2004

Related U.S. Application Data

(63) Continuation-in-part of application No. 10/439,935, filed on May 16, 2003, and a continuation-in-part of application No. 10/326,539, filed on Dec. 20, 2002, now Pat. No. 7,073,514, and a continuation-in-part of application No. 09/892,834, filed on Jun. 27, 2001, now Pat. No. 6,854,469.

(51) Int. Cl.
*A24C 1/34* (2006.01)
*A24C 5/32* (2006.01)

(52) U.S. Cl. .................... 131/35; 131/67; 131/68; 131/69

(58) Field of Classification Search ............. 131/35, 131/37, 67, 68–69, 84.1; 118/212, 216, 217, 118/224
See application file for complete search history.

(56) References Cited

U.S. PATENT DOCUMENTS 48,936 A    7/1865  Hazman et al.
1,581,451 A 4/1926  Knapp
1,999,222 A 4/1935  Weinberger (Continued)

FOREIGN PATENT DOCUMENTS

EP    0546576 B1    3/1996

(Continued)

OTHER PUBLICATIONS

Hauni Protos/VE 80 Operating Manual, No. 385, B2282e, pp. 3/10-3/11, in existence at least as of Dec. 20, 2002.

(Continued)

*Primary Examiner*—Carlos Lopez
(74) *Attorney, Agent, or Firm*—Kilpatrick Stockton LLP

(57) ABSTRACT

Cigarettes manufactured using modified automated cigarette making apparatus can possess smokable rods having additive materials applied to paper wrapping materials as patterns. The additive materials can be applied to a continuous paper web using rollers.) One of those rollers can have a series of pockets in its roll face to receive additive formulation from a reservoir and to define the pattern of the formulation on the paper. The additive material in the recessed pockets of a first roller can be transferred in a controlled manner to a second roller and from the second roller to desired locations on the paper web. The additive material can also be applied to a transfer roller, transferred from the transfer roller to pick-up roller, transferred from the pick-up roller to an application roller, and transferred to the paper web that passes between the application roller and a back-up roller.

21 Claims, 26 Drawing Sheets

U.S. PATENT DOCUMENTS

| | | |
|---|---|---|
| 1,999,223 A | 4/1935 | Weinberger |
| 1,999,224 A | 4/1935 | Miles |
| 2,013,508 A | 9/1935 | Seaman |
| 2,049,320 A | 7/1936 | Ruben et al. |
| 2,149,896 A | 3/1939 | McArdle et al. |
| 2,307,088 A | 1/1943 | Whiteley |
| 2,335,432 A | 11/1943 | Millett |
| 2,512,414 A | 6/1950 | Booth |
| 2,666,437 A | 1/1954 | Lattof |
| 2,718,869 A | 9/1955 | Claussen |
| 2,876,160 A | 3/1959 | Schoch et al. |
| 2,998,012 A | 8/1961 | Lamm |
| 3,030,963 A | 4/1962 | Cohn |
| 3,165,105 A | 1/1965 | Campbell |
| 3,288,147 A | 11/1966 | Molins et al. |
| 3,370,593 A | 2/1968 | Owaki |
| 3,409,021 A | 11/1968 | Owaki |
| 3,422,819 A | 1/1969 | Jones et al. |
| 3,477,440 A | 11/1969 | Licis |
| 3,632,384 A | 1/1972 | Saint-Pastou |
| 3,633,589 A | 1/1972 | Kahane et al. |
| 3,693,313 A | 9/1972 | Sexstone |
| 3,773,055 A | 11/1973 | Stungis et al. |
| 3,844,199 A | 10/1974 | Block et al. |
| 3,890,980 A | 6/1975 | Geldmacher |
| 3,903,899 A | 9/1975 | Musillo |
| 3,915,176 A | 10/1975 | Heitmann et al. |
| 3,987,804 A | 10/1976 | Molins et al. |
| 3,999,559 A | 12/1976 | Marritt et al. |
| 4,061,147 A | 12/1977 | Falchi |
| 4,077,414 A | 3/1978 | Baker et al. |
| 4,169,278 A | 9/1979 | Roehlich et al. |
| 4,174,720 A | 11/1979 | Hall |
| 4,186,754 A | 2/1980 | Labbe |
| 4,208,956 A | 6/1980 | Hall |
| 4,237,907 A | 12/1980 | Pawelko et al. |
| 4,239,591 A | 12/1980 | Blake |
| 4,252,527 A | 2/1981 | Hall |
| 4,280,187 A | 7/1981 | Reuland et al. |
| 4,281,670 A | 8/1981 | Heitmann et al. |
| 4,291,713 A | 9/1981 | Frank |
| 4,340,074 A | 7/1982 | Tudor |
| 4,361,156 A | 11/1982 | Hall |
| 4,409,995 A | 10/1983 | Nichols |
| 4,412,829 A | 11/1983 | Lebet et al. |
| 4,434,805 A | 3/1984 | Hall |
| 4,450,847 A | 5/1984 | Owens |
| 4,452,259 A | 6/1984 | Norman et al. |
| 4,453,553 A | 6/1984 | Cohn |
| 4,459,998 A | 7/1984 | Labbe et al. |
| 4,474,190 A | 10/1984 | Brand |
| 4,480,650 A | 11/1984 | Weinert |
| 4,489,738 A | 12/1984 | Simon |
| 4,574,816 A | 3/1986 | Rudszinat |
| 4,580,579 A | 4/1986 | Wahle et al. |
| 4,582,507 A | 4/1986 | Grollimund |
| 4,583,558 A | 4/1986 | Luke |
| 4,590,954 A | 5/1986 | Gooden |
| 4,607,647 A | 8/1986 | Dashley et al. |
| 4,615,345 A | 10/1986 | Durocher |
| 4,619,276 A | 10/1986 | Albertson et al. |
| 4,619,278 A | 10/1986 | Smeed et al. |
| 4,622,983 A | 11/1986 | Mathews et al. |
| 4,643,203 A | 2/1987 | Labbe |
| 4,727,888 A | 3/1988 | Luke |
| 4,732,165 A | 3/1988 | Hakansson et al. |
| 4,736,754 A | 4/1988 | Heitmann et al. |
| 4,739,775 A | 4/1988 | Hampl, Jr. |
| 4,781,203 A | 11/1988 | La Hue |
| 4,844,100 A | 7/1989 | Holznagel |
| 4,845,374 A | 7/1989 | White et al. |
| 4,878,506 A | 11/1989 | Pinck et al. |
| 4,889,145 A | 12/1989 | Adams et al. |
| 4,899,765 A | 2/1990 | Davis et al. |
| 4,944,316 A | 7/1990 | Stuhl et al. |
| 4,945,932 A | 8/1990 | Mentzel et al. |
| 4,962,773 A | 10/1990 | White et al. |
| 4,979,521 A | 12/1990 | Davis et al. |
| 4,998,542 A | 3/1991 | Kallianos et al. |
| 5,012,823 A | 5/1991 | Keritsis et al. |
| 5,060,664 A * | 10/1991 | Siems et al. ............... 131/84.1 |
| 5,060,665 A | 10/1991 | Heitmann |
| 5,060,675 A | 10/1991 | Milford et al. |
| 5,085,228 A | 2/1992 | Mooney et al. |
| 5,105,838 A | 4/1992 | White et al. |
| 5,156,169 A | 10/1992 | Holmes et al. |
| 5,163,452 A | 11/1992 | Marritt et al. |
| 5,170,128 A | 12/1992 | Masurat et al. |
| 5,191,906 A | 3/1993 | Myracle, Jr. |
| 5,200,020 A | 4/1993 | Collins et al. |
| 5,263,500 A | 11/1993 | Baldwin et al. |
| 5,263,999 A | 11/1993 | Baldwin et al. |
| 5,314,559 A | 5/1994 | Rinehart et al. |
| 5,342,484 A | 8/1994 | Cutright et al. |
| 5,387,285 A | 2/1995 | Rivers |
| 5,417,228 A | 5/1995 | Baldwin et al. |
| 5,450,863 A | 9/1995 | Collins et al. |
| 5,474,095 A | 12/1995 | Allen et al. |
| 5,534,114 A | 7/1996 | Cutright et al. |
| 5,634,477 A | 6/1997 | Ogura et al. |
| 5,666,976 A | 9/1997 | Adams et al. |
| 5,692,526 A | 12/1997 | Adams et al. |
| 5,709,352 A | 1/1998 | Rogers et al. |
| 5,735,292 A | 4/1998 | Draghetti |
| 5,849,153 A | 12/1998 | Ishino et al. |
| 5,878,753 A | 3/1999 | Peterson et al. |
| 5,878,754 A | 3/1999 | Peterson et al. |
| 5,919,906 A | 7/1999 | Rowlands et al. |
| 5,958,275 A | 9/1999 | Joines et al. |
| 5,966,218 A | 10/1999 | Bokelman et al. |
| 5,979,461 A | 11/1999 | Bensalem et al. |
| 5,997,691 A | 12/1999 | Gautam et al. |
| 5,998,774 A | 12/1999 | Joines et al. |
| 6,020,969 A | 2/2000 | Struckhoff et al. |
| 6,059,706 A | 5/2000 | Chehab et al. |
| 6,075,232 A | 6/2000 | Joines et al. |
| 6,087,642 A | 7/2000 | Joines et al. |
| 6,129,087 A | 10/2000 | Wallace et al. |
| 6,198,537 B1 | 3/2001 | Bokelman et al. |
| 6,202,648 B1 | 3/2001 | Schumacher et al. |
| 6,202,649 B1 | 3/2001 | Williams |
| 6,229,115 B1 | 5/2001 | Voss et al. |
| 6,246,037 B1 | 6/2001 | Drozd et al. |
| 6,259,077 B1 | 7/2001 | Drozd et al. |
| 6,543,457 B2 | 4/2003 | Maiwald et al. |
| 6,596,125 B2 | 7/2003 | Garg et al. |
| 6,606,999 B2 | 8/2003 | Crooks et al. |
| 6,645,605 B2 | 11/2003 | Hammersmith et al. |
| 6,647,878 B2 | 11/2003 | Blau et al. |
| 6,684,781 B1 | 2/2004 | Saitoh |
| 6,705,325 B1 | 3/2004 | Hicks et al. |
| 6,837,248 B2 | 1/2005 | Zawadzki et al. |
| 6,848,449 B2 | 2/2005 | Kitao et al. |
| 6,854,469 B1 | 2/2005 | Hancock et al. |
| 6,883,524 B2 | 4/2005 | Ishikawa et al. |
| 6,904,917 B2 | 6/2005 | Kitao et al. |
| 2001/0042456 A1 | 11/2001 | Kamen et al. |
| 2002/0004132 A1 | 1/2002 | Banovetz |
| 2002/0023655 A1 | 2/2002 | Fietkau |
| 2002/0092621 A1 | 7/2002 | Suzuki |
| 2002/0129823 A1 | 9/2002 | Dornbek et al. |
| 2002/0129824 A1 | 9/2002 | Hammersmith et al. |
| 2002/0135290 A1 | 9/2002 | Avnery |
| 2002/0139381 A1 | 10/2002 | Peterson et al. |

| | | | | | | |
|---|---|---|---|---|---|---|
| 2002/0150829 | A1 | 10/2002 | Zhao et al. | EP | 1329165 A1 | 7/2003 |
| 2002/0179105 | A1 | 12/2002 | Zawadzki et al. | GB | 1 378 169 | 12/1974 |
| 2002/0179106 | A1 | 12/2002 | Zawadzki et al. | WO | WO 0056554 | 9/2000 |
| 2003/0004223 | A1 | 1/2003 | Khudyakov | WO | WO 0208309 | 1/2002 |
| 2003/0037792 | A1 | 2/2003 | Snaidr et al. | WO | WO 02/17737 A1 | 3/2002 |
| 2003/0131860 | A1 | 7/2003 | Ashcraft et al. | WO | WO 02/19848 A1 | 3/2002 |
| 2003/0136419 | A1 | 7/2003 | Muller | WO | WO 02/37991 A1 | 5/2002 |
| 2003/0136420 | A1 | 7/2003 | Kraker | WO | WO 02/44700 A1 | 6/2002 |
| 2003/0145866 | A1 | 8/2003 | Hartmann | WO | WO 02/055294 A1 | 7/2002 |
| 2003/0145869 | A1 | 8/2003 | Kitao et al. | WO | WO 02/078471 A1 | 10/2002 |
| 2003/0150466 | A1 | 8/2003 | Kitao et al. | WO | WO 03/000497 A2 | 1/2003 |
| 2003/0197126 | A1 | 10/2003 | Sato et al. | WO | WO 03/064165 A1 | 8/2003 |
| 2003/0211351 | A1 | 11/2003 | Figel et al. | WO | WO 03/077686 A1 | 9/2003 |
| 2004/0011369 | A1 | 1/2004 | Matsufuji et al. | WO | WO 2004/089120 A1 | 10/2004 |
| 2004/0020520 | A1 | 2/2004 | Fuentes et al. | WO | WO 2004/095957 A3 | 11/2004 |
| 2004/0123874 | A1 | 7/2004 | Zawadzki et al. | | | |
| 2004/0134631 | A1 | 7/2004 | Crooks et al. | | | |
| 2004/0261805 | A1 | 12/2004 | Wanna et al. | | | |

FOREIGN PATENT DOCUMENTS

| | | | |
|---|---|---|---|
| EP | | 1092354 A1 | 4/2001 |
| EP | | 1 234 514 A2 | 8/2002 |
| EP | | 1 003 643 B1 | 3/2003 |

OTHER PUBLICATIONS

Hauni Protos/SE 80 Operating Manual, No. B585e, pp. 4/10-4/11, in existence at least as of Dec. 20, 2002.

Hauni Operating Manual, MAX 2, No. 78, HME.0110.04.5.e, pp. 13-49-13/81, Jun. 1997.

* cited by examiner

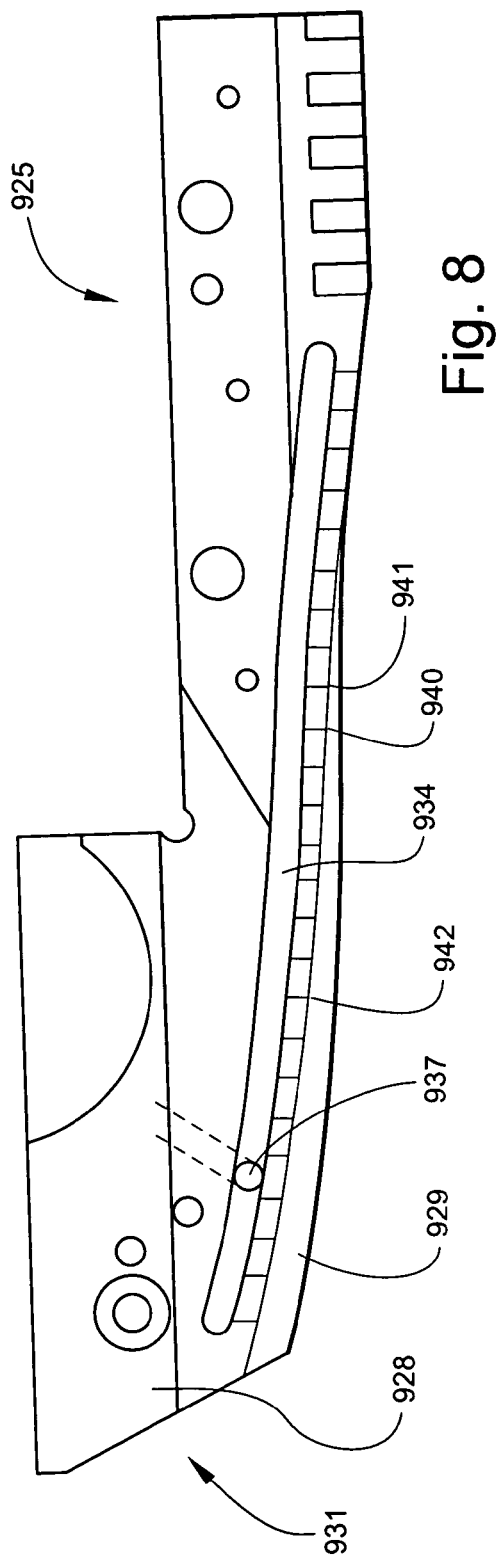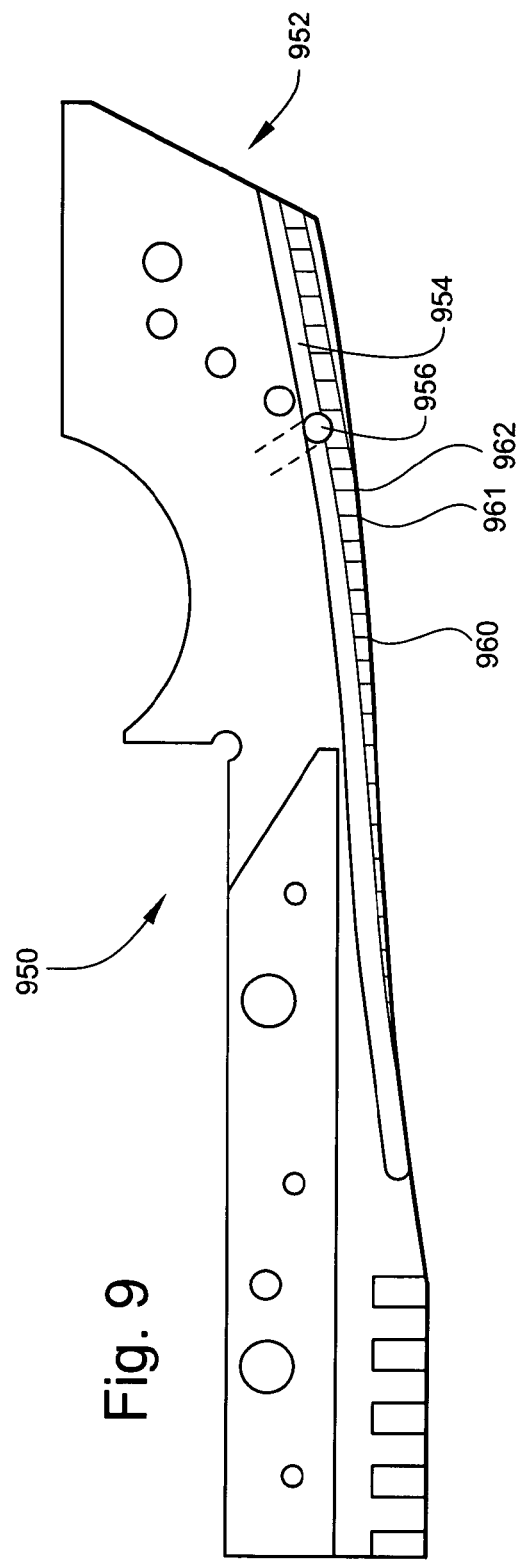
Fig. 8
Fig. 9

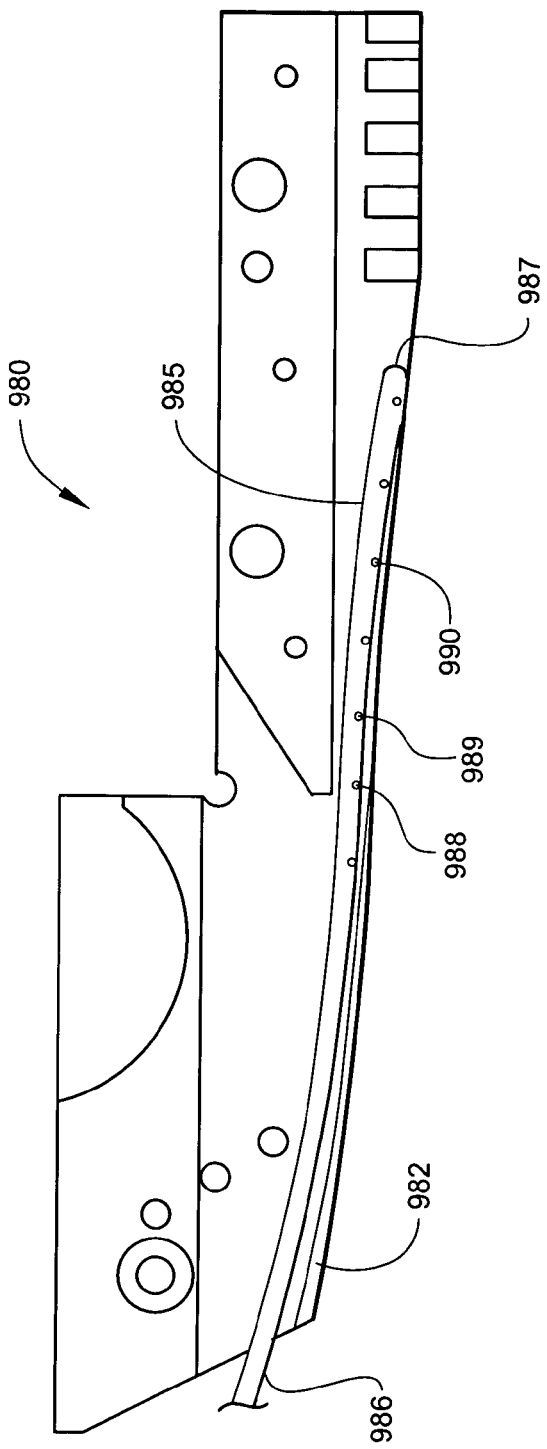
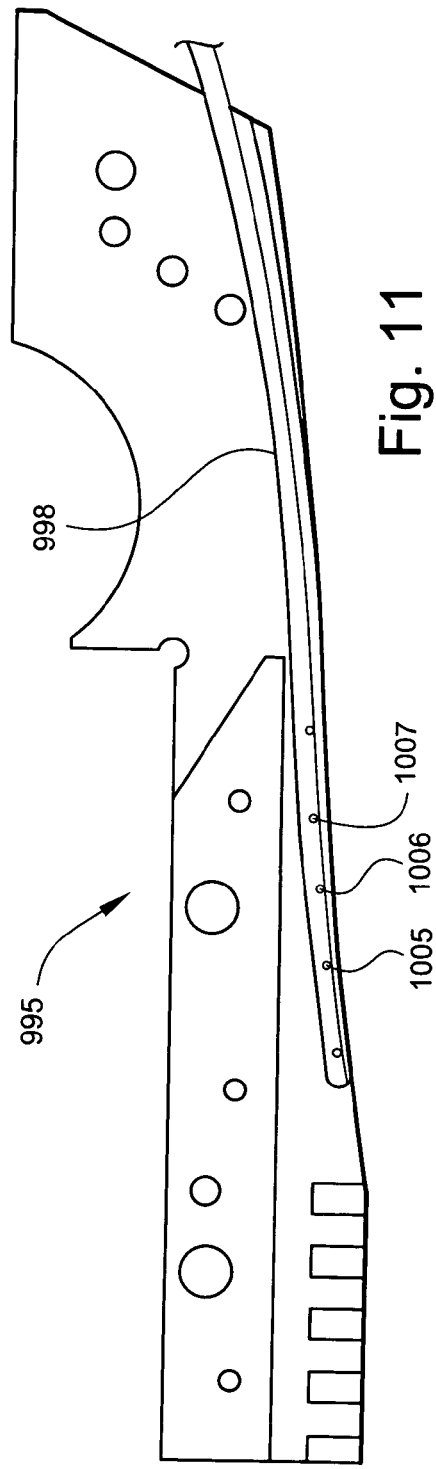

EQUIPMENT FOR MANUFACTURING CIGARETTES

CROSS-REFERENCE TO RELATED APPLICATIONS

This application claims is a continuation-in-part of prior U.S. patent application Ser. No. 09/892,834, filed Jun. 27, 2001, now U.S. Pat. No. 6,854,469; and is a continuation-in-part of prior U.S. patent application Ser. No. 10/326,539, filed Dec. 20, 2002, now U.S. Pat. No. 7,073,514; and is a continuation-in-part of prior U.S. patent application Ser. No. 10/439,935, filed May 16, 2003; each prior application of which is incorporated herein by reference in its entirety.

FIELD OF THE INVENTION

The present invention relates to smoking articles, and in particular, to equipment, materials and techniques used for the manufacture of those smoking articles. More specifically, the present invention relates to the manufacture of cigarette rods, and in particular, to systems and methods for applying an additive material to desired locations of wrapping materials of cigarettes in an efficient, effective and desired manner.

BACKGROUND OF THE INVENTION

Smoking articles, such as cigarettes, have a substantially cylindrical rod-shaped structure and include a charge, roll, or column of smokable material, such as shredded tobacco, surrounded by a paper wrapper, to form a "cigarette rod," "smokable rod" or a "tobacco rod." Normally, a cigarette has a cylindrical filter element aligned in an end-to-end relationship with the tobacco rod. Typically, a filter element comprises plasticized cellulose acetate tow circumscribed by a paper material known as "plug wrap." Certain cigarettes incorporate filter elements comprising, for example, activated charcoal particles. Typically, the filter element is attached to one end of the tobacco rod using a circumscribing wrapping material known as "tipping paper."

A cigarette is used by a smoker by lighting one end of that cigarette, and burning the tobacco rod. The smoker then receives mainstream smoke into his or her mouth by drawing on the opposite end of the cigarette. During the time that the cigarette is not being drawn upon by the smoker, the cigarette remains burning.

Numerous attempts have been made to control the manner that a cigarette burns when the cigarette is not being drawn upon. For example, cigarette papers have been treated with various materials to cause cigarettes incorporating those papers to self extinguish during periods when those cigarettes are lit but are not being actively puffed. Certain treatment methods have involved applying materials to the paper in circumferential bands or longitudinal stripes, creating areas that affect the burn rate of cigarettes incorporating that cigarette papers. See, for example, U.S. Pat. Nos. 3,030,963 to Cohn; U.S. Pat. No. 4,146,040 to Cohn; U.S. Pat. No. 4,489,738 to Simon; U.S. Pat. No. 4,489,650 to Weinert; and U.S. Pat. No. 4,615,345 to Durocher; U.S. patent application Ser. No. 2002/0,185,143 to Crooks et al.; U.S. patent application Ser. No. 2003/0,145,869 to Kitao et al.; U.S. patent application Ser. No. 2003/0,150,466 to Kitao et al.; and U.S. patent application Ser. No. 09/892,834, filed Jun. 27, 2001. In addition, numerous references disclose applying films to the paper wrapping materials of tobacco rods. See, for example, U.S. Pat. No. 1,909,924 to Schweitzer; U.S. Pat. No. 4,607,647 to Dashley; and U.S. Pat. No. 5,060,675 to Milford et al.; and U.S. patent application Ser. No. 2003/0,131,860 to Ashcraft et al.

"Banded" paper wrapping materials that are used for cigarette manufacture possess segments defined by the composition, location, and properties of the various materials within those wrapping materials. Numerous references contain disclosures suggesting various banded wrapping material configurations. See, for example, U.S. Pat. No. 1,996,002 to Seaman; U.S. Pat. No. 2,013,508 to Seaman; U.S. Pat. No. 4,452,259 to Norman et al.; U.S. Pat. No. 5,417,228 to Baldwin et al.; U.S. Pat. No. 5,878,753 to Peterson et al.; U.S. Pat. No. 5,878,754 to Peterson et al.; and U.S. Pat. No. 6,198,537 to Bokelman et al.; and PCT WO 02/37991. Methods for manufacturing banded-type wrapping materials also have been disclosed. See, for example, U.S. Pat. No. 4,739,775 to Hampl, Jr. et al.; and U.S. Pat. No. 5,474,095 to Allen et al.; and PCT WO 02/44700 and PCT WO 02/055294. Some of those references describe banded papers having segments of paper, fibrous cellulosic material, or particulate material adhered to a paper web. See, U.S. Pat. No. 5,263,999 to Baldwin et al.; U.S. Pat. No. 5,417,228 to Baldwin et al.; and U.S. Pat. No. 5,450,863 to Collins et al.; and U.S. patent application Ser. No. 2002/0,092,621 to Suzuki. Methods for manufacturing cigarettes having treated wrapping materials are set forth in U.S. Pat. No. 5,191,906 to Myracle, Jr. et al. and PCT WO 02/19848.

Additive materials can be applied to cigarette paper wrapping materials during the time that those wrapping materials are being used for cigarette manufacture (i.e., in a so-called "on-line" fashion). However, water-based formulations incorporating those additives, and the paper wrappers to which the additives are applied, have a tendency to remain wet when the additive-treated wrapper reaches the garniture section of the cigarette making machine. Consequently, for example, the additive materials that are applied to a paper web tend to rub off of the paper and onto components of the finger rail assembly that is located near the garniture end of the suction rod conveyor of the cigarette making machine, and onto the tongue and folder components that are located in the garniture region of the cigarette making machine. A build-up of additive material on certain regions of the cigarette making machine can cause cigarette rod formation problems, paper breaks, and machine downtime for cleaning. Such an undesirable tendency for additive materials to transfer from the paper web to surfaces of the cigarette machine is increased with increasing speed of manufacture of the continuous cigarette rod.

Several references have proposed modifications to the garniture regions of cigarette making machines. Several of those references propose introducing certain substances into a cigarette making machine during cigarette rod manufacture. For example, U.S. Pat. No. 4,186,754 to Labbe discloses feeding water or alcohol to the surface of the tongue which contacts the stream of a particular type of tobacco in order address concerns of gummy substances that reportedly build up on that tongue. U.S. Pat. No. 4,409,995 to Nichols discloses applying a flavorant in particulate or liquid form to a cigarette rod through the tongue region of a cigarette making machine. U.S. Pat. No. 4,619,276 to Albertson et al. discloses applying foamed flavorant to a cigarette rod through the tongue region of a cigarette making machine. U.S. Pat. No. 4,899,765 to Davis et al. discloses a process for introducing liquid into the garniture tongue in liquid outlet openings.

It would be highly desirable to provide cigarettes having predetermined patterns of additive materials (e.g., as bands)

applied in desired locations to the wrapping materials of those cigarettes, particularly using on-line processes during cigarette manufacture. It also would be desirable to apply additive materials to a continuous web of a wrapping material of a tobacco rod in an efficient and effective manner during the manufacture of that tobacco rod. It also would be desirable to ensure that the wrapping material so treated with additive material meets standards of quality desired by the manufacturer of those tobacco rods. It also would be desirable to provide a method for minimizing or preventing transfer of an additive material on a paper web to a cigarette making machine surface; and it also would be desirable that such method operate effectively and be easily implemented within a conventional automated cigarette making machine of the type used to produce commercial quantities of cigarettes.

SUMMARY OF THE INVENTION

The present invention provides systems, apparatus, and methods for manufacturing smoking articles, such as cigarettes. Certain preferred aspects of the present invention relate to manners and methods for transferring additive material to, and retaining an additive material on desired locations of, a wrapping material suitable for use for smoking article manufacture (e.g., paper wrapping web) when manufacturing smoking articles from those materials using a cigarette making machine. That is, preferred aspects of the present invention comprise various embodiments of an apparatus for applying an additive material (e.g., as an adhesive-type of formulation) to a continuous advancing strip of a paper web within a region of an automated cigarette making machine system (e.g., a machine designed to produce a continuous cigarette rod). In the highly preferred aspects of the present invention, an additive material is applied to a paper web in an on-line fashion (i.e., using a cigarette making machine or a component of a cigarette making machine assembly during cigarette manufacturing process). In the most highly preferred aspects of the present invention, the automated cigarette making machine can operate so as to apply a desired additive material, in a desired amount, in a desired configuration, in a desired location, on a continuous strip of paper wrapping material used for the manufacture of a continuous cigarette rod; which strip of paper wrapping material is supplied (and hence the continuous cigarette rod is manufactured) at speeds exceeding about 400 meters per minute.

Certain cigarette making apparatus and systems of the present invention are characterized as single component systems. A continuous paper web is provided from a source (e.g., a bobbin) associated with a component of such a system (e.g., an unwind spindle assembly of that system). Tobacco filler and components for manufacturing a continuous cigarette rod from the tobacco filler and the continuous paper web are provided using the same component of that system (e.g., using an upwardly moving air stream coupled with a conveyor system and a garniture system, respectively). Such cigarette making apparatus can be adapted to incorporate additive application apparatus that provide ways to apply additive material (e.g., coating formulations) to the continuous paper web in an on-line fashion.

Certain cigarette making apparatus and systems of the present invention are characterized as multi-component systems, and in particular, two component systems. A continuous paper web is provided from a source that is the first component of such a system. Tobacco filler and components for manufacturing a continuous cigarette rod from the tobacco filler and the continuous paper web supplied by the first component are provided using the second component of that system. For preferred two component systems, the two components are independent, stand alone units. Such cigarette making apparatus can be adapted to incorporate additive application apparatus that provide ways to apply additive material (e.g., coating formulations) to the continuous paper web in an on-line fashion.

In one aspect, the present invention relates to equipment and methods for applying an additive material to a substrate, such as a paper web used as a wrapping material for cigarette manufacture. Those equipment and methods are particularly suitable in connection with the operation of an automated cigarette making machine, and for the purpose of applying a predetermined pattern of additive material to a continuous strip of paper web. An additive application apparatus includes a first roller adapted to receive the additive material (e.g., a coating formulation in liquid form) and a second roller adjacent to the first roller adapted to transfer the additive material from the first roller to the substrate (e.g., paper web). That apparatus also includes an additive material reservoir adjacent to the first roller for containing the additive material, and for supplying the additive material to the first roller. The additive material so supplied is positioned within pockets, grooves or indentations within the roll face of the first roller. For that apparatus, the roll face of the second roller is in roll contact with the roll face of the first roller in one location, and the roll face of the second roller is in contact with the paper web in another location; thus allowing for a predetermined transfer of additive material in a two-step manner. That is, when the additive material is supplied to pockets within the roll face of the first roller, that additive material is transferred to the roll face of the second roller; and when the second roller contacts the advancing paper web, the additive material is transferred from the roll face of the second roller and applied to the advancing paper web.

For the foregoing additive application apparatus, appropriate roll contact between the roll faces of the respective rollers is facilitated by a pressure plate, or other suitable means for ensuring contact of the second roller with the first roller. As such, the first roller is moved, or otherwise arranged or positioned, into operative rotating engagement with the second roller. Thus, in certain embodiments, such as when the first and second rollers both are located on the same side of the paper web, and when the first and second rollers are in appropriate roll contact, the additive material is transferred from the first roller to the second roller in virtually the same type of pattern as the pattern dictated by the location the pockets on the first roller. Contact of the second roller with the paper web is provided using a roller lift bracket, or other suitable means for facilitating contact of the second roller with the paper web. The roller lift bracket includes a plurality of guide rollers, and the bracket is movable (e.g., preferably is slidable up and down), so as to cause movement of those rollers into rotating roll contact with the paper web and the paper web into contact with the second roller. Thus, when the paper web contacts the second roller, the additive material is transferred from the second roller to the paper web in essentially the same pattern as the pattern dictated by the location of the pockets on the first roller (i.e., the pattern corresponds to the pattern of the pockets on the roll face of the first roller). As such, a suitable method for applying additive material to a web of wrapping material, most preferably in an on-line fashion, is provided.

In another embodiment of an additive application apparatus, additive material (e.g., a coating formulation in paste form) is applied to a substrate (e.g., a paper web) using a system that employs a first roller adapted to (i) receive an additive material from an additive material reservoir, and (ii) apply that additive material to the substrate. Preferably, the first roller comprises a plurality of pockets, grooves or indentations that are aligned or arranged in the form of a pattern on the roll face of that roller. When the additive material is supplied to the first roller, a predetermined amount of the additive material is contained in each of the plurality of pockets. A second roller is in roll contact with the first roller, and the paper web passes through the location or region where those two rollers make roll contact. Such roll contact facilitates transfer of the additive material from the first roller to the paper web.

For the foregoing additive application apparatus, the second roller is connected to the roller lift bracket and is thus positioned on the side of the paper web opposite the first roller. The roller lift bracket preferably is movable, and as such provides a means to cause movement of the second roller into, and out of, rotating contact with both the paper web and the first roller. In this manner, the roller lift bracket provides both (i) a way to provide contact of the second roller with the first roller, and (ii) a way to provide contact of the second roller with the paper web. Thus, when the paper web comes into contact between the first and second rollers in the nip region or location between those rollers, the additive material is transferred from the first roller to the paper web in essentially the same pattern as the pattern dictated by the location of the pockets on the first roller (i.e., the pattern corresponds to the pattern of the pockets on the roll face of the first roller). As such, a suitable method for applying additive material to a web of wrapping material, most preferably in an on-line fashion, is provided.

Another additive application apparatus includes a first roller adapted to receive the additive material (e.g., a coating formulation in liquid form) and a second roller adjacent to the first roller adapted to transfer the additive material from the first roller to a substrate (e.g., continuous advancing paper web). That apparatus also includes an additive material reservoir adjacent to the first roller for containing the additive material, and for supplying the additive material to the first roller. The additive material so supplied is positioned on the roll face of the first roller. For that apparatus, the roll faces of protruding dies extending from the second roller are in roll contact with the roll face of the first roller in one location; and the roll faces of the protruding dies of the second roller are in contact with the paper web in another location; thus allowing for a predetermined transfer of additive material in a two-step manner. That is, when the additive material is supplied to the roll face of the first roller, that additive material is transferred to the roll face of the protruding dies of the second roller; and when those dies possessing additive material on their roll faces contact the advancing paper web, the additive material is transferred from the roll face of the protruding dies of the second roller and applied to the advancing paper web. As such, a suitable method for applying additive material to a web of wrapping material, most preferably in an on-line fashion, is provided.

Another additive application apparatus includes a first roller adapted to receive the additive material (e.g., a coating formulation in liquid form) on at least a portion of its roll face, a second roller adjacent to the first roller adapted to receive the additive material to at least a portion of its roll face, and an application roller adapted to (i) receive the additive material to desired locations on the roll face thereof from the roll face of the second roller, and (ii) apply that additive material to a substrate (e.g., continuous advancing paper web). That apparatus also includes an additive material reservoir adjacent to the first roller for containing the additive material, and for supplying the additive material to a desired location of the roll face of the first roller (e.g., a continuous groove circumscribing a portion of the roll face of that first roller). As such, the additive material so supplied is continuously positioned on a predetermined region of the roll face of the first roller; and as a result of the roll interaction of the first and second rollers, additive material is applied to a predetermined region of the roll face of the second roller. The roll faces of protruding dies extending from the application roller are in roll contact with the roll face of the second roller in one location; and the roll faces of the protruding dies of the application roller are in contact with the paper web in another location. Thus, there is provided a manner or method for carrying out a predetermined transfer of additive material in a multi-step manner. That is, additive material is supplied to the roll face of a second roller as a result of roll interaction of a first roller and that second roller, and that additive material on the roll face of the second roller is transferred to predetermined locations on the roll face of the application roller. When those locations of the application roller (e.g., those dies possessing additive material on their roll faces) subsequently contact the advancing paper web, the additive material is transferred from the roll face of the application roller and applied to the advancing paper web. As such, a suitable method for applying additive material to a web of wrapping material, most preferably in an on-line fashion, is provided.

Another additive application apparatus includes a first roller adapted to receive the additive material (e.g., a coating formulation in liquid form) and adapted to transfer the additive material to a substrate (e.g., a continuous advancing paper web). The paper web passes between the roll faces of the first roller and a second roller. That apparatus also includes an additive material reservoir adjacent to the first roller for containing the additive material, and for supplying the additive material to the first roller. The additive material so supplied is positioned on the roll face of the first roller. For that apparatus, the roll faces of protrusions or cams extending from the second roller are in roll contact with the roll face of the first roller, and the paper web passes between those roll faces such that both rollers are periodically in contact with the paper web; thus allowing for a predetermined transfer of additive material to the paper web from the roll face of the first roller when the roll faces of the protruding cams of the second roller cause the application of force to the paper web. That is, when the additive material is supplied to the roll face of the first roller, that additive material is transferred to predetermined locations on the surface of the paper web when the protruding cams of the second roller cause the paper web to be pushed against the roll face of the first roller. As such, a suitable method for applying additive material to a web of wrapping material, most preferably in an on-line fashion, is provided.

The present invention, in another aspect, relates to a system useful for retaining on a paper web an additive material that has been applied to that paper web. The additive material can be a material that is applied to the paper web in a previous processing step, such as using gravure printing techniques (e.g., using so-called "off-line" techniques), or while that paper web is being used for the manufacture of cigarettes within a cigarette making machine (e.g., using on-line techniques). The system most preferably is located in the garniture entrance region of the cigarette making machine, and particularly in the finger rail region of the cigarette making machine. The system comprises a finger rail assembly and a garniture entrance cone, which are located in a region of the cigarette making machine adapted to receive a continuous paper web. The paper web is advanced between the lower region of the finger rail assembly and the upper region of the garniture entrance cone. The system includes at least one air chamber (e.g., preferably each finger rail of the finger rail assembly includes an air chamber) located above the advancing paper web and a supply of pressurized or compressed gas (e.g., air) is fed into that air chamber (e.g., a manifold or tubular channel). The air chamber includes a plurality of air distribution outlets or air passageways directed toward the lower surface of the system, and as such, air flows out of the air chamber. When a high velocity stream of air exits the air distribution outlets and is directed generally downward, a zone of air turbulence preferably is created above the advancing paper web. That turbulence provides downward force that maintains the paper web a distance away from (e.g., spaced from) the finger rail assembly of the cigarette making machine. As a result, the additive material is retained on the paper web, and undesirable transfer of the additive material to the finger rail components of the cigarette making machine (and other regions of the cigarette making machine) is minimized, avoided or prevented.

The present invention, in another aspect, relates to another system useful for retaining on a paper web an additive material that has been applied to that paper web. That system encompasses modification of a garniture entrance cone (which is designed to be positioned below the advancing paper web within a cigarette making machine). An entrance cone of one aspect of the present invention is adapted to possess an air chamber. That air chamber (e.g., manifold) is adapted to receive a flow or stream of gas (e.g., air) from a supply of pressurized or compressed air. Two air channels, both providing air outlets, or other suitably adapted air distribution means, are directed generally longitudinally, and are designed so as to provide a flow of air generally upwardly and generally outwardly. As a result, for each of opposing edges of the paper web (i.e., the right and left sides of the paper web relative to the longitudinal axis of that web) that pass over that entrance cone, the stream of air exiting each channel creates a zone of low air pressure zone between that paper web and the upper surface of the entrance cone. Each of the paper web edges is affected by this low pressure zone, and each edge is urged toward the entrance cone and away from the finger rail components of the cigarette making machine (and other regions of the cigarette making machine). As a result, contact of the paper web and additive material with certain components of the cigarette making machine is minimized, avoided or prevented.

In one embodiment of the foregoing, an apparatus for the manufacture of cigarettes is adapted to minimize, avoid or prevent transfer of an additive material applied to a paper web from that paper web to surfaces of certain components of that apparatus. The apparatus includes a finger rail assembly comprising a pair of finger rails positioned at the distal, or exit, end of a suction rod conveyor system. The apparatus also includes a garniture entrance cone positioned below the pair of finger rails, essentially as is conventional in a commercially available automated cigarette making machine. The pair of finger rails and the garniture entrance cone are adapted to receive between them a continuous strip of advancing paper web. In certain circumstances, the advancing paper web has a predetermined pattern of additive material (e.g., bands) applied thereto. Each finger rail includes an air chamber, and the air chamber is adapted to receive a high velocity stream of air. Each air chamber has a plurality of air distribution outlets along its length directed generally downward toward the entrance cone. Those air distribution outlets can be arranged in either a random or a predetermined pattern, preferably so as to provide a turbulent flow of air below each finger rail. In the preferred embodiments, the stream air and the design of the air outlet pattern provides for a relatively consistent air flow from each of the various air distribution outlets. When the stream of air exits the air distribution outlets, a zone of air movement (e.g., turbulence) is created above the advancing paper web; and the action of that high velocity air flow acts to maintain the paper web a distance away from the finger rails. Preferably, the entrance cone comprises an air chamber, and high velocity or pressurized air is fed into that air chamber. Two air channels or slots, both providing air outlets, or other suitably adapted air distribution means, are directed generally longitudinally, and are designed so as to provide a flow of air generally upwardly and generally outwardly. When the high velocity air exits the slots of the entrance, a zone of low pressure is created between the paper web and the upper surface of the entrance cone. Each of the side edges of the paper web is affected by this low pressure zone, and is urged toward the entrance cone upper surface and away from the finger rails; and contact of the paper web with components of the finger rail assembly is minimized, avoided or prevented. Thus, an improved method for the manufacture of smoking articles, such as cigarettes, is provided.

In yet another aspect, the present invention relates to a system for controlling the heat to which the web of wrapping material is subjected. That is, such a system can be used to control the temperature (e.g., by heating or cooling) the web of paper wrapping material, and any additive material that has been applied to that paper web. One suitable system is a radiant energy system that utilizes electromagnetic radiation in the form of microwave radiation. In a highly preferred embodiment, the moving continuous paper web is subjected to treatment using a heating/cooling device (which most preferably is a radiant heating device) essentially immediately after that paper web has additive material (e.g., a water-based coating formulation) applied thereto.

The present invention, in one aspect, relates to a system for controlling, or registering, in an on-line fashion, the location of the applied pattern (e.g., bands) of additive material on the wrapping material to the location of that pattern on the smoking article that is manufactured. In one embodiment, the application of each band is controlled relative to the speed at which the cigarette making machine is operated; and the location of each band is timed to the operation of the cutting device (e.g., flying knife) that cuts the continuous rod into cigarette rods of predetermined length. In another embodiment, registration of patterns (e.g., bands) on a paper web, and hence on predetermined locations on cigarettes, is provided using digital motion control techniques that utilize a servo control system in combination with (i) digital encoders for providing feedback of certain cigarette making machine operating parameters (e.g., such as information regarding band positioning and continuous cigarette rod speed), and (ii) feedback from a detector that responds to the presence of bands on the paper web.

In another aspect, the present invention relates an adapted automated cigarette making apparatus of the type having a conveyor belt for tobacco filler supply, a garniture belt for advancing a continuous strip of paper web, and a cutting knife for subdividing a continuous cigarette rod into predetermined lengths; and all of the foregoing are operated using a single power source (e.g., all of the foregoing are mechanically linked by belts and driven off of the same main motor).

The adapted apparatus is provided by disabling operation of the power source, such as is accomplished by removing connection of operation of each of the conveyor belt, the garniture belt and the cutting knife to that power source. Operation of the cutting knife is adapted so as to be powered by a second power source (e.g., the motor of a servo system). Operation of the garniture belt and the conveyor belt are provided by a third power source (e.g., a motor of a servo system) that is independent of the second power source. As such, operation of the garniture belt and conveyor belt are mechanically linked to one another. During operation of the adapted apparatus, output signals from each of the second and third power sources are provided to a control system; and the control system can provide independent feedback to each of the second and third power sources so as to alter the speed of operation of those power sources relative to one another (e.g., the second power source can be directed to speed up operation and/or the third power source can be directed to slow down operation).

In yet another aspect, the present invention relates to a system for inspecting a substrate in the form of a wrapping material for smoking article manufacture. The system is particularly well suited for inspection of a web of paper wrapping material that has a discontinuous nature, such as is provided by application of an additive material to all or a portion of that wrapping material (e.g., as a pattern). The system possesses an emitter for directing radiation into contact with the web of material containing a pattern such that the radiation impinges upon the web of material and is absorbed. The system also possesses a detector (e.g., a near infrared sensor or detector, or a non-contact ultrasonic transducer) for receiving reflected radiation from the web, and for forming electrical signals representative of at least one selected component (e.g., water) or representative change in mass of material corresponding to the presence of additive material. The system further includes circuitry for processing the aforementioned electrical signals to determine information relating to the presence of the pattern on the web, and for generating output signals. The system further includes computing logic for receiving the output signals and for determining whether those signals are representative of an unacceptable, irregular pattern on the web or of an acceptable, desired pattern. The system further includes computer logic for receiving information regarding irregular patterns and for signaling rejection of component materials (e.g., formed cigarettes) manufactured from wrapping materials possessing additive material that have been determined to possess irregular patterns.

Features of the foregoing aspects and embodiments of the present invention can be accomplished singularly, or in combination, in one or more of the foregoing. As will be appreciated by those of ordinary skill in the art, the present invention has wide utility in a number of applications as illustrated by the variety of features and advantages discussed below. As will be realized by those of skill in the art, many different embodiments of the foregoing are possible. Additional uses, objects, advantages, and novel features of the present invention are set forth in the detailed description that follows and will become more apparent to those skilled in the art upon examination of the following or by practice of the invention.

BRIEF DESCRIPTION OF THE DRAWINGS

FIG. 8 is a schematic illustration of the outer side of the outer finger rail portion of a finger rail assembly.

FIG. 9 is a schematic illustration of the outer side of the inner finger rail portion of a finger rail assembly.

FIG. 10 is a schematic illustration of the outer side of the outer finger rail portion of a finger rail assembly.

FIG. 11 is a schematic illustration of the outer side of the inner finger rail portion of a finger rail assembly.

DETAILED DESCRIPTION OF THE PREFERRED EMBODIMENTS

Aspects and embodiments of the present invention include cigarette making machines and components thereof that are useful for manufacturing cigarettes, and in particular, that are useful for transferring and retaining additive material on a paper wrapping web in an efficient, effective and desired manner. FIGS. 1-28 illustrate those aspects and embodiments. Like components are given like numeric designations throughout the figures.

A conventional automated cigarette rod making machine useful in carrying out the present invention is of the type commercially available from Molins PLC or Hauni-Werke Korber & Co. KG. For example, cigarette rod making machines of the type known as Mk8 (commercially available from Molins PLC) or PROTOS (commercially available from Hauni-Werke Korber & Co. KG) can be employed, and can be suitably modified in accordance with the present invention. A description of a PROTOS cigarette making machine is provided in U.S. Pat. No. 4,474,190 to Brand, at col. 5, line 48 through col. 8, line 3, which is incorporated herein by reference. Types of equipment suitable for the manufacture of cigarettes also are set forth in U.S. Pat. No. 4,844,100 to Holznagel; U.S. Pat. No. 5,156,169 to Holmes et al. and U.S. Pat. No. 5,191,906 to Myracle, Jr. et al.; U.S. patent application Ser. No. 2003/0,145,866 to Hartman; U.S. patent application Ser. No. 2003/0,145,869 to Kitao et al.; U.S. patent application Ser. No. 2003/0,150,466 to Kitao et al.; and PCT WO 02/19848. Designs of various components of cigarette making machines, and the various material used to manufacture those components, will be readily apparent to those skilled in the art of cigarette making machinery design and operation.

Figure 1:
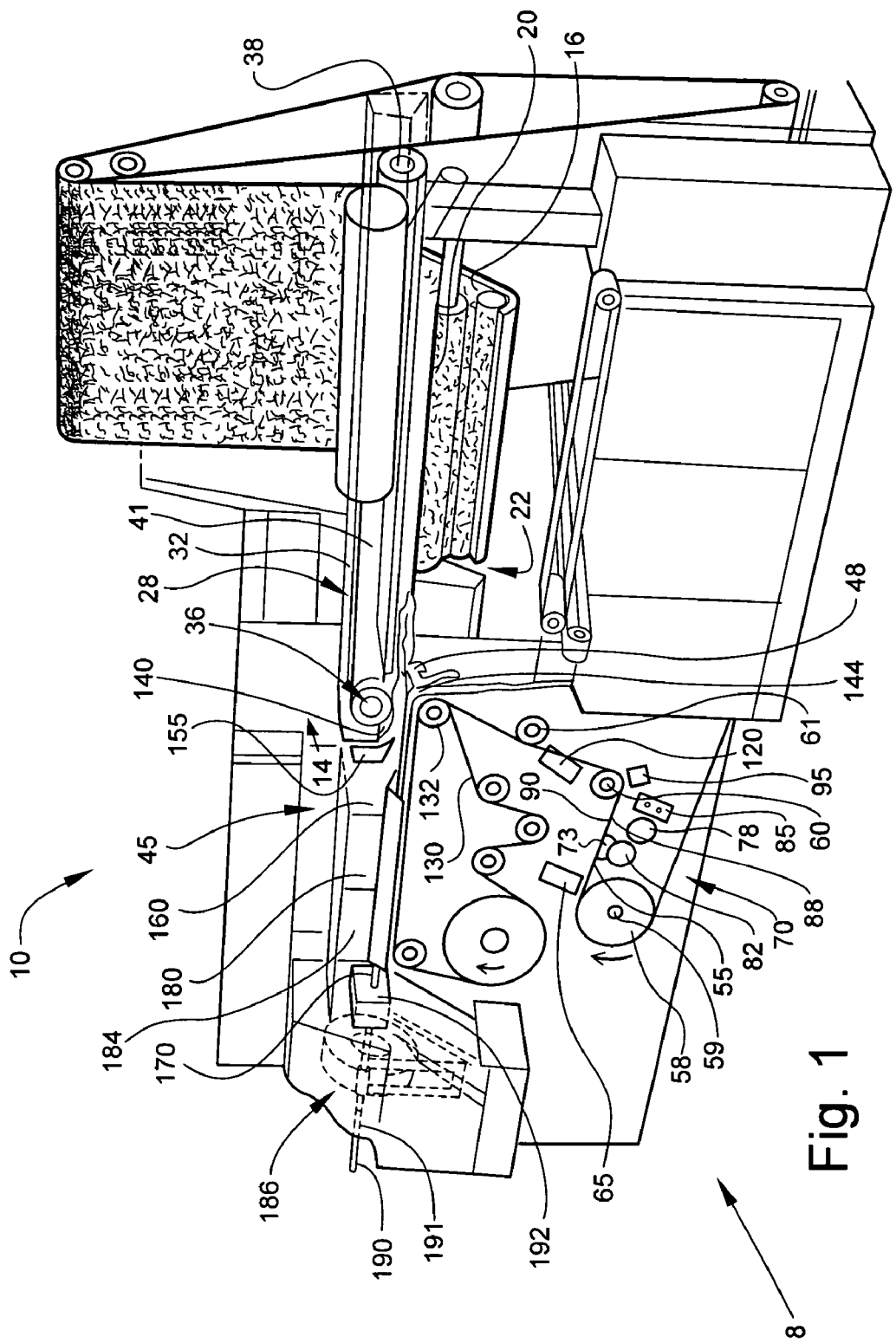
FIG. 1 is a schematic illustration of a portion of a cigarette making machine showing a source of wrapping material, a source of tobacco filler and a garniture region that is used to produce a continuous cigarette rod.

Referring to FIG. 1, a one-component cigarette making machine assembly 8 includes cigarette making machine 10. The cigarette making machine 10 includes a chimney region 16 that provides a source of tobacco filler 20, or other smoking material. The tobacco filler 20 is provided continuously within an upwardly moving air stream (shown by arrow 22), and is blown onto the lower outside surface of a continuous a conveyor system 28. The conveyor system 28 includes an endless, porous, formable conveyor belt 32 that is supported and driven at each end by left roller 36 and right roller 38. A low pressure region or suction chamber 41 within the foraminous belt 32 acts to attract and retain tobacco filler 20 against the bottom of the conveyor system 28. As such, tobacco filler 20 located below the conveyor belt 32 is pulled upward toward that belt, thereby forming the tobacco filler into a tobacco stream or cake on the lower surface of that belt. The conveyor belt 32 thus conveys the stream of tobacco filler 20 to the left; toward a garniture section 45 of the cigarette making machine 10. An ecreteur or trimmer disc assembly 48 assists in providing transfer of the appropriate amount of tobacco filler 20 to the garniture region 45. Descriptions of the components and operation of several types of chimneys, tobacco filler supply equipment and suction conveyor systems are set forth in U.S. Pat. No. 3,288,147 to Molins et al.; U.S. Pat. No. 4,574,816 to Rudszinat; U.S. Pat. No. 4,736,754 to Heitmann et al. U.S. Pat. No. 4,878,506 to Pinck et al.; U.S. Pat. No. 5,060,665 to Heitmann; U.S. Pat. No. 5,012,823 to Keritsis et al. and U.S. Pat. No. 6,630,751 to Fagg et al.; and U.S. patent application Ser. No. 2003/0,136,419 to Muller.

Meanwhile, a continuous web of paper wrapping material 55 is supplied from a bobbin 58. The bobbin is supported and rotated using an unwind spindle assembly 59.

The paper web 55 is routed on a desired path using a series of idler rollers and guideposts (shown as rollers 60, 61), through an optional printing assembly device 65, and ultimately through the garniture region 45. Typically, product indicia are printed onto the paper web 55 at predetermined regions thereof using printing assembly 65. Printing assemblies for printing product indicia (e.g., logos in gold colored print) are component parts of commercially available machines, and the selection and operation thereof will be readily apparent to those skilled in the art of cigarette making machine design and operation. Techniques for registering the location of printed product indicia on the ultimate cigarette product (e.g., on the paper wrapper of a cigarette rod in a location immediately adjacent to the tipping material of that product) are known to those skilled in the art of automated cigarette manufacture.

The paper web 55 also is routed through an applicator system 70 prior to the time that the web reaches the garniture section 45. The applicator system 70 is employed to apply a desired pattern of additive material 73 to the paper web 55. A representative pattern is provided by applying spaced bands that are aligned transversely to the longitudinal axis of the paper web 55. A representative additive material 73 is a coating formulation in a liquid, syrup or paste form.

Optionally, though not preferably, the paper web 55 can be routed through a heating/cooling control unit (not shown) immediately before the paper web passes through the applicator system 70. A suitable heating/cooling unit is a heating unit having the form of an infrared heater (not shown), and that heater can be operated at any desired temperature; for example, at a temperature of about 180° C. to about 220° C. The heating/cooling unit can be used to provide the paper web 55 at a desired temperature (e.g., the paper web can be pre-heated) immediately prior to application of the additive material formulation 73 to the surface of that paper web.

A representative additive applicator 70 comprises a pick-up roller 78 and a transfer roller 82. The pick-up roller 78 includes a plurality of patterned (e.g., evenly spaced apart) pockets on its roll face (not shown) into which a predetermined amount of additive is deposited. The positioning, shape and number of pockets can vary, and typically depends upon the pattern that is desired to be applied to the paper web 55 (e.g., spaced apart pockets can be used to place spaced bands of additive material 73 on the web). For example, in one embodiment of a transfer roller 82, seven pockets each having the form of transversely aligned bands each placed about 46 mm apart. The shape, including depth, of each pocket can determine the amount of additive material that can be carried by that pocket, and hence applied to the paper web 55.

The additive material 73 typically is provided from a supply source reservoir (not shown) through tubing or other suitable supply means (not shown) to a port or supply region 85 near the head (i.e., infeed region) of the pick-up roller 78. The additive material 73 is fed from the head of the pick-up roller into the pockets of the pick-up roller.

If desired, the supply region and the region of the pick-up roller 78, and other relevant regions of the additive applicator 70, can be supplied with heat control system using a suitable heating or cooling device (not shown). As such, a heating device can provide a heated region that can be used to assist in maintaining a solid or very viscous coating formulation in a melted form, such as in the form of a liquid, syrup or paste. A representative heating device is an electrical resistance heating unit controlled by a rheostat; and the heating device can be appropriately fashioned so as to transfer the desired amount of heat to the various components of the additive applicator 70. As such, sufficient heat can be provided to provide coating formulation at a temperature above ambient temperature, and for example, at a temperature within the range of about 120° F. to about 180° F. If desired, heat insulation material (not shown) can be positioned in adjacent regions of the cigarette making machine 10 in order that transfer of heat to other regions of that machine is minimized or prevented.

Operation of the pick-up roller 78 and the transfer roller 82 are timed and controlled relative to the speed of operation of the cigarette making machine 10. As the pick-up roller 78 and the transfer roller 82 are engaged in roll contact, and rotate in contact with each other on their respective peripheral surfaces in a controlled manner, the additive material 73 is transferred from the pockets of the pick-up roller 78 onto predetermined regions of the roll face surface (not shown) of the transfer roller 82. The additive material 73 is transferred onto the transfer roller 82 surface in essentially the same pattern as that of the spaced apart pockets on the pick-up roller 78 (i.e., the pattern applied to the paper web is dictated by the design of the pattern of the roll face of the pick-up roller 78).

The paper web 55 comprises two major surfaces, an inside surface 88 and an outside surface 90. The stream of tobacco filler 20 ultimately is deposited upon the inside surface 88 of the paper web 55, and the additive material 73 most preferably also is applied to the inside surface 88 of that web. As the paper web 55 travels across the surface of the rotating transfer roller 82, the additive material 73 on the surface of the transfer roller 82 is transferred to the inside surface 88 of the advancing paper web 55 at locations corresponding to the location of the pockets located on the roll face of the pick-up roller 78.

After the additive material 73 has been applied to the paper web 55, the web can be exposed to a sensor or detector 95 for a measurement system, such as a registration system and/or an inspection system (not shown). Preferably, the detector 95 is mounted on the frame of the cigarette making machine 10 and is positioned so as to receive information concerning the paper web 55 immediately after additive material 73 has been applied to that paper web. Typically, the detector 95 is a component of certain registration systems and inspection systems of the present invention. Suitable detector systems are described hereinafter in greater detail with reference to FIG. 15. Alternative sensors, detectors and inspection system components and description of inspection system technologies and methods of operation are set forth in U.S. Pat. No. 4,845,374 to White et al.; U.S. Pat. No. 5,966,218 to Bokelman et al.; U.S. Pat. No. 6,020,969 to Struckhoff et al. and U.S. Pat. No. 6,198,537 to Bokelman et al. and U.S. patent application Ser. No. 2003/0,145,869 to Kitao et al.; U.S. patent application Ser. No. 2003/0,150,466 to Kitao et al.; which are incorporated herein by reference.

A representative inspection system employs a capacitance detector positioned downstream from the applicator system 70. A preferred detector is a non-contact detector that can sense changes in the dielectric field of the paper web resulting from the application of additive material to certain regions of that paper web. A representative detector is a Hauni Loose End Detector, Part Number 2942925CD001500000 that is available from Hauni-Werke Korber & Co. KG. The detector is combined with appropriate electronics for signal processing. That is, the detector generates an electrical signal, and appropriate electronic circuitry is used to compare that signal relative to a programmed threshold level. Such a signal allows for graphical display of the profile of applied additive material along the length of the paper web. When application of a band of additive material does not occur as desired (i.e., a band is missing on the paper web, or the amount of additive material that is applied is not the desired amount) a signal is generated. As such, rejection of poor quality rods, and adjustments to the overall operation of the cigarette making machine, can occur. In addition, an output signal from such a measurement system can be used in a feedback control system to maintain the desired level of additive material to the paper web and/or to maintain the desired rate of feed of coating formulation to the applicator system.

Additionally, after the additive material 73 has been applied to the paper web 55, the web can be passed through an optional heating/cooling control device 120. The control device 120 can be used to alter the heat to which the paper web 55 and additive material 73 is subjected (e.g., by raising or lowering temperature). For example, the heating/cooling control device can be a heating or drying device adapted to assist in the removal of solvent (e.g., moisture) from the additive material 73 that has been applied to the paper web 55. Alternatively, for example, the heating/cooling control device can be a cooling device adapted to assist in the hardening melted additive material 73 that has been applied to the paper web 55 using a heated additive applicator system 70. Typically, the heating/cooling control device 120 has a tunnel-type configuration through which the paper web 55 is passed; and during the time that the paper web is present within that tunnel region, the paper web is subjected to heating supplied by a convection or radiant heating device, or cooling supplied by a refrigerant-type, solid carbon dioxide-type or liquid nitrogen-type cooling device.

Typically, the region of the cigarette making machine 10 where the heating/cooling device 120 is located does not afford sufficient room to provide a heating/cooling control device 120 of any appreciable size. For this reason, it is desirable to locate such an optional heating/cooling device 120 in a location that is offset from the cigarette making machine. For example, appropriately located and positioned turning bars (not shown) can be used to direct the paper web 55 outward (and optionally upward or downward) from the front face of the cigarette making machine 10, and the paper web 55 can be routed through the heating/cooling device 120 that can be supported but frame or other suitable support means (not shown), and appropriately located and positioned turning bars (not shown) can be used to direct the paper web 55 so subjected to heating or cooling back to the cigarette making machine 10 for continued use in the cigarette manufacturing process.

Optionally, though not preferably, the indicia printing assembly 65 can be modified in order to print formulations other than printing inks and intended for purposes other than product indicia. For example, the printing assembly 65 can be adapted to apply coating formulations having intended purposes other than product indicia. For example, fluid coating formulations (e.g., that incorporate pre-polymer components and are essentially absent of solvent, or that are water-based), can be applied to either the inside surface or outside surface of the paper web 55, using a suitably adapted printing assembly 65. Such coating formulations can be supplied using a pump or other suitable means (not shown) from a reservoir (not shown) through a tube or other suitable supply means (not shown). The paper web 55 having water-based additive material (not shown) applied thereto is subjected to exposure to heat or microwave radiation using heat source 126, in order to dry the coating formulation and fix additive material to the desired location on the paper web. A reflective shield or cover (not shown) can be positioned over that radiation source 126. The previously described heating/cooling control device 120 and/or the radiation source 122 also can be employed.

The paper web 55 travels toward the garniture region 45 of the cigarette making machine 10. The garniture region 45 includes an endless formable garniture conveyor belt 130. That garniture conveyor belt 130 conveys the paper web 55 around a roller 132, underneath a finger rail assembly 140, and advances that paper web over and through a garniture entrance cone 144. The entrance cone 144 also extends beyond (e.g., downstream from) the finger rail assembly 140. The right end of the garniture conveyor belt 130 is positioned adjacent to and beneath the left end of the suction conveyor system 28, in order that the stream of tobacco filler 20 carried by conveyor belt 32 is deposited on the paper web 55 in that region. The finger rail assembly 140 and garniture entrance cone 144 combine to provide a way to guide movement of an advancing tobacco filler cake 20 from the suction conveyor 32 to the garniture region 45. Selection and use of finger rail assemblies and garniture entrance cones will be readily apparent to those skilled in the art of cigarette manufacture. Alternatively, finger rail assemblies and/or garniture entrance cones that are described in greater detail hereinafter with reference to FIGS. 8-14 can be employed.

As the conveyor belt 32 and tobacco filler cake 20 travel within the finger rail assembly 140, vacuum suction applied to the inside region of the conveyor belt 32 is released. As a result, tobacco filler 20 is released from contact with the conveyor belt 32, falls downwardly from that conveyor belt through a longitudinally extending track (not shown) within the finger rail assembly 140, and is deposited onto the advancing paper web 55 at the left side of the garniture region 45 immediately below the finger rail assembly. In conjunction with the release of vacuum from the conveyor belt 32, removal of tobacco filler 20 from the conveyor belt 32 and deposit of that tobacco filler onto the moving paper web 55 is facilitated through the use of a shoe or scrape 155 or other suitable means, that is used to peel or otherwise physically remove advancing tobacco filler 20 off of the outer surface of the extreme left end of the conveyor belt 32.

The garniture section 45 includes a tongue 160 adjacent to the distal end of the finger rail assembly 140 and above the top surface of the garniture conveyor belt 130. The tongue 160 provides a commencement of constriction of the tobacco filler 20 that has been deposited on the paper web 55. Meanwhile, the garniture conveyor belt 130 begins to form that tobacco filler stream and paper web 55 into a continuous rod 170. The tongue 160 extends to a point where the paper web 55 is secured around that stream of tobacco filler. The tongue 160 and the garniture conveyor belt 130 define a passage which progressively decreases in cross-section in the direction of movement of the tobacco filler stream, such that the deposited tobacco filler stream progressively forms a substantially circular cross-section that is desired for the ultimate finished continuous cigarette rod 170.

The garniture section 45 also includes a folding mechanism 180 on each side of the garniture conveyor belt 130 located adjacent to, and downstream from, the tongue 160. The folding mechanism 180 is aligned in the direction of filler stream movement, further compresses the tobacco filler 20 within the rod that is being formed, and folds the paper web 55 around the advancing components of the forming continuous cigarette rod 170. A fashioned continuous tobacco rod that exits the tongue 160 and folding mechanism 180 then passes through an adhesive applicator 184, in order that adhesive is applied to the exposed length or lap seam region of the paper web 55. That is, the exposed length of paper web 55 then is lapped onto itself, and the adhesive is set that region in order to secure the paper web around the tobacco filler 20, thereby forming the continuous cigarette rod 170. The continuous rod 170 passes through a cutting or subdivision mechanism 186 and this subdivided into a plurality of rods 190, 191 each of the desired length. The selection and operation of suitable subdivision mechanisms 186, and the components thereof, will be readily apparent to those skilled in the art of cigarette manufacture. For example, the cutting speed of knife (not shown) within a ledger or other suitable guide 192 is controlled to correspond to the speed that the cigarette making machine 10 is operated. That is, the location that an angled flying knife (not shown) cuts the continuous rod 170 into a plurality of rods 190, 191, each of essentially equal length, is controlled by controlling the speed of operation of that knife relative to speed that the cigarette making machine supplies the continuous rod.

Typically, operation of the conveyor belt 32, garniture belt 130 and flying knife (not shown) within ledger 192 all are mechanically linked to one another by belts or other suitable means, and are driven off of the same power source (not shown). For example, for a cigarette making machine, such as a PROTOS 80 that is commercially available from Hauni-Werke Korber & Co. KG, the main motor of that cigarette making machine is used to drive operation of the conveyor belt 32, the garniture belt 130 and the flying knife. An alternate design of such a type of cigarette making machine can be provided by providing power to the flying knife from one power source, such as the motor of a servo system (not shown); and the power to the garniture belt 130 and the conveyor belt 32 can be provided from a second power source, such as the motor of a second servo system (not shown). Typically, power for operation of the garniture belt 130 is provided by suitable mechanical connection to the second power source, and the power for operation of the conveyor belt 32 is provided by suitable linkage to the operation of the garniture belt by suitably adapted timing belt systems, or other suitable means (not shown). Encoders (not shown) mechanically coupled to the first and second servo systems (not shown) provide information to a processing unit (not shown) regarding cigarette manufacturing speed, and garniture speed, respectively. The detector 95 (e.g., such as a non contact ultrasonic detector) also can be adapted to provide information regarding location of additive material 73 that has been applied to the paper web 55 to the same processing unit (not shown). Using the processing unit, the positioning of applied pattern on the paper web 55 can be compared to a specified positioning of the pattern, and the processing unit can be used to alter the speed of operation of the two servo systems relative to one another to bring cigarette rods 190, 191 that are out of specification back to within specification. For example, the speed of operation of the flying knife can be increased and/or the speed of operation of the garniture belt can be decreased until cigarette rods are determined to be back within the desired range of tolerance or within specification.

Servo control systems and the operation thereof will be readily apparent to those skilled in the art of cigarette making machine design and operation. Representative servo systems are readily available as Single Axis Controller P/N: DKC03.3-040-7FW/FWA-EDODR3-FGP-04VRS-MS, Motor P/N: MKD025-144-KP1-KN SERVO MOTOR from Indramat; Ultra 5000 Single Axis P/N: 2098-IPD-010 Motor P/N: Y-2012-1-H00AA from Allen Bradly; and Servo P/N :SC752A-001-01 Motor P/N: R34-GENA-HS-NG-NV-00 from Pacific Scientific.

Information concerning the position and speed of operation of the flying knife can be fed to a servo control system that incorporates a multi-axes programming unit. Such a servo system is available as PPC-R02-2N-N-N1-V2-NN-FW from Indramat. As such, the servo system can be used to observe and control the transfer roller to a known position relative to the flying knife. Preferred cigarette making machines, such as PROTOS machines, can possess an automatic servo-driven print displacement control systems as well as servo-driven paper tension control systems. Thus, the distance of travel of the paper web between the applicator system and the continuous cigarette rod cutoff knife can be changed; for example, when adjustments are made to correct for print displacement relative to the cut in the continuous rod or to control paper tension to avoid paper breakage. Such changes in distance of travel of the paper web can vary; and for example, the changes of as much as 35 mm in paper travel can be provided for adjustments for print displacement, and changes of as much as 20 mm in paper travel can be provided for paper tension adjustments. Thus, when any adjustments are made that result in a change in the length of the path of travel of the paper web from the applicator roller to the flying knife, the multi-axes control system can be used to make the corresponding adjustments to the speed of operation of the applicator roller. Most preferably, adjustments to the speed of operation of the applicator roller are provided at times when the applicator roller is not in the process of applying additive material to the paper web. As such, adjustments programmed to occur between the application of successive bands result in avoiding smearing of additive material on the paper web and in avoiding paper breakage. To minimize the number of reject cigarettes, adjustments can be made on a single rod resulting in only a single rejected rod, or adjustments can be made as small changes spread out over a number of cigarette rods until the application system in adjusted to be back to providing cigarettes having patterns applied at the desired locations.

Those cigarette rods 190, 191 then most preferably have filter elements (not shown) attached thereto, using known components, techniques and equipment (not shown). For example, the cigarette making machine 10 can be suitably coupled to filter tipping machine (not shown), such as a machine available as a MAX, MAX S or MAX 80 Hauni-Werke Korber & Co. KG. See, also, for example, U.S. Pat. No. 3,308,600 to Erdmann et al. and U.S. Pat. No. 4,280,187 to Reuland et al.

The cigarette making machine assembly and configuration described with reference to FIG. 1 are representative of a single cigarette making machine that provides both the tobacco filler and the patterned paper web to the garniture region of that machine. Cigarette making machine assemblies and configurations representative of those that provide the tobacco filler to the garniture region from one location, and the patterned paper web to the garniture region from another location, (i.e., multi-component systems), are described with reference to FIG. 2.

Figure 2:
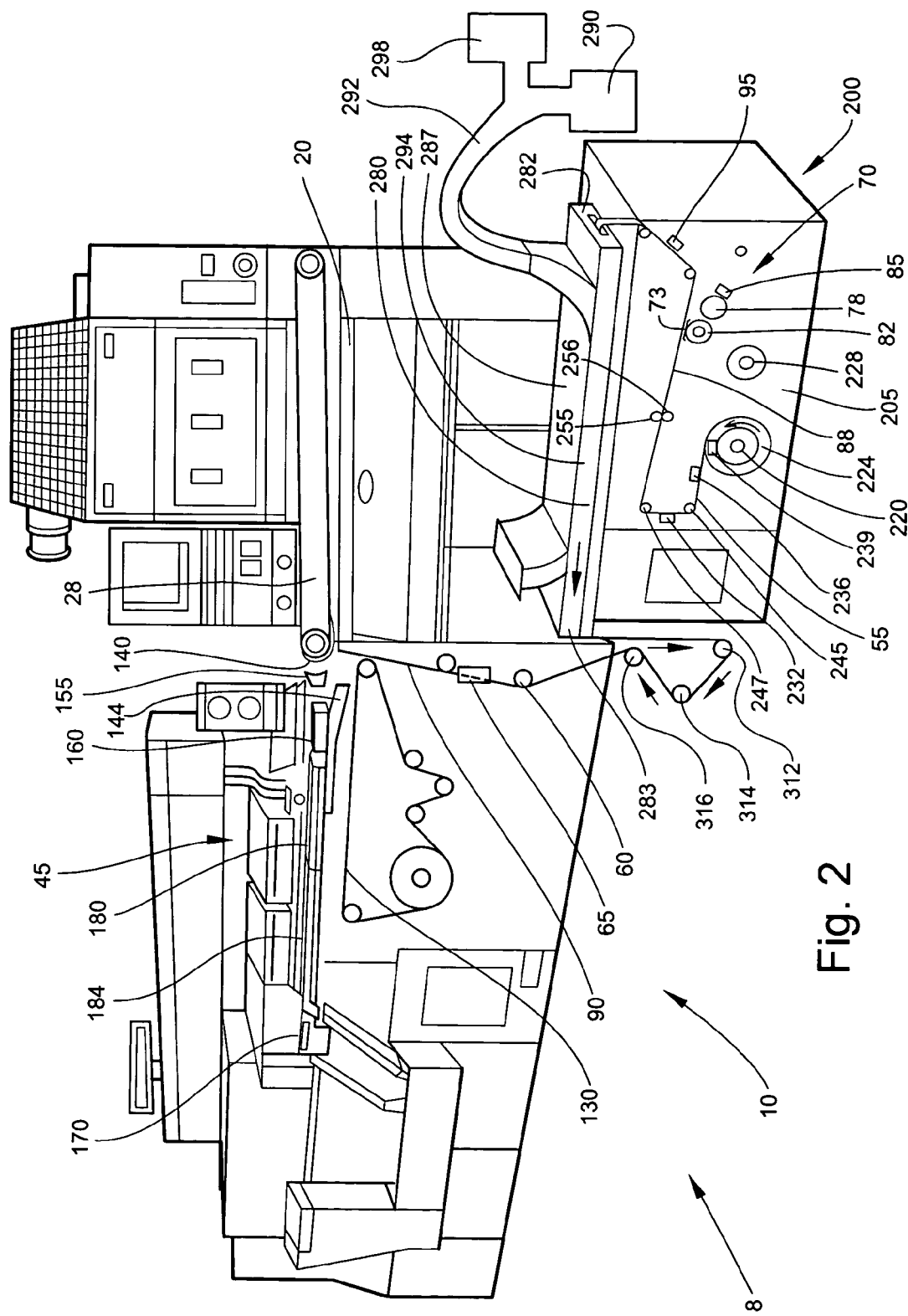
FIG. 2 is a schematic illustration of a cigarette making machine assembly including the combination of a wrapping material supply system and a cigarette making machine.

Referring to FIG. 2, there is shown a two-component automated cigarette making machine assembly 8 that is constructed by coupling a wrapping material supply machine 200 (e.g., a first component) with a cigarette making machine 10 (e.g., a second component).

A suitable wrapping material supply machine 200 can be provided by appropriately modifying a web supply unit available as SE 80 from Hauni-Werke Korber & Co. KG. See, for example, U.S. Pat. No. 5,156,169 to Holmes et al., which is incorporated herein by reference. Other suitable unwind units, such those having the types of components set forth in U.S. Pat. No. 5,966,218 to Bokelman et al., also can be employed. The supply machine 200 most preferably is a free-standing machine that is capable of providing a patterned web of wrapping material 55 to a conventional (or suitably modified) cigarette making machine 10. The supply machine 200 includes a frame 205 that supports at least one unwind spindle assembly 220 onto which a first bobbin 224 is mounted. Preferably, the supply machine 200 includes a second unwind spindle assembly 228 for a second bobbin (not shown), and a web splicing mechanism 232.

The paper web 55 is threaded through a tension sensor 236, which, in conjunction with a braking component 239 is connected to the shaft of the unwind spindle assembly, maintains a desired amount of tension on the paper web 55 as it is transferred from the bobbin 224.

In operation, a continuous paper web 55 supplied from a bobbin 58 is routed through a path defined by a series of idler rollers 245, 247 and guideposts 255, 256. The paper web 55 also is routed through an applicator system 70 that is used to apply a desired pattern of additive material 73 to the paper web 55. A representative additive material 73 is a coating formulation in a liquid, syrup or paste form. Optionally, though not preferred, the paper web can be routed through a heating/cooling control unit (not shown) immediately before the paper web passes through the applicator system 70.

A representative additive applicator 70 comprises a pick-up roller 78 and a transfer roller 82, and can be operated in essentially the same manner as described previously with reference to FIG. 1. The additive material 73 typically is provided from a supply source reservoir (not shown) through tubing (e.g., Tygon-type or polyethylene tubing) or other suitable supply means (not shown) to a port or supply region 85 near the head (i.e., infeed region) of the pick-up roller 78. If desired the supply region and the region of the pick-up roller can be supplied with heat using a suitable heating device (not shown). The additive material 73 is fed from the head of the pick-up roller into the pockets of the pick-up roller. As the pick-up roller 78 and the transfer roller 82 are engaged in roll contact, and rotate in contact with each other, the additive material 73 is transferred from the pockets of the pick-up roller 78 onto predetermined regions of the roll face surface (not shown) of the transfer roller 82. The additive material 73 is transferred onto the transfer roller 82 surface in essentially the same pattern as that of the spaced apart pockets on the pick-up roller 78 (i.e., the pattern on the paper web is defined by that pattern on the roll face of the pick-up roller). The additive material 73 most preferably also is applied to predetermined locations on the inside surface 88 of the paper web 55.

After the additive material 73 has been applied to the paper web 55, the web can be exposed to a sensor or detector 95 for a registration system and/or an inspection system (not shown). Preferably, the detector 95 is positioned so as to receive information concerning the paper web 55 immediately after additive material 73 has been applied to that paper web. Typically, the detector 95 is used in conjunction with the certain registration systems and inspection systems of the present invention. Suitable detector systems are described hereinafter in greater detail with reference to FIG. 15. Alternative sensors, detectors and inspection system components and description of inspection system technologies and operation are set forth in U.S. Pat. No. 4,845,374 to White et al.; U.S. Pat. No. 5,966,218 to Bokelman et al.; U.S. Pat. No. 6,020,969 to Struckhoff et al. and U.S. Pat. No. 6,198,537 to Bokelman et al.; which are incorporated herein by reference.

Additionally, after the additive material 73 has been applied to the paper web 55 (i.e., downstream from the applicator apparatus 70), the web can be passed through an optional, though highly preferred, heating/cooling control device 280, or other suitable means for controlling heat to which the paper web is subjected. The control device 280 can be used to alter the heat to which the paper web 55 and additive material is subjected (e.g., by raising or lowering the temperature). For example, the control device can be a heating or drying device adapted to assist in the removal of solvent (e.g., moisture) from the additive material 73 that has been applied to the paper web 55. Alternatively, for example, the heating/cooling control device can be a cooling device adapted to assist in the hardening melted additive material 73 that has been applied to the paper web 55 using a heated additive applicator system 70. Typically, the heating/cooling control device 280 has a tunnel-type configuration through which the paper web 55 is passed (through an inlet end 282 and out an outlet end 283); and during the time that the paper web is present within that tunnel region, the paper web is subjected to heating supplied using infrared convection or radiant heating devices, or cooling supplied using refrigerant-type, solid carbon dioxide-type or liquid nitrogen-type cooling devices.

The size of the heating/cooling device 280 can vary, particularly because that device is positioned and supported by a component 200 that is physically separated from, and spaced from, the cigarette making machine 10. That is, there is provided sufficient room to subject the paper web 55 to treatment using the heating/cooling device 280. Exemplary heating/cooling devices 280 have lengths of about 2 feet to about 10 feet, with lengths of about 3 feet to about 8 feet being typical, and lengths of about 4 feet to about 7 feet being desirable. The distance that the paper web 55 travels through the heating/cooling device 280 (i.e., the length of travel through that device) can vary. For example, the paper web 55 can be routed back and forth within the heating/cooling device 280 using a suitably adapted roller system configuration (not shown).

Most preferably, the heating/cooling control device 280 is used to provide radiant heating to the paper web 55. An exemplary heating and drying system 280 is available as IMS Model No. P24N002KA02 2 kW, 2450 MHz Linear Drying System from Industrial Microwave Systems, Inc. Representative types of radiant drying systems are set forth in U.S. Pat. No. 5,958,275 to Joines et al.; U.S. Pat. No. 5,998,774 to Joines et al.; U.S. Pat. No. 6,075,232 to Joines et al.; U.S. Pat. No. 6,087,642 to Joines et al.; U.S. Pat. No. 6,246,037 to Drozd et al. and U.S. Pat. No. 6,259,077 to Drozd et al.; all of which are incorporated herein by reference. Such types of radiant drying systems can be manufactured from materials such aluminum and aluminum alloys. See, also, U.S. Pat. No. 5,563,644 to Isganitis et al., which is incorporated herein by reference.

Radiant-type drying systems are preferred, because typical infrared-type drying systems require relatively long residence times to adequately remove effective quantities of solvent or liquid carrier (e.g., water) from the paper web 55. For fast moving paper webs 55 running at nominal cigarette making machine speeds, the application of sufficient heat demands the need for relatively long infrared-type drying apparatus. Additionally, sufficient heat from infrared-type drying systems requires the use of relatively high temperatures; thus providing the propensity for scorching and browning of certain areas of the paper web, and the risk of fire. For example, for a conventional cigarette making machine operating so as to produce about 8,000 cigarette rods per minute, and having bands of additive material applied to the advancing paper web so that about 1 mg of water is applied to each individual cigarette rod, about 350 to about 700 watts per hour is effectively required to remove that water from the paper web.

A microwave-type drying system is desirable because effectively high amounts of heat can be employed in controlled manners. An exemplary system is one that employs planar wave guide of about 36 inches in length, an internal width of about 1.6 inches, and an internal depth of about 3.7 inches. Preferred wave guides are of dimension to allow passage of only lowest order (i.e., $TE_{10}$) or single mode radiation. An exemplary system also can possess inlet and outlet ends 282, 283 that both have widths of about 1.75 inch and heights of about 0.37 inch. Within the inner region of the drying system, immediately within each end of the inlet and outlet ends 282, 283, are positioned choke flanges, pin chokes (not shown) or other means to assist in the prevention of escape or leakage of radiation from the system; and those flanges or pins typically extent about 3 inches into the system from each respective end.

Microwave-type drying systems can apply heat to desirable locations on the paper web 55 where heat is needed (i.e., in the printed regions of the paper web). In one preferred radiant-type drying system, microwave energy is launched at one end of a waveguide and is reflected at the other end of that waveguide, resulting in the paper web experiencing radiant energy for effectively an extended period. Precise drying control can be achieved by attenuating the microwave energy and/or the path of the paper web within the microwave drying system. Such radiant-type drying systems thus can be used to evaporate the solvent or liquid carrier (e.g., water) of the additive material formulations by applying the microwave energy uniformly throughout the patterned region (e.g., to the bands of applied additive material coating formulation).

The controls for the radiant-type dryer (e.g., the microwave control and associated safety systems) most preferably are integrated into the programmable logic controller-based (PLC-based) control system (not shown) for supervisory control. The PLC-based system (not shown) enables radiant energy production, and disables the radiant energy production when radiant energy is not needed for drying (e.g., such as when the production system is stopped or paper web experiences a break). The top and bottom regions of the wave guide of the drying system in portions of the drying region can be perforated with a plurality of perforations (not shown) to allow for the removal of moisture, without allowing radiation (e.g., microwave radiation) from escaping into the surroundings. A suitably designed shroud 287 and an electrically driven fan (not shown) can be placed over the top of those perforations in order to remove the evaporated moisture away from the paper web and remove dust from the system. If desired, the fan (not shown) also can be under the control of the PLC-based system, and as such, only operate during operation of the cigarette manufacturing system 8.

For a radiant heating system 280 for the embodiment shown in FIG. 2, radiant microwave energy is supplied by a generator 290 for electromagnetic radiation, which is located one end of that system. Typically, higher power generators are used to produce heat to remove greater amounts of moisture; and generators producing up to about 10 kW of power, and usually up to about 6 kW of power, are suitable for most applications. Radiation produced by the generator is passed through appropriate wave guides and circulators (not shown). The microwave radiation passes through a curved wave guide 292 and through a drying region 294 for the paper web 55. A typical drying region for a microwave drying system has a length of about 30 inches. As such, the radiation supplied to the drying system and the paper web 55 move in the same overall direction through that drying system. Radiation that travels through the drying region 294 is reflected by suitable reflector 296 (i.e., a short plate or reflector plate) at the other end of the drying system.

That radiation is reflected back through the drying region, back through the channel at the other end of the heating system, and as such, the reflected radiation and the paper web 55 move in an overall counter current manner relative to one another. Any remaining radiation is appropriately redirected through appropriately positioned wave guides and circulators to a dry air-cooled load 298, or other suitable radiation dissipation means. As such, the radiation is converted to heat, and the resulting heat can be removed using electrical fans (not shown) or other suitable means.

In a preferred embodiment (not shown), the positioning of the heating device 280 shown in FIG. 2 is reversed (e.g., the heating device is rotated 180°) such that the paper web 55 enters at the end of the heating device possessing the reflector 296 and exits at the end through which radiation enters the channel 292 from the generator 290. As such, radiation entering the drying system from the source of radiation and the paper web 55 travel in an overall counter current manner relative to one another.

The additive applicator 70 used in conjunction with the supply machine 200 most preferably is driven by a servo drive control system (not shown) or other suitable control means. Suitable servo-based systems and the operation thereof are described in greater detail hereinafter with reference to FIG. 15. As such, the positioning of the additive material on the paper web 55 can be controlled relative to the location that the continuous cigarette rod 170 that is manufactured using the second component 10 is cut into predetermined lengths, and hence, registration of the applied pattern of additive material on a finished cigarette can be achieved. That is, the automated cutting knife (not shown) for subdividing the continuous rod into predetermined lengths can be controlled relative to those components used to apply additive material to the paper web that is used to provide that continuous rod.

The paper web 55 exits the temperature control device 280 and is advanced to the cigarette making machine 10. Direction of the paper web 55 is provided by suitably aligned series of idler rollers 312, 314, 316 (or guideposts, turning bars, or other suitable means for directing the paper web from the first component 200 to the second component 10). Suitable pathways for travel of the paper web 55 can be provided by suitably designed tracks or tunnels (not shown). As such, there is provided a way to direct the paper web from the first component 200 to the second component 10.

The continuous paper web 55 is received from the first component 200 by the second component 10. Typically, the paper web 55 is directed from idler roller 316 to roller 60 of the cigarette making machine 10, or other suitable location. The paper web 55 travels through printing assembly 65 where indicia can be printed on the outer surface 90 of that web, if desired. The paper web 55 then travels to the garniture region 45 of the cigarette making machine 10, where there are provided components for manufacturing a continuous cigarette rod 170 by wrapping the tobacco filler 20 in the paper web. The garniture conveyor belt 130 advances that paper web through that garniture region. At the left end of the suction conveyor system 28, tobacco filler 20 is deposited from its source on the foraminous belt 32 onto the paper web 55. The garniture region 45 includes finger rail assembly 140, garniture entrance cone 144, scrape 155, tongue 160, folding mechanism 180 and adhesive applicator 184, that are employed to provide a continuous cigarette rod 170. The continuous rod 170 is subdivided into a plurality of rods (not shown), each of the desired length, using known techniques and equipment (not shown). Those rods then most preferably have filter elements attached thereto, using known techniques and equipment (not shown).

The cigarette making machine assembly and configuration described with reference to FIG. 2 are representative of cigarette making machine assemblies and configurations that can be used to provide tobacco filler 20 to a garniture region 45 from one location, and the patterned paper web 55 to the garniture region from another location. Furthermore, the representative cigarette making machine assembly (i.e., with the component that provides the patterned paper web positioned to the front and to the right of the component that incorporates the tobacco source and the garniture assembly) is such that the general direction of travel of the paper web through the wrapping material supply machine is essentially parallel to the direction of travel of the paper web through the garniture region of the cigarette making machine. However, the positioning of the wrapping material supply machine to the cigarette making machine can vary. For example, the wrapping material supply machine 200 can be positioned beside or behind the cigarette making machine; or positioned generally perpendicular to the garniture region of the cigarette making machine 10. In such circumstances, the path of travel of the paper web from the wrapping material supply machine to the cigarette making machine can be accomplished through the use of appropriately positioned idler bars and roller guides. The exact path of travel of the paper web is a matter of design choice, and the selection thereof will be readily apparent to those skilled in the art of design and operation of cigarette manufacturing equipment.

Figure 3:
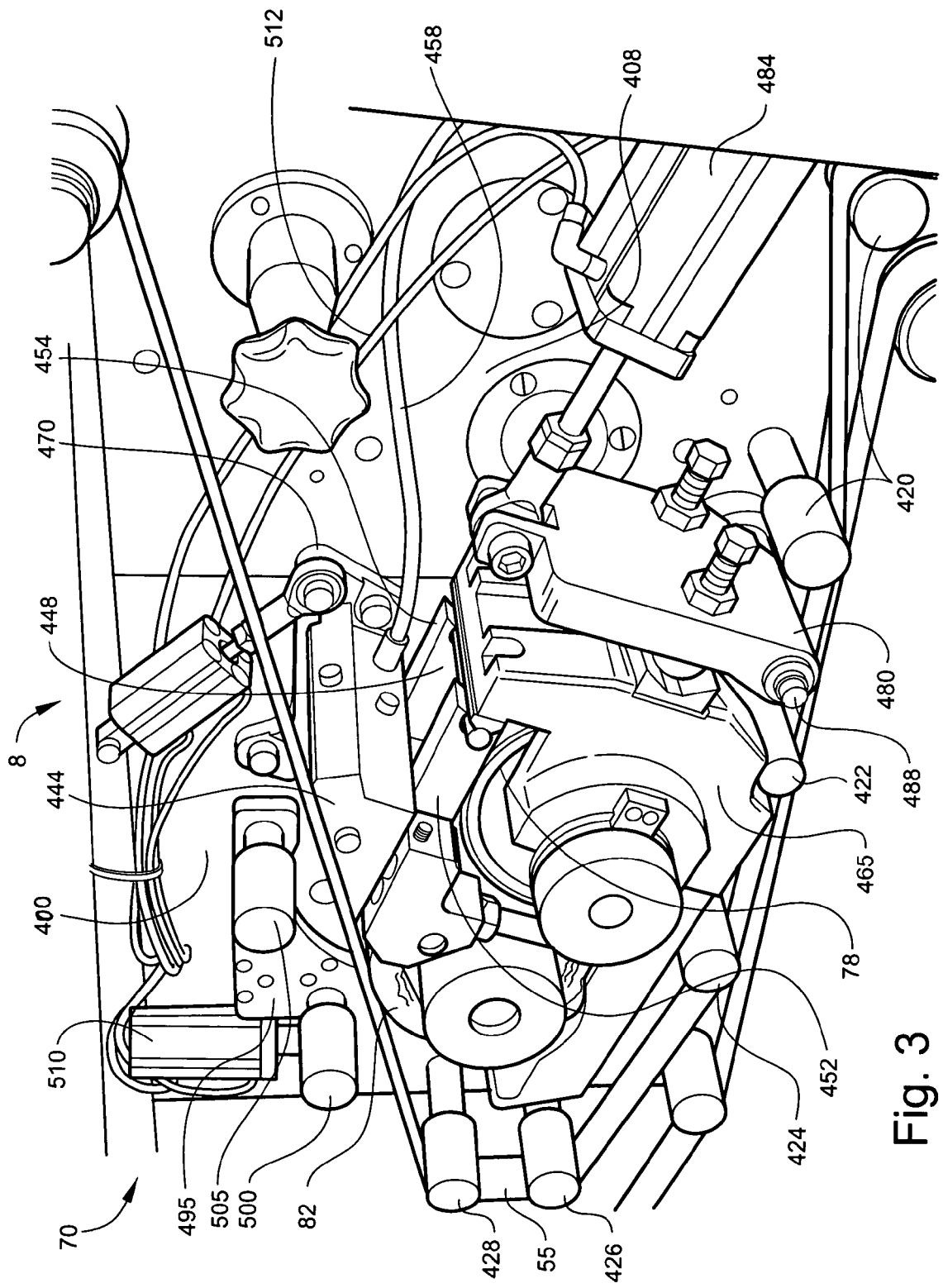
FIG. 3 is a perspective of an additive applicator apparatus of one embodiment of the present invention, that additive applicator apparatus being mounted at an appropriate location on a cigarette making machine assembly.

Referring to FIG. 3, there is shown a portion of a cigarette making machine assembly 8 of the present invention. In particular, there is shown an additive applicator apparatus 70 representative of one aspect of the present invention. Such an additive applicator 70 is particularly useful for applying to a paper web 55 additive materials that are not particularly viscous (e.g., formulations of additive materials having viscosities of less than about 1,000 centipoise).

Additive applicator 70 is an assembly that includes a pick-up roller 78 and a transfer roller 82 mounted adjacent to each other and through a first or front roller support plate 400 on the exterior front face of the cigarette making machine assembly 8. A second or rear roller support plate 408, located in the plane of and adjacent to the front roller plate 400, provides a surface to which other structures of the additive applicator 70 are mounted. Components of the additive applicator apparatus 70, including rollers 78, 82 and support plates 400, 408 are manufactured from materials such as stainless steel or hardened carbon steel. Several fixed or rotatable guide rollers 420, 422, 424, 426, 428 are suitably fixedly mounted; such as to either the front roller plate 408 or rear roller plate 410, depending upon the desired location of those guide rollers. Those guide rollers provide the path over which the paper web 55 travels from a bobbin (not shown), past the additive applicator 70, and on to other downstream destinations of the cigarette making machine assembly.

The additive applicator 70 also includes a manifold 444 positioned above an additive material reservoir 448, which is defined by the positioning of a reservoir front arm 452 and a reservoir rear arm 454. Those arms 452, 454 are positioned above the pick-up roller 78. Tubing 458, or other suitable supply means, is connected to the manifold 444 and originates at a source of additive material (not shown) to provide an input of additive material to reservoir 448, and hence to the roll face of the pick-up roller 78. That portion of the additive applicator assembly thus provides a sealed path for flow of additive material to the region where that additive material is deposited onto the pick-up roller. Preferably, the reservoir front arm 452 and rear arm 454 each include at least one port (not shown), located on the bottom sides of each of those arms 452, 454. At least one of those ports is an output port through which additive material is supplied to the roll face of the pick-up roller 78. At least one other port is an input port through which a suction pump (not shown) suctions excess additive material from the edges of the pick-up roller 78, and pumps excess additive material back into the reservoir 448 defined by arms 452, 454. The assembly also includes a collection pot 465 positioned adjacent to and slightly below the pick-up roller 78. The collection pot 465 serves as a temporary collection location for excess additive material removed from the pick-up roller 78.

The manifold 444 is attached to a glue manifold pivot plate 470, which is attached to the front roller plate 400 and the rear roller plate 408. Such attachment leaves the manifold 444 with the capability of moving upward and downward about a manifold pivot pin (not shown). Movement of the manifold 444 upward from the operative position allows access to those regions located below the manifold. Access to that region is desirable have access to the reservoir arms 452, 454, to insert, remove and service the pick-up roller 78, and for maintenance and service of the collection pot 465. In addition, the reservoir arms 452, 454, are movable upward and downward about a reservoir pivot shaft (not shown) to allow access to the pick-up roller 78 and the collection pot 465.

The transfer roller 82 and the pick-up roller 78 are positioned into operative engagement with one another using a roller pressure plate 480. The roller pressure plate 480 is operably connected to an air cylinder 484, or other suitable means for applying force to rollers 78, 82. The air cylinder 484 utilizes compressed air to force the roller pressure plate 480 about a pressure plate pivot shaft 488 into and out of engagement with the transfer roller 82. Movement of the roller pressure plate 480 to engage and disengage the pick-up roller 78 with the transfer roller 82 can programmed, and as such a microprocessor associated with the operation of the cigarette making machine can be used to control movement of that plate 480.

The additive applicator 70 further comprises a roller lift bracket 495 mounted to the front roller plate 400, and that lift bracket is movable. The roller lift bracket 495 includes a pair of rollers 500, 505, or other suitable means for controlling the path of travel of the paper web 55. The roller lift bracket 495 is operably connected to an air cylinder 510, or other suitable means for applying force to the lift bracket. The air cylinder 510 also is connected to a supply of pressurized air by an air tube 512, or other suitable connection and supply means. The air cylinder 510 utilizes compressed air to move the pair of rollers 500, 505 on the roller lift bracket 495 into and out of rotating contact with the advancing paper web 55. For example, when the rollers 500, 505 on the roller lift bracket 495 move downward into contact with the paper web 55, that paper web is likewise moved into rotating contact with roll face of the transfer roller 82. As a result of the contact of the paper web 55 with the transfer roller 82, the additive material applied to the transfer roller is transferred to the inside surface of the paper web, in a desired pattern or fashion. Movement of the roller lift bracket 495 and rollers 500, 505 into and out of contact with the paper web 55 can programmed, and as such a microprocessor associated with the operation of the cigarette making machine can be used to control movement of that bracket 495. The roller lift bracket 495 can be controlled by a signal received from the cigarette making machine, in order that the bracket can be retracted and the paper web 55 can be moved so as to not be in contact with the various rollers when the cigarette making machine is not in normal operation; and as such, problems associated with sticking of the paper web to various components of the applicator apparatus 70 are minimized, avoided or prevented.

In operation, during the process of cigarette manufacture, the pick-up roller 78 is rotated counter-clockwise, and the transfer roller 82 is rotated clock-wise. Those rollers are engaged in contact by pressure supplied by the pressure plate 480. Additive material is fed from a source (not shown) to the manifold 444, and from the manifold to the reservoir 448, from the reservoir to the roll face of the pick-up roller 78, and onto the transfer roller 82. The additive material then is transferred from the transfer roller to the paper web 55 as the paper web advances across the surface of the rotating transfer roller 82. That is, as the paper web 55 advances across the surface of the rotating transfer roller 82, the roller lift bracket 495 is moved downward, and the rollers 500, 505 attached to that roller lift bracket are moved into contact with the advancing paper web 55. As a result, the additive material on the surface of the transfer roller 82 is transferred to the inside surface of the advancing paper web 55 at locations corresponding to the pattern on the roller face of the transfer roller 82. The paper web 55 having additive material applied thereto then is advanced to downstream locations of the cigarette making machine.

Figure 4:
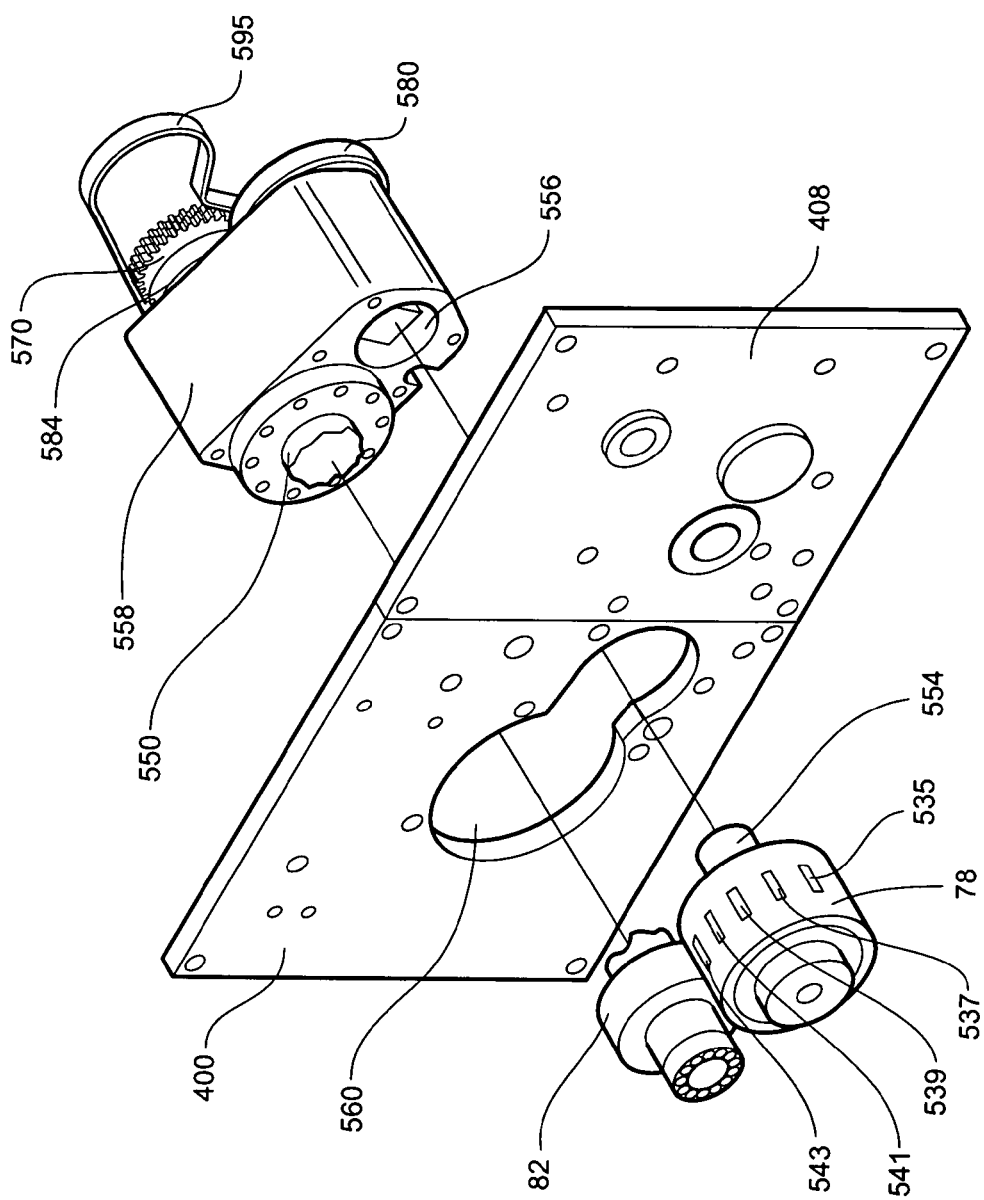
FIG. 4 is an exploded perspective of an additive applicator apparatus of the type shown in FIG. 3.

Referring to FIG. 4, there is shown a portion of an additive applicator apparatus 70 representative of one aspect of the present invention. The pick-up roller 78 and the transfer roller 82 are shown roll contact with one another and in operative engagement. Pick-up rolled possesses a roll face having a pattern of recessed grooves, or pockets, 535, 537, 539, 541, 543, having the form of spaced bands, or other desired pattern. Those recessed grooves provide a location for a predetermined amount of additive material to be deposited, and the size and shape of those grooves is a matter of design choice. The pick-up roller 78 is rotated using a pick-up drive shaft 550 (shown as cut away); and the transfer roller 82 is rotated using an applicator drive shaft 554 (shown as extending from opening 556 in the applicator drive shaft box 558. The drive shafts 550, 554 extend through an opening 560 in the front roller support plate 400, which is adjacent the rear roller support plate 408. The pick-up roller 78 and the transfer roller 82 are adapted to extend beyond the front faces of each of the front and rear roller plates 400, 408.

The applicator drive shaft box 558 is adapted to be positioned and secured to the back side of the front and rear roller plates 400, 408. A pick-up roller gear 580 is in operative connection with the pick-up drive shaft 550. A transfer roller gear 584 is in operative connection with the applicator drive shaft 554. Both gears 580, 584 are located external to the applicator drive shaft box 558, and are positioned on the back side of that drive shaft box 558. Those gears 580, 584 have interlocking teeth such that rotation of one of those gears in one direction causes rotation of the other gear in the opposite direction. The transfer roller gear 584 is connected to a transfer roller pulley 590. A belt 595 extends about the transfer roller pulley 590 and around a power source pulley (not shown). As a result, power for rotational movement is provided to the transfer roller shaft 550 and transfer roller 82 by rotation of the pulley 590 by movement of the belt 595; and power for controlled rotational movement is provided to the pick-up roller 78 by way of the drive shaft 550 that is rotated by operation of gears 580, 584. In addition, belt 595 can act as a timing belt, and by suitable use of that belt to control the speed of the applicator drive shaft 554 relative to the speed of operation of the cigarette making machine, it is possible to provide integral timing with the cigarette rod subdivision mechanism (not shown) of the cigarette making machine. Thus, appropriate use of belt 595 to connect appropriate gear mechanisms yields a method for providing pattern (e.g., band) registration for each individual finished cigarette rods (not shown) that are cut from the continuous rod (not shown).

The applicator assembly 70 of the present invention can further include a photoelectric sensor switch (not shown) located above a point of roller engagement between the pick-up roller 78 and the transfer roller 82. An exemplary sensor is a WT 12-2P430 from Sick, Inc. Output from the photoelectric proximity switch is sent to a PLC or other suitable processor (not shown) associated with that photoelectric sensor (not shown) and monitors the amount (e.g., level) of additive material (not shown) in the region above that point of roller engagement of rollers 78, 82. Thus, as a flow of additive material is supplied from the manifold 44 and reservoir 448, an amount of the additive material forms at the point of engagement between those rollers 78, 82. When the amount of that additive material supplied to that region drops below a predetermined level for sufficient desired transfer of the additive material to the transfer roller 82, the information sensed and supplied by photoelectric sensor controls a switch to activate a pump (not shown), and hence to supply more additive material to the reservoir 448. Similarly, deactivation of the pump can be controlled when a desired level of additive material is achieved.

The applicator assembly 70 can further include sensors (not shown) that assist in ensuring that proper amounts of additive material is transferred to the paper web. For example, an induction-type sensor (not shown) located in the region of a pick-up roller 78 can sense that the pick-up roller, and other associated components of the applicator assembly, are in proper position. In addition, the cigarette making machine can be programmed such that when the induction sensor detects that the pick-up roller is not in proper position, that machine can provide appropriate signal to the operator or cease operation. In addition, a further sensor (not shown) can be mounted on the rear roller plate 408 at a location of the paper web after that paper web has passed over the transfer roller 82. That further sensor can be used to detect the presence, or degree of presence, of additive material on the paper web 55. Detection of a sufficient presence of additive material on the paper web 55 indicates that additive material transfer mechanisms are operating properly. The cigarette making machine can be programmed to alert the machine operator or stop movement of the paper web 55 if the further sensor detects an insufficient presence of the additive material on the paper web 55.

Figure 5:
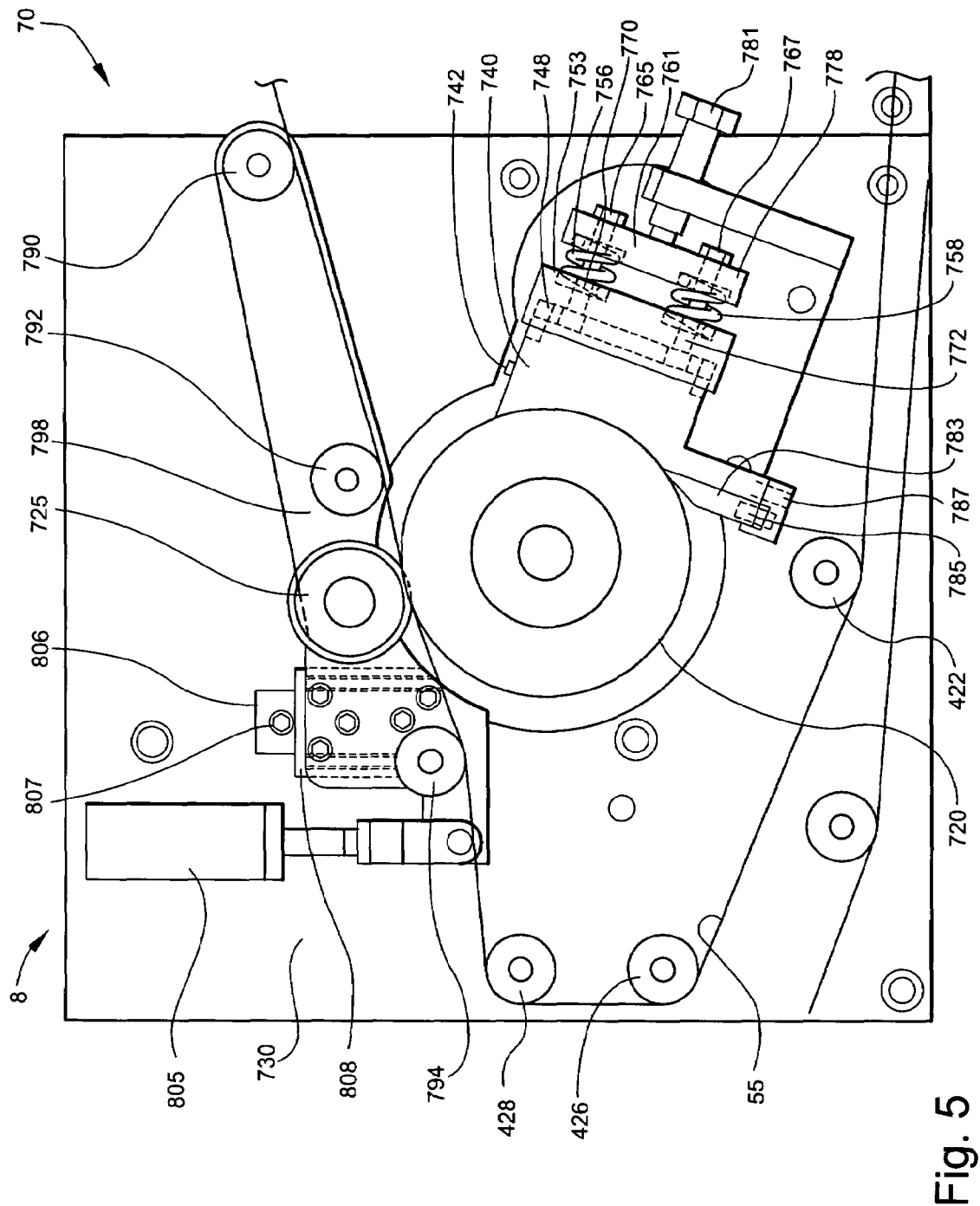
FIG. 5 is a schematic illustration of an additive applicator apparatus of one embodiment of the present invention.

Referring to FIG. 5, there is shown a portion of a cigarette making machine assembly 8 of the present invention; and there also are shown relevant components of another representative embodiment of an additive applicator apparatus 70 of the present invention. Such an applicator 70 is particularly useful for applying to a paper web 55 more viscous additive materials, than those embodiments described previously with reference to FIGS. 3 and 4. More viscous additive materials useful in applications involving cigarette paper include, for example, formulations of additive materials having viscosities of greater than 100,000 centipoise. Such higher viscosity additive materials can be characterized as pastes.

Additive applicator 70 is an assembly that includes a major pick-up/transfer roller 720 and a transfer pressure roller 725 (or back-up roller) mounted adjacent to each other and through a front roller plate 730 secured to front exterior of a cigarette making machine. Each of a plurality of rollers 422, 426, 428 is fixedly mounted to the front roller plate 730; and those rollers provide guides for a path over which the paper web 55 travels from a bobbin (not shown) to the additive applicator 70 and on to other regions of the cigarette making machine 8.

Positioned adjacent to the major roller 720 is a reservoir 740 for the additive material. The reservoir is maintained in place and secured to the front roller plate 730 by bolts (not shown) or other suitable connection means. The reservoir 740 is connected to a source (not shown) of additive material (e.g., a formulation having the form of a paste), through port 742 near the top region of the reservoir 740. As such, a source of additive material for the major roller 720 is provided. Typically, the additive material is supplied through tubing (not shown), such as Tygon-type tubing, that feeds the reservoir 740 through port 742. The additive applicator 70 provides a sealed path for flow of the additive material to the point of deposit onto the major roller 720. The reservoir 740 includes at least two ports (not shown) on the side thereof adjacent to the major roller 720. One port is an output port positioned near the middle of the reservoir 740, through which additive material is supplied to the major roller 720. At least one other port is an input port through which excess additive material is scraped from the edges of the major roller 720, and is fed back into the reservoir 740.

The reservoir 740 is attached to an assembly that is designed to exert pressure upon that reservoir. Such a pressure exerting assembly includes a reservoir pad 748 that is positioned adjacent to the reservoir 740. The reservoir pad 748 is held in position by a reservoir pad retainer 753, which encompasses the reservoir pad 748. Compression springs 756, 758 are positioned between the reservoir pad retainer 753 and a reservoir spring retainer 761, and provide resistance for tightening of the reservoir spring retainer 761 toward the reservoir 740. Screws 765, 767, or other suitable connection means, are positioned through each side of the reservoir spring retainer 761, through the center of each respective compression spring 756, 758, and through a passage in each side of the reservoir pad retainer 753. The screws 765, 767 are movable in and out of respective passages 770, 772 of the reservoir pad retainer 753. The threaded ends of the screws 765, 767 are positioned in threaded contact with threaded walls of the passages 770, 772 of the reservoir pad 748 so as to supply the application of pressure to the reservoir pad 748 when pressure is exerted against the reservoir spring retainer 761.

An adjustment screw mounting plate 778 is attached to the front roller plate 730 adjacent to the reservoir spring retainer 761. An adjustment screw 781 is threaded through the adjustment screw mounting plate 778 into contact with the reservoir spring retainer 761. When the adjustment screw 781 is adjusted a predetermined amount inward into increasingly compressive contact with reservoir spring retainer 761, pressure is applied by the screws 765, 767 to the reservoir pad 748. As a result, a predetermined amount of pressure is exerted on the paste reservoir 740. The additive material formulation is caused to flow to the reservoir 740 by application of head pressure supplied from an upstream pumping system (not shown) or other suitable means. The additive applicator 70 also can be equipped with sensors and control devices (not shown) of the type described previously with reference to FIG. 4.

A scraper plate 783 is connected to the reservoir 740. A compression spring 785 is positioned between a scraper 783 and the scraper plate 787 such that the scraper is urged into operative contact with the roll face of the major roller 720. As such, excess additive material on the surface of the roll face of the major roller 720 is scraped from that roll face as the moving major roller passes the scraper, and that material is deposited back into the reservoir 740. Thus, additive material carried by the major roller 720 for transfer to the paper web is located in the desired location; within the pockets located on the roll face of that roller.

Rollers 790, 792, 794 together with transfer pressure roller 725 are positioned on a roller lift bracket 798. The roller lift bracket 798 is designed to be moved downward by the forces applied by air cylinder 805 about a lift bracket pivot plate 806. The air cylinder 805 is connected to a source of pressurized air (not shown), and is employed to provide for movement of the roller lift bracket 798. The roller lift bracket 798 is attached on one end to the front roller plate 730 about lift bracket pivot plate 806 through roller lift bracket pivot pin 807, and the lift bracket 798 is movable. The roller lift bracket 798 further includes a lift bracket pivot sleeve 808, which is slidingly attached on the end opposite the pivot pin 807 to lift bracket pivot plate 806.

In operation, the transfer pressure roller 725 and rollers 790, 792, 794 can be moved about the pivot pin 807 so as to be positioned into and out of contact with the upper surface of the paper web 55. When the transfer pressure roller 725 is moved into operative contact with the major roller 720, the transfer pressure roller 725 rotates under the power of the major roller 720, but in the opposite direction to that of the major roller. Preferably, the major roller 720 rotates clockwise, and the transfer pressure roller 725 rotates counter-clockwise. The transfer pressure roller 725 thus preferably contacts the advancing paper web 55 at a point of engagement of the roll faces of the transfer pressure roller 725 and the major roller 720. As a result of the pressured contact experienced by the paper web 55 as it travels between transfer pressure roller 725 and the major roller 720, additive material is applied to the paper web 55 in a predetermined pattern. Movement of the roller lift bracket 798, transfer pressure roller 725, and rollers 790, 792, 794 into and out of contact with the paper web 55 can programmed, and as such a microprocessor associated with the operation of the cigarette making machine can be used to control movement of that lift bracket 798. The roller lift bracket 798 can be controlled by a signal received from the cigarette making machine, in order that the bracket can be retracted and the paper web 55 can be moved so as to not be in contact with the various rollers when the cigarette making machine is not in normal operation; and as such, problems associated with sticking of the paper web to various components of the applicator apparatus 70 are minimized, avoided or prevented.

Figure 6:
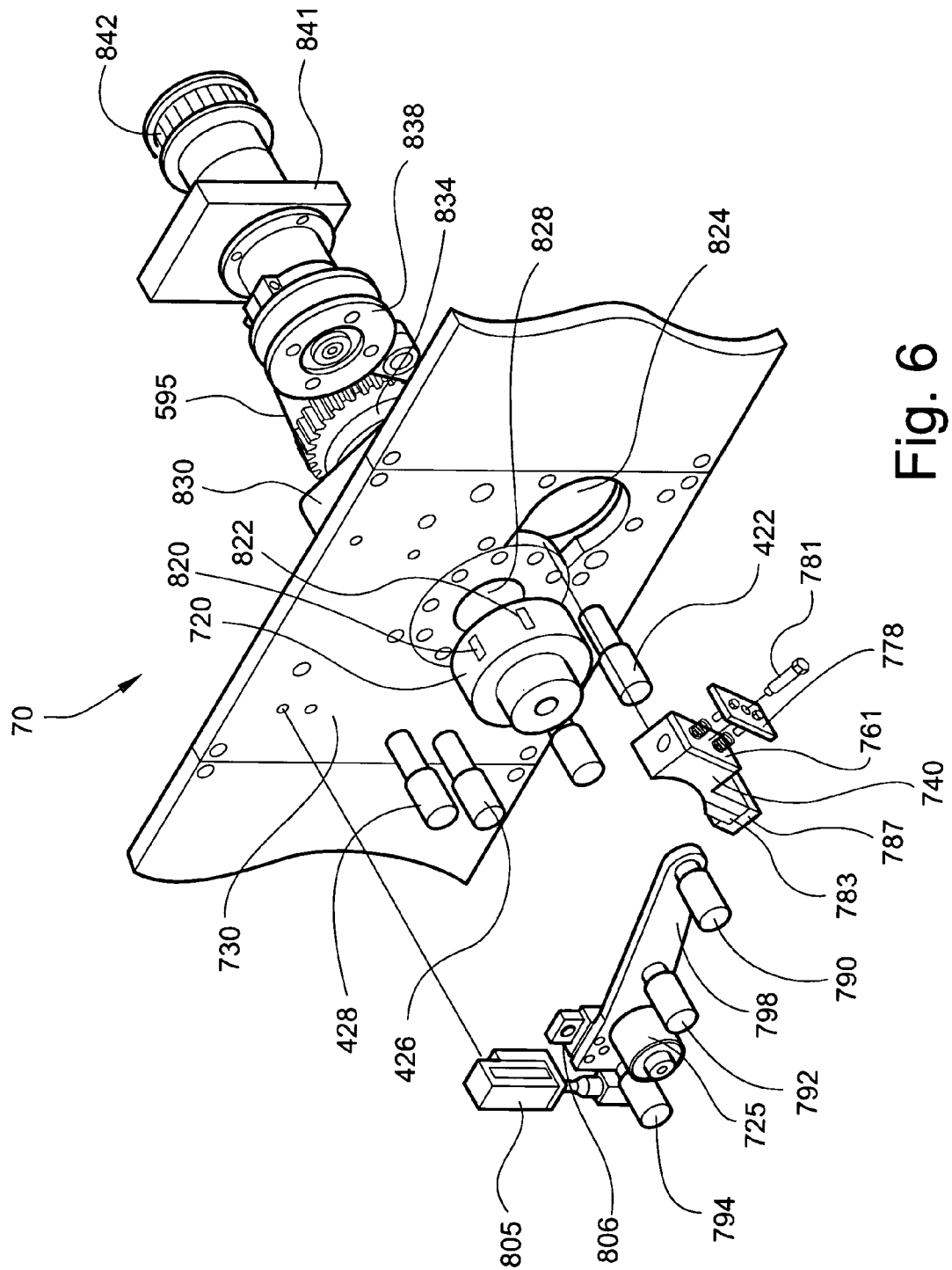
FIG. 6 is an exploded perspective of an additive applicator apparatus of the type shown in FIG. 5.

Referring to FIG. 6, there are shown relevant components of a portion of an additive applicator apparatus 70 representative of one aspect of the present invention. The major roller 720 possesses a roll face having a pattern of recessed grooves or pockets 820, 822; thus providing a pocketed wheel. The diameter of the major roller can vary, but suitable major roller has a diameter of about 104 mm. Exemplary grooves provide spaced bands located so as to extend perpendicularly to the longitudinal axis of a paper web and across a portion of the width of that paper web, and are generally box-like in shape. The dimensions of the grooves can vary, and are dependent upon factors such as the pattern of application that is desired; but suitable grooves have depths of about 2 mils, longitudinally extending lengths of about 5 mm, and transversely extending lengths of about 23 mm. Those grooves 820, 822 are designed to contain additive material (not shown) and to transfer that additive material to a paper web (not shown) that contacts that roller face as the paper web travels past the roll face of the major roller 720. As such, for the pattern shown, spaced apart bands are applied at predetermined intervals transversely to the longitudinal axis of the continuous paper web. That is, the recessed grooves 820, 822 provide a location for a predetermined amount of additive material to be deposited on a paper web; and the size and shape of those grooves is a matter of design choice. The major roller 720 is manufactured from materials such as stainless steel, hardened carbon steel, or the like.

The roller lift bracket 798 supports rollers 790, 792, 794 and back-up roller 725. Back-up roller 725, or "soft-faced" roller, typically is manufactured from stainless steel or hardened carbon steel, and the roll surface is provided by an overlying band or ring of a suitable material such as a rubber-type or elastomeric material. Suitable "soft-faced" rollers 725 are adapted from those types of commonly used for component parts of conventional cigarette making machines, and are manufactured from materials commonly used in conventional cigarette making machines. The roller lift bracket also supports the air cylinder 805 and the pivot plate 806. The diameter of the back-up roller 798 can vary, but a suitable back-up roller has a diameter of about 40 mm.

The reservoir 740 for the additive material is assembled along with the reservoir spring retainer 761, the adjustment screw mounting plate 778, the adjustment screw 781, scraper 783 and the scraper plate 787.

Positioned on the front roller plate 730 are a plurality of rollers 422, 426, 428 and an opening 824. The major roller 720 is connected to a roller drive shaft 828 that passes through opening 824 and to an applicator drive shaft box 830 that is in turn connected to a roller gear 834. A belt 595 extends about the roller gear 834 and around a pulley 838 mounted to a power drive assembly 841. Rotational power is provided from the power drive assembly 841 to the roller gear 834 to the roller shaft 828 and to the major roller 720. Timing belt pulley 842 can be used to receive input regarding the speed of operation of the cigarette making machine, and hence can be use in conjunction with a belt (not shown) to time operation of the other components of the applicator apparatus 70.

Figure 7:
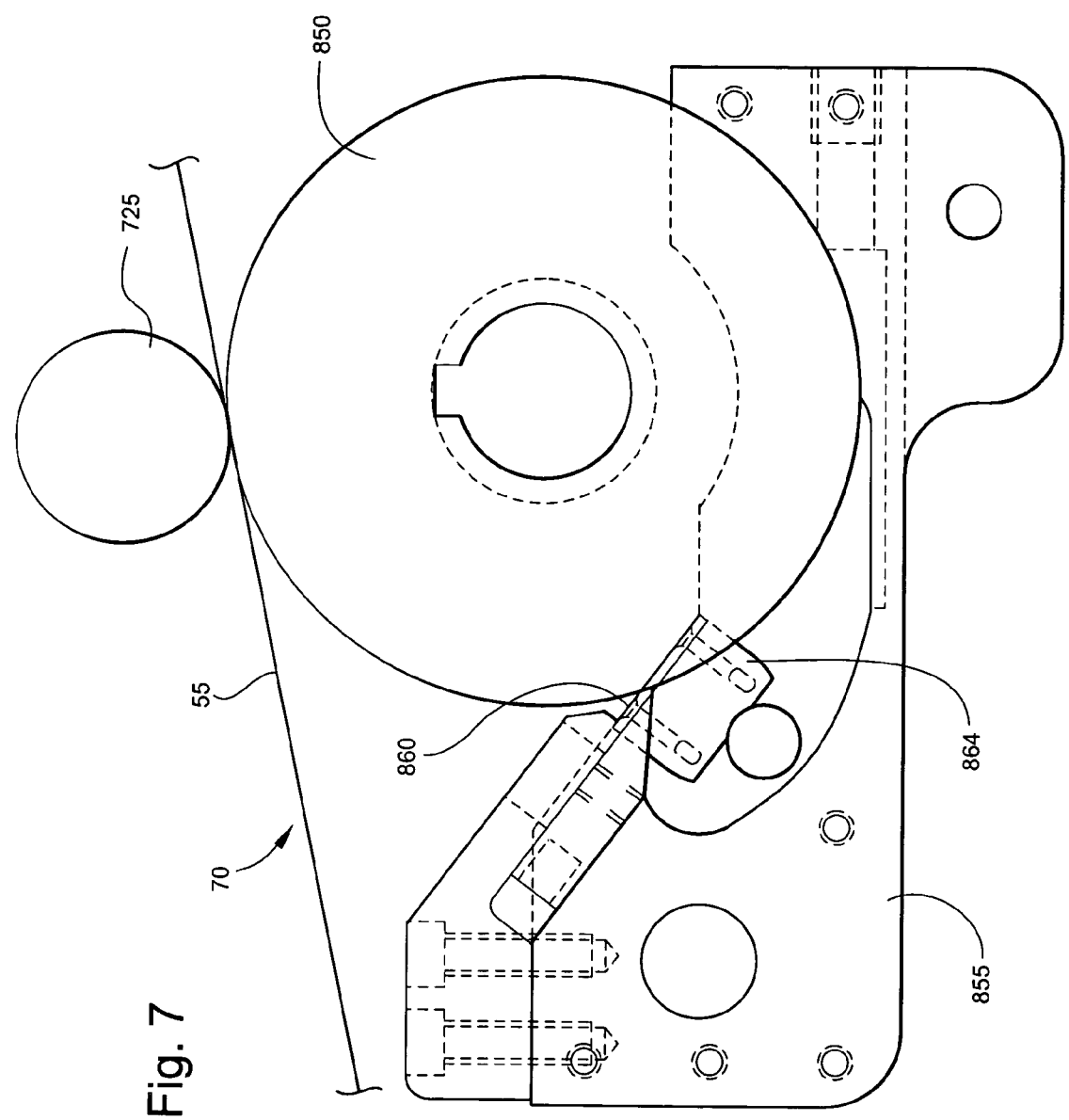
FIG. 7 is a schematic illustration of an additive applicator apparatus of one embodiment of the present invention.

Referring to FIG. 7, there are shown relevant components of a portion of yet another additive applicator apparatus 70 representative of one aspect of the present invention. Other components of the additive applicator apparatus, and the general operation thereof, are described previously with reference to FIGS. 5 and 6. Such an applicator 70 is particularly useful for applying to a paper web 55 more viscous additive materials. More viscous additive materials useful in applications involving cigarette paper include, for example, paste-type formulations of additive materials having viscosities of greater than 100,000 centipoise.

Additive applicator 70 is an assembly including a major pick-up/transfer roller 850 that is generally similar to that pocketed roller described previously with reference to FIGS. 5 and 6. For example, the diameter of the major roller 850 can be about 104 mm, and the major roller can be manufactured from materials such as stainless steel, hardened carbon steel, and the like. Several rollers (not shown) are fixedly mounted to the front roller plate 730; and those rollers provide guides for a path over which the paper web 55 travels from a bobbin (not shown) to the additive applicator 70, between the roll faces of major roller 850 and back-up roller 725, and on to other regions of the cigarette making machine 8.

Positioned adjacent to the major roller 850 is a reservoir 855 for the additive material. The reservoir is maintained in place and secured to the front roller plate 730 by bolts (not shown) or other suitable connection means. The reservoir 855 is connected to a source (not shown) of additive material (e.g., a formulation having the form of a paste), through the top region of the reservoir 855. As such, a source of additive material for the major roller 850 is provided. A portion of the reservoir 855 is shown in phantom in order to show more clearly the positioning of a portion of the major roller 850 within the reservoir, and to more clearly show the positioning of the scrapers 860, 864 against the roll face and side, respectively, of the major roller. Typically, the additive material is supplied through tubing (not shown), such as Tygon-type tubing, that feeds the reservoir 850 through a port (not shown). The additive applicator 70 provides a path for flow of the additive material to the point of deposit onto the major roller 850.

A scraper 860 is connected to the body of the reservoir 855. The scraper 860 is urged into operative contact with the roll face of the major roller 850. As such, excess additive material on the surface of the roll face of the major roller 850 is scraped from that roll face as the moving major roller passes the scraper, and that material is deposited back into the reservoir 855. Thus, additive material carried by the major roller 850 for transfer to the paper web is located in the desired location; within the pockets located on the roll face of that roller. Against the front side face of major roller 850 is positioned a scraper 864. A corresponding scraper (not shown) is positioned against the back side face of the major roller 850. As such, the roll face and both side faces are subjected to surface treatment by three scraper pieces arranged in a "U"-like configuration, so as to remove undesirable excess additive formulation from those surfaces, and hence, maintain those surfaces relatively clean by maintaining those surfaces relatively free of build up of coating formulation.

Referring to FIG. 8, there is shown one finger rail 925 of a finger rail assembly representative of one aspect of the present invention. That finger rail 925 is referred to as the "outside" finger rail, and an exemplary finger rail has a length of about 22 cm. Exemplary finger rails and finger rail assemblies that can be modified in accordance with one aspect of the present invention are commercially available, and the design and use of finger rails and finger rail assemblies in cigarette making machines will be readily apparent to those skilled in the art of cigarette making machine design and operation.

Finger rail 925 includes a downwardly extending outside finger rail protrusion or projecting arm 928 that gradually narrows to form a blade-like lower face 929. At its garniture end 931, the bottom portion of the finger rail 925 curves gradually upward and with a gradually increasing angle towards the extreme garniture end 931. The finger rail 925 is adapted to include an air chamber or manifold 934, or other means for distributing and defining passage of air flow within the finger rail. A typical manifold 934 has a length of about 15 cm, a width of about 5 mm, and a depth of about 4 mm. Such a manifold 934 can be provided by drilling out, or otherwise fashioning, that region of a conventional finger rail that is manufactured from a material such as stainless steel, hardened carbon steel, or other suitable metal alloys. Preferably, as shown, the manifold is aligned so as to extend lengthwise in a generally parallel manner relative to the axis that defines the length of the finger rail. The finger rail 925 also includes an air passageway 947 extending through the finger rail and into the manifold 934, near the garniture end 931 of that finger rail; and as such an air passageway extends entirely through the finger rail. The air passageway 937 provides a path for the flow of air into the manifold 934 that is supplied from a source of pressurized air (not shown) through a tube or other suitable connection means (not shown) from the back side of the finger rail 925 (i.e., the air passageway 937 provides a means for introducing air flow to the air distribution means).

Extending generally downward from the manifold 934 and along the outside face of the finger rail 925 are several narrow air channels 940, 941, 942. Those air channels, grooves or passageways are formed, drilled, cut, etched or otherwise fashioned in the lower region of the finger rail 925 along the length of the manifold. Thus, the air flow passageways 940, 941, 942 are in air flow communication with the manifold, and those air flow passageways provide for exit of high velocity air flow from the finger rail. The number of air channels can vary, and can be a manner of design choice. However, the number of air flow passageways typically can range from about 15 to about 30, with about 18 to about 28 being preferred. Typically, the air flow passageways are spaced about 6 mm apart, and the width of each air flow passageway is about 20 mils. The plurality of air channels 940, 941, 942 can be positioned in a random or predetermined pattern, and the air channels all can point in the same direction (e.g., generally downward) or air channels can multi-directional in nature (e.g., the air channels can point generally downward, downward and inwardly, downward and outwardly, and the like).

The finger rail 925 further includes a manifold cover (not shown), that covers the outer side of the finger rail in order that air flow from the air passageway 937 passes through the manifold 934 and out the plurality of air channels 940, 941, 942 directed out from the bottom of the finger rail. The manifold cover typically has the form of a metal plate that is secured in place to the finger rail 925 over the manifold 934 using epoxy-type cement, spot weld, or other suitable means. Covering the manifold 934 ensures the desired passage of high velocity air out of the air passageways 940, 941, 942.

Referring to FIG. 9, there is shown one finger rail 950 of a finger rail assembly representative of one aspect of the present invention. That finger rail 950 is referred to as the "inside" finger rail, and is designed to form a finger rail assembly when used in conjunction with the "outside" finger rail previously described with reference to FIG. 8. The overall design and appearance of the inside finger rail 950 is generally similar in many regards to that of the previously described outside finger rail. However, the corresponding finger rails are designed to have a somewhat "mirror image" or a "left handedness/right handedness" relative to one another.

At its garniture end 952, the bottom portion of the finger rail 950 curves gradually upward. The finger rail 950 also is adapted to include an air chamber 954 or manifold. The finger rail 950 also includes an air passageway 956 extending through the finger rail and into the manifold 954, near the garniture end 952 of that finger rail. Extending downward from the manifold 954 along the outside face of the finger rail 950 are several narrow air channels 960, 961, 962. Those air channels are formed, drilled, cut, etched or otherwise fashioned in the lower region of the finger rail 925 along the length of the manifold. Most preferably, those air channels 960, 961, 962 are positioned in a staggered, pattern along the lower region of the manifold 954. The finger rail 950 further includes a manifold cover (not shown).

Referring to FIG. 10, there is shown one finger rail 980 of a finger rail assembly representative of another aspect of the present invention. That finger rail 980 is referred to as the "outside" finger rail. Exemplary finger rails and finger rail assemblies that can be modified in accordance with this aspect of the present invention also are commercially available, and the design and use of finger rails and finger rail assemblies in cigarette making machines will be readily apparent to those skilled in the art of cigarette making machine design and operation.

The overall design and appearance of finger rail 980 is generally similar in many regards to that of the outside finger rail previously described with reference to FIG. 8. The finger rail 980 is adapted to include a generally longitudinally-extending relief channel 982 cut or otherwise fashioned along the lower outer face of the finger rail. The finger rail 980 includes a tube 985 for air passage, and preferably, the tube has a generally circular cross sectional shape. The tube 985 extends along the relief channel 982, and as such, the tube is aligned so as to extend lengthwise in a generally parallel manner relative to the axis that defines the length of the finger rail. The tube 985 is secured to the finger rail 980 using epoxy-type cement, spot weld, or other suitable attachment means. The tube 985 provides a path for the flow of air that is supplied to the other end of that tube from a source of pressurized air (not shown) through a tube or other suitable connection means (not shown) from a region relatively remote from the finger rail 980. That is, it is preferable that one end 986 of the tube 985 is open to receive a source of high velocity air, and the other end 987 of tube 985 is sealed or closed to as to prevent the exit of air flow therefrom. The inner diameter of tube 985 can vary, but typically such a tube can have an inner diameter of about 2 mm to about 5 mm.

The tube 985 includes a plurality of air distribution outlets 988, 989, 990 that extend along its length, and in its lower region; such that air passing through the tube flows out of those outlets and is directed generally downward. As such, the tube 985 is in functional alignment with the finger rail. A typical tube 985 possesses air distribution outlets extending about 15 cm along its length. The air distribution outlets 988, 989, 990 are a series of small openings or narrow passageways arranged, and those passageways can be positioned in a predetermined, random or staggered pattern. By "staggered" is meant that the various air channels are arranged in a non-linear fashion, the distances between individual air channels are not necessarily all the same, or the various air channels direct air in different directions. One representative pattern of air channels is composed of two longitudinally-extending rows that are offset from one another (e.g, in a zig zag type pattern), and the openings of the inside row are designed to direct air flow generally straight downward, and the openings of the outside row are designed to direct air flow downward and outward.

The dimensions of the air passageways 988, 989, 990 can vary, but suitable air passageways are small openings. The cross sectional shape of those openings can vary, but suitable openings of generally circular cross sectional shape often are about 20 mils in diameter. Normally, the number of those narrow air channels extending downward from the tube 985 ranges from about 15 to about 30, with about 18 to about 28 being preferred.

Referring to FIG. 11, there is shown one finger rail 995 of a finger rail assembly representative of one aspect of the present invention. That finger rail 995 is referred to as the "inside" finger rail, and is designed to form a finger rail assembly when used in conjunction with the "outside" finger rail previously described with reference to FIG. 10. The overall design and appearance of the inside finger rail 995 is generally similar in many regards to that of the outside finger rail previously described with reference to FIG. 10. The finger rail 995 also is adapted to include tube 998 for air passage. Extending downward from the tube 998 are several narrow air channels 1005, 1006, 1007, preferably in a staggered arrangement. Those air channels are located in the lower region of the finger rail 995 along a portion of the length of the tube 998.

The finger rails that are described with reference to FIGS. 8 through 11 are properly assembled into finger rail assemblies on cigarette making machines. In operation, those finger rail assemblies are provided with a supply of pressurized air that enters the relevant air passageways and chambers of the finger rails. That moving air then passes out of the numerous air distribution outlets that direct the flow of air generally downward. The relative dimensions (e.g., the inside diameters) of the various air distribution outlets depend upon factors such as the desired rate of air flow and related fluid dynamics. For most applications, an air flow rate is determined by experimentation, and the amount of airflow employed to provide the desired or optimum operation is a matter of design choice. In a preferred embodiment, the supply of pressurized air provides a continuous flow of air sufficient to reach each air distribution outlet along the length of an air supply tube or manifold, such that a substantially equal rate of air flow from each air distribution outlet is achieved. A consistent air flow rate from each finger rail air distribution outlet in a staggered pattern has the tendency to promote formation of the desired turbulent air flow pattern below the finger rail assembly.

Figure 12:
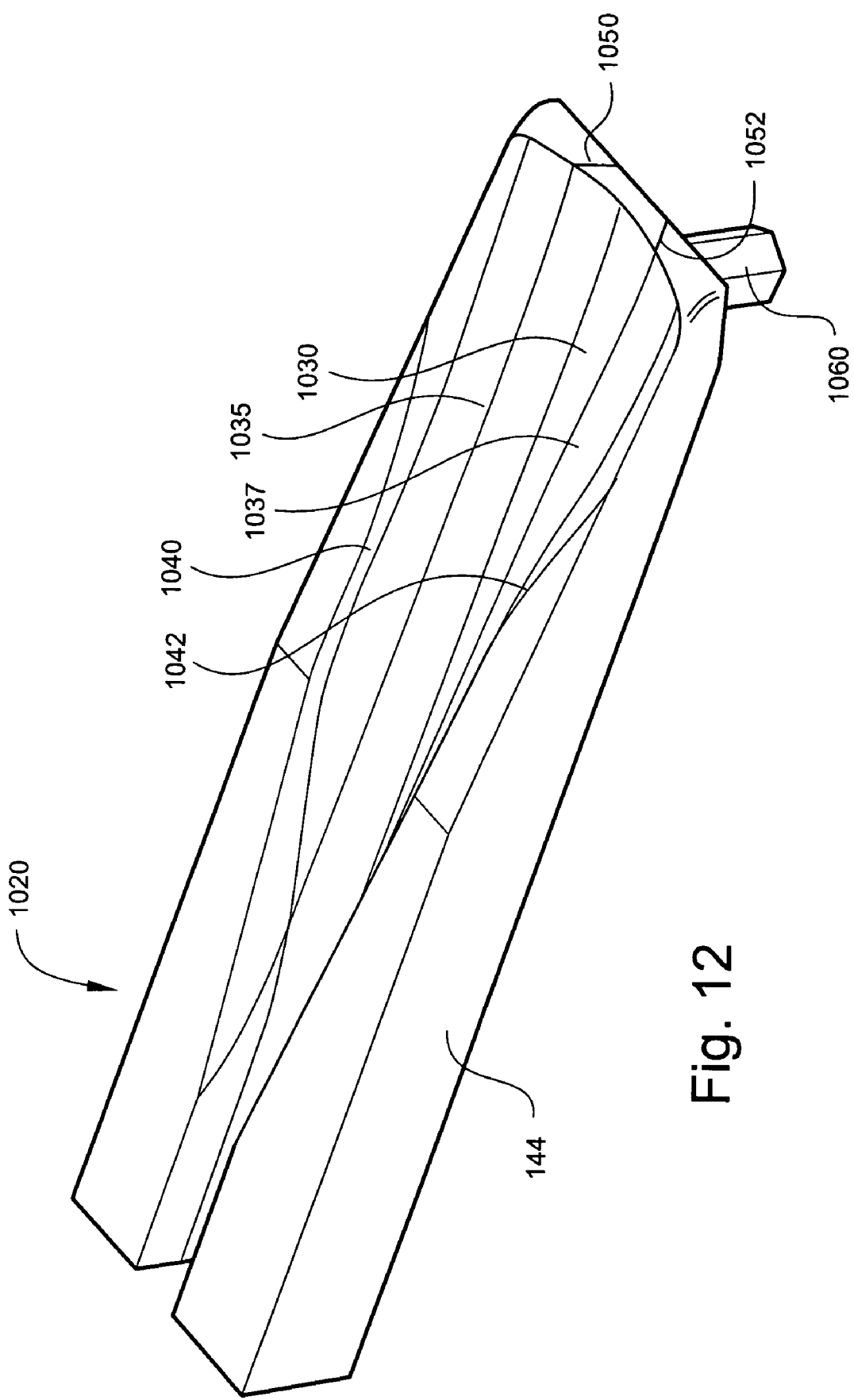
FIG. 12 is a perspective of a garniture entrance cone.

Referring to FIG. 12, there is shown an embodiment of another aspect of the present invention. A modified garniture entrance cone 144 is designed to be positioned within a cigarette making machine in a region below the finger rail assembly (not shown). Exemplary entrance cones that can be modified in accordance with one aspect of the present invention are commercially available, and the design and use of entrance cones in cigarette making machines will be readily apparent to those skilled in the art of cigarette making machine design and operation. An exemplary garniture entrance cone has a length of about 23 cm, a width of about 5 cm and a maximum height of about 2 cm. Typically, the entrance cone is manufactured from materials such as stainless steel, hardened carbon steel, aluminum alloys, and the like. Modified entrance cones can be of multi-piece construction, such as is shown in FIG. 12, or one-piece construction.

Garniture entrance cone 144 includes a downstream section 1020, an upstream section 1022, and a modified upper insert 1024 for a portion of the upper region of the upstream section. The entrance cone 144 possesses a generally concave upper surface 1030. Within that upper surface 1030 are opposing longitudinally-extending lower lateral aspects 1035, 1037, and within the upstream section 1022 are corresponding opposing upper lateral aspects 1040, 1042. Each of the lower lateral aspects and each of the upper lateral aspects are positioned on opposite sides of a longitudinally-extending concave upper surface 1030.

An entrance cone 144 of the type of the present invention also includes a first longitudinal-extending air flow passage slot or gap 1050 located between lower lateral aspect 1035 and upper lateral aspect 1040; and a second longitudinally-extending front air flow passage slot or gap 1052 located between the lower lateral aspect 1037 and upper lateral aspect 1042. Preferably, the overall shapes of the two slots on each side upper portion of the upstream section 1022 of the entrance cone are such that those slots are mirror images of one another. Typically, the width of each slot ranges from about 0.5 mil to about 3 mils, with about 1 mil to about 2 mils being preferred. The entrance cone 144 includes an air entrance chamber 1060 on the bottom side of the entrance cone, or in any other suitable location. An exemplary air entrance chamber or port 1060 is a tube-like member that provides a generally circular air entrance opening of about 9 mm in diameter. A source of air for a fast moving air stream is provided from a suitable source, such as a laboratory-type pressurized or compressed air source (not shown), and the air entrance chamber 1060 is suitably connected to the supply of pressurized air by a suitable connection means, such as Tygon-type tubing or the like. The air flow introduced through the air entrance chamber 1060 preferably passes through a manifold or passageway system (not shown) located within the entrance cone, and passes out of the longitudinally extending air slots 1050, 1052. For an exemplary entrance cone, those air slots 1050, 1052 preferably are positioned so as to extend length-wise about 14.5 cm. As such, the air slots 1050, 1052 extend along the entrance cone 144 that distance that the finger rail assembly (not shown) overlies the finger rail when configured under normal assembly within a cigarette making machine; however, the air slots can extend a lesser distance or a greater distance. Those slots also each can be positioned at angles that extend upward and outward. Typically, the angles are at least about 45° relative to horizontal at the extreme upstream end of the entrance cone 144; and the angles gradually becomes steeper along the length of the extreme cone, such that the angles are at least about 75° at the extreme downstream ends of those slots. As such, that air flow is directed from slot 1050 toward the upper lateral aspect 1040, and from slot 1052 upwards and outwards toward the upper lateral aspect 1042.

Figure 13:
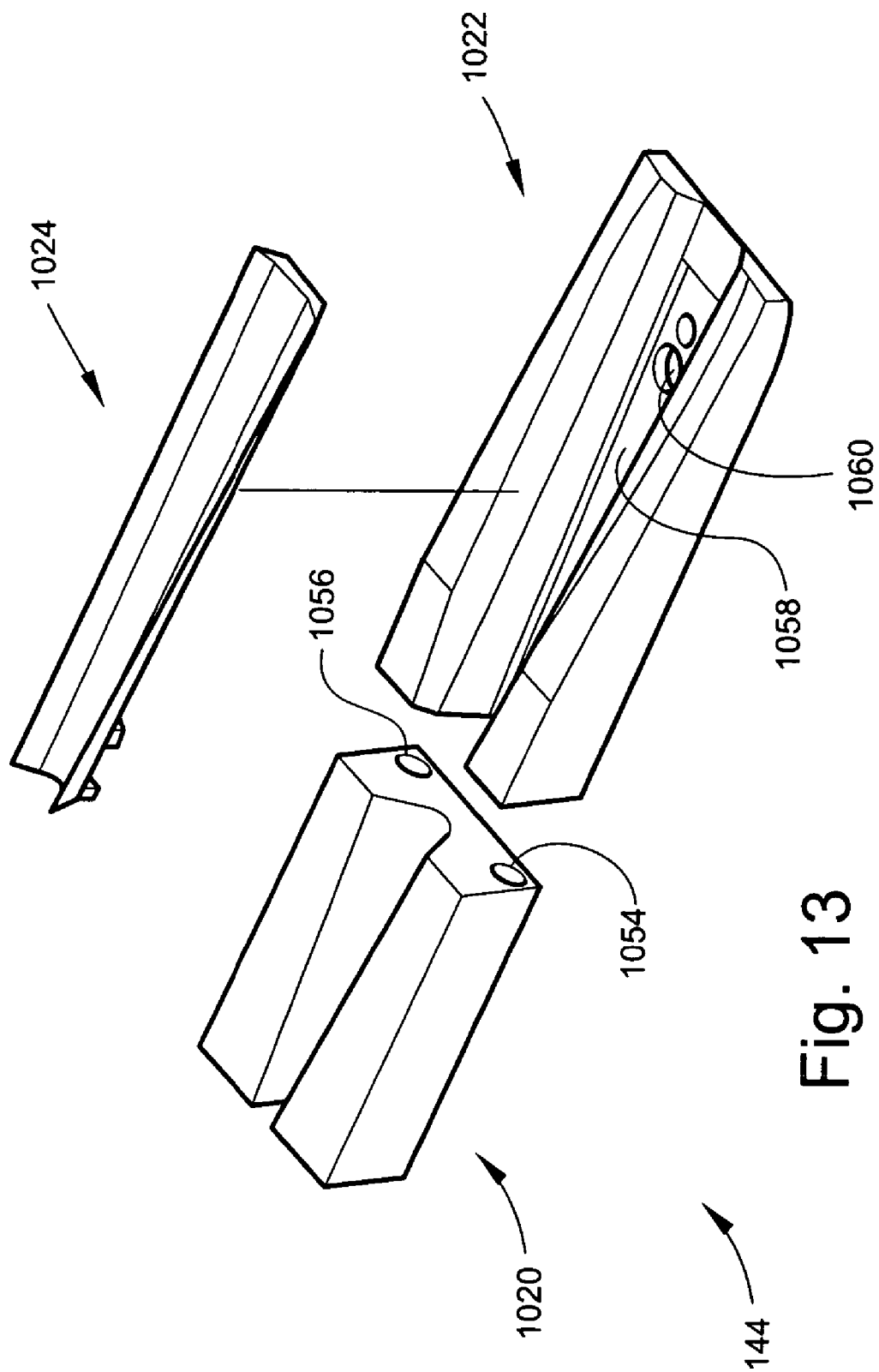
FIG. 13 is an exploded perspective of a garniture entrance cone of the type shown in FIG. 12.

Referring to FIG. 13, the representative garniture entrance cone 144 includes downstream section 1020 that is longitudinally aligned with upstream section 1022. Those sections are maintained in place relative to one another using male pegs (not shown) that are inserted into cooperating female grooves 1054, 1056. Preferably, for an entrance cone of about 23 mm total length, the upstream section has a length of about 14.5 mm. Typically, the length of the upper insert 1024 and the entire length of the upstream section 1022 are essentially equal to one another. Normally, the lengths of the upstream section 1022 and the upper insert 1024, and the positioning of each of those sections, correspond to that region of the entrance cone 144 that is located immediately below the overlying portion of the finger rail assembly (not shown), when those components are properly assembled within a cigarette making machine (not shown). The upper insert 1024 is designed to provide the designed concave surface structure to a portion of the upper surface of the garniture entrance cone 144. Beneath the upper insert 1024 is provided a cavity 1058 that provides a type of manifold for air flow that is introduced through air inlet 1060. For a representative upstream section 1022 having a length of about 14.5 cm, a suitable manifold 1058 has a length of about 14.5 cm, a depth of about 0.5 mm to about 1 mm, and a width of about 7 mm to about 15 mm. Thus, air entering the manifold 1058 passes out of the slots or grooves (not shown) that are located between (i) the bottom and sides of the upper insert 1024, and (ii) the top and sizes of the upstream section 1022. The upper insert 1024 and the upstream section 1022 are maintained in place relative to one another using appropriately located pegs and grooves, and suitable adhesives materials (e.g., epoxy-type cement).

Figure 14:
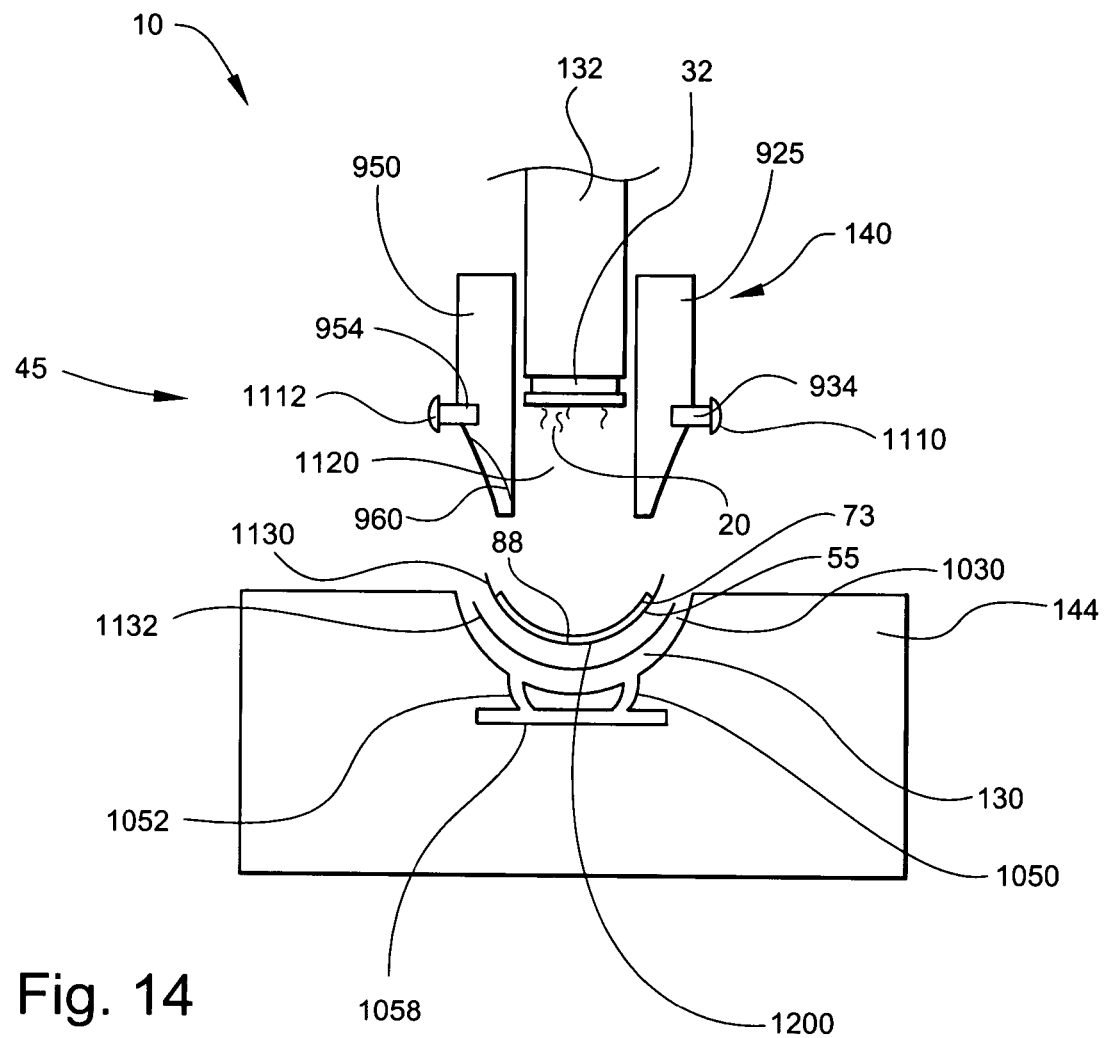
FIG. 14 is an enlarged schematic cross-sectional view of a pair of finger rails and a garniture entrance cone, as taken along lines 14 in FIG. 1.

Referring to FIG. 14, there is shown a region of a cigarette making machine 10, representative of that of the types of cigarette making machines described previously with reference to FIGS. 1 and 2. In particular, there is shown the entrance region of the garniture section 45 of a cigarette making machine 10. There is shown a cross-sectional end view of a finger rail assembly 140 that is representative of one aspect of the present invention and an entrance cone 144 that has been adapted in accordance with another aspect of the present invention. Additionally, there is shown tobacco filler 20 held by foraminous belt 32 that is supported by roller 132 (shown as partially cut away). There also is shown garniture conveyor belt 130 and paper web 55 having additive material 73 applied to one surface of that paper web.

The finger rail assembly 140 includes two complementary finger rails; that is front finger rail 925 and back finger rail 950. The finger rails 925, 950 are of the type described previously with reference to FIGS. 8 and 9, respectively. That is, each finger rail possesses a plurality of spaced, downwardly extending air passageways from manifolds 934, 954, respectively. For the cross-sectional view shown, the positioning of the air passageways is staggered; thus, the region of the back finger rail 950 that is shown possesses a downwardly extending air passageway 960, while the region of the front finger rail 935 shown is not a region where a downwardly extending air passageway has been positioned. Manifold covers 1110, 1112 cover a portion of the outside faces of finger rails 925, 959, respectively. Those manifold covers 1110, 1112 are secured in place by suitable means, such as spot welds or epoxy-type cement.

The finger rails 925, 950 both are positioned in their normal essentially parallel, spaced apart alignment above entrance cone 144, such that the downwardly projecting arms defined by the shape of those finger rails form opposing sides of a substantially rectangular, longitudinally extending passageway, channel or track 1120. The foraminous belt 32 and the tobacco filler cake 20 supported and transported by that belt travel through the upper region of that track 1120.

A portion of the garniture entrance cone 144 includes a downwardly concave, or semicircular, upper surface face 1030. As such, the passageway 1120 is defined by an upper region or surface (provided by the foraminous belt 32), two side surfaces (defined by the positioning of finger rails 925, 950) and lower surface (provided by the upper surface face 1030 of the entrance cone 144). The garniture conveyor belt 130 conveys the wrapper web 55 across the upper surface 1030 of the entrance cone 144. After the tobacco filler 20 is deposited onto the advancing paper web 55, the semicircular configuration of a portion of the upper surface 1030 of the entrance cone 144 helps form the paper web 55 and the stream of tobacco filler 20 thereon into a rod-like shape having the desired cross-sectional shape (e.g., generally circular). The upper surface 1030 of the garniture entrance cone 144 can be chemically or physically surface-treated, if desired. For example, the garniture entrance cone upper surface 1030 can be treated so as to have a surface of a ceramic material having a low coefficient of friction.

Each of the opposing edges 1130, 1132 at each end of the inside surface 88 of the paper web 55 can have the tendency to come into contact with the lower region of the finger rail assembly 140, and in particular, the lower regions or downwardly protruding arms or portions of each respective finger rail 925, 950. Typically, the inside surface 88 of portions of the paper web 55 come into contact with portions of the finger rail assembly 140 above the entrance cone 144. When the inside surface 88 of the paper web 55 has been coated with an additive material 73 (that can have the form of an adhesive-type coating formulation), and the inside surface 88 of the paper web 55 reaches the garniture entrance cone 144 and finger rail assembly 140, that additive material still can be wet, tacky or sticky. As a result, some of that additive material 73 can exhibit a tendency to stick onto portions of the finger rail assembly 140.

A fast moving gas stream exits the finger rail 140 assembly in the region in the bottom region of finger rails 925, 950; but above the paper web 55. The fast moving gas stream is provided from a suitable source, such as a laboratory-type pressurized or compressed air source (not shown). The temperature of the gas can vary, and air of essentially ambient temperature, heated air or cooled air can be used. Although not preferred for most applications, the gas stream can comprise steam. Preferably, air flow is provided through a T-type connection tube (not shown) connected to a supply tube such that air enters the air inlet passageways (not shown) and into the respective manifolds 934, 954 through the respective back faces of each finger rail. The downward force of the air stream, as well as a suitably designed pattern of airflow from the finger rail assembly (e.g., such as a staggered pattern of air distribution outlets (not shown)) results in the creation of a zone of air turbulence above the paper web 55. The downward forces created by such an air stream act to maintain the paper web 55, and particularly the opposing edges 1130, 1132 thereof, spaced away from the adjacent surfaces of the finger rail assembly 140. Consequently, as the paper web 55 advances underneath the finger rail assembly 140, the additive material 73 on the inside surface 88 of the paper web 55 is effectively prevented from being transferred to lower regions of the finger rail assembly 140. As a result, the air above the paper web 55 is sufficiently agitated to maintain the paper web a distance away from the lower surfaces of the finger rails 925, 950. A staggered pattern of air distribution outlets assists in avoiding the formation of a laminar-type air flow down onto the advancing paper web 55. Certain downwardly directed air flows patterns (e.g., certain patterns that are not turbulent in nature) can have a tendency to produce a zone of low air pressure above the paper web 55, and such types of air flow patterns can result in the paper web being drawn into contact with the lower surface region of the finger assembly 140.

Additionally, a fast moving gas stream can exit manifold 1058 through longitudinally extending air slots 1050, 1052 extending within the upper surface 1030 of entrance cone 144 can be positioned in alignment, such that air flow is directed toward the edges 1130, 1132 of the paper web 55. The fast moving gas stream is provided from a suitable source (not shown). The temperature of the gas can vary, and air of essentially ambient temperature, heated air or cooled air can be used. Although not preferred for most applications, the gas stream can comprise steam. The previously described downward force of the air stream provided from the modified finger rail assembly 140, as well as a suitably designed pattern of airflow from the entrance cone 144, results in the creation of a low air pressure zone 1200 below the paper web 55. The downward forces created by such an air stream act to maintain the paper web 55, and particularly the opposing edges 1130, 1132 thereof, spaced away from the adjacent surfaces of the finger rail assembly 140. That is, the paper web 55 is effectively drawn away from the finger rail assembly 140. Additionally, the entrance cone air outlets 1050, 1052, or other suitable air exit or distribution means, are directed toward each of opposing edges of the paper web that overlies that entrance cone. Thus, the direction of air flow through the longitudinal air slots 1050, 1052 of the entrance cone 144 relative to the edges 1130, 1132 of the paper web 55 causes the formation of a low air pressure zone 1200 below the paper web 55. The edges 1130, 1132 of the paper web 55 are caused to be drawn down onto the respective upper lateral aspects 1040, 1042 of the entrance cone concave upper surface 1030. Those edges 1130, 1132 are thereby effectively pulled away from contact with components of the finger rail assembly 140. As a result, transfer of the additive material 73 from the inside surface 88 of the paper web 55 is avoided, minimized or prevented from being transferred to the finger rail assembly 140, as the paper web 55 advances underneath that assembly.

Air flow from the finger rails 925, 950, from the entrance cone 144, or from a combination of air flow from both the finger rails 925, 950 and from the entrance cone 144 allows air flow rates from above, below, or both from above and below, the paper web 55. As such, a desirable smooth movement of the paper web 55 between the finger rail assembly 140 and the entrance cone 144 is facilitated, while maintaining the paper web 55 a desirable distance away from components of the finger rail assembly. The degree of air flow through the finger rails 925, 950 and through the entrance cone 144 that is sufficient to achieve optimum operation can be determined by experimentation and can be a matter of design choice.

Figure 15:
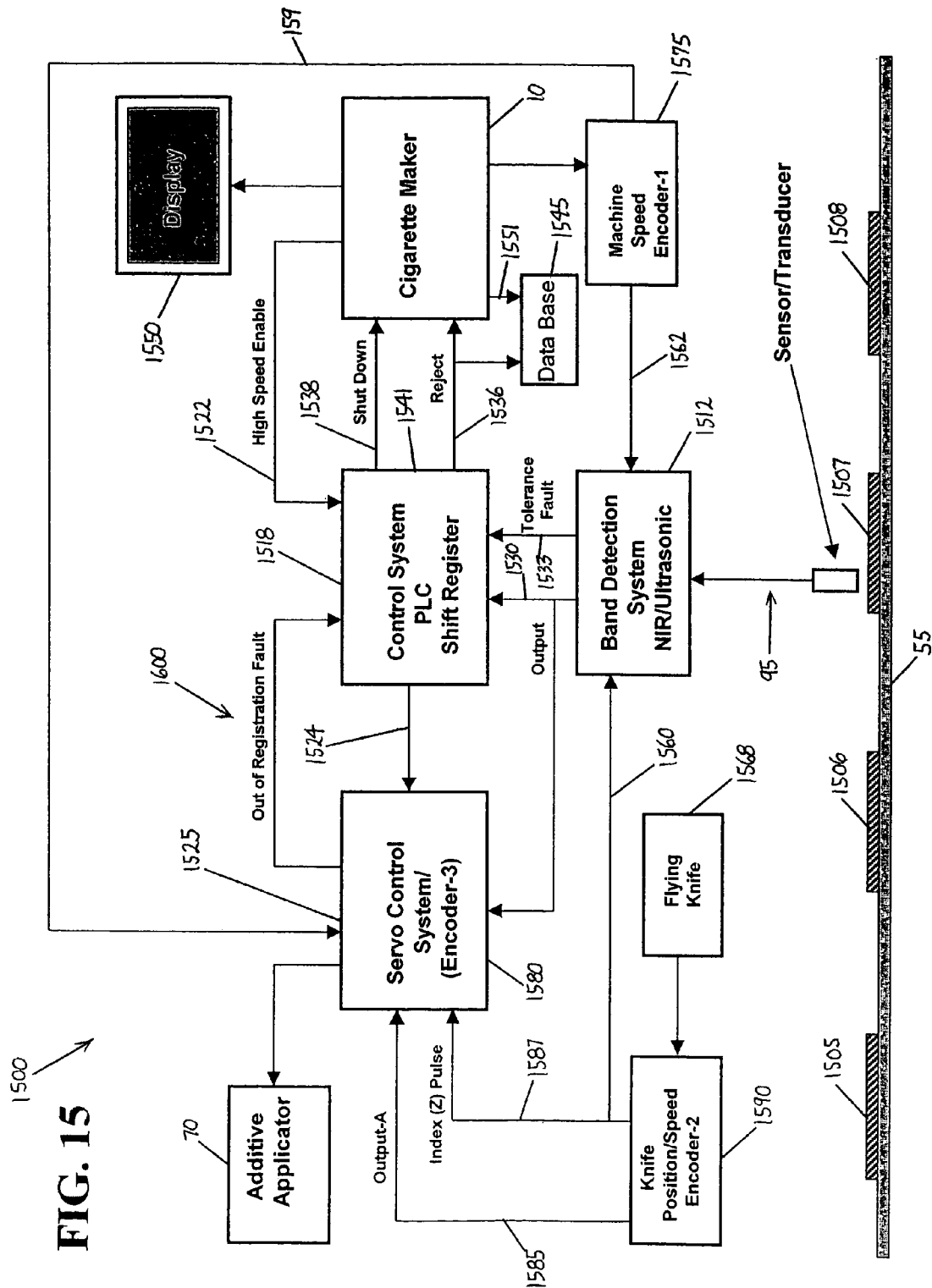
FIG. 15 is a block diagram showing the components and general operation of a registration system and an inspection system.

Referring to FIG. 15, there is shown a block diagram of registration and inspection systems 1500 representative of various aspects of the present invention. Such a system 1500 is useful for inspecting and assisting in the control of manufacture of cigarettes (not shown) that are manufactured from a continuous paper web 55 possessing a predetermined pattern, such as a plurality of bands 1505, 1506, 1507, 1508. The paper web 55 is routed near a detection system 95. The detection system can be spectroscopic system, such as a non-contact ultrasonic transmission system or a near infrared (NIR) absorption system. Such a detection system can be characterized as a non-optical type of detection system. A typical detection system 95 includes a transducer/sensor component 1510 and a processor/analyzer component 1512. A typical ultrasonic detection system 95 utilizes a transducer and an analyzer. A preferred ultrasonic detection system is available as Model NCT 210-P2 6.3 mm 1 MHz transducer 1510 and NCA-1000 2 EN analyzer 1512, available from Second Wave Systems Corp. A typical NIR system 95 utilizes a sensor and a processor. A preferred NIR detection system utilizes a GD 100 W NIR sensor 1510 with a 100 microsecond response time and G-NET Verification System processor 1512, available from Nordson Corporation. Typically, detector systems 95 possess response times sufficient to provide adequate information regarding a continuous paper web 55 that is moving at speeds customary on conventional cigarette making machines.

NIR reflectance systems are particularly preferred spectroscopic systems for inspecting samples, such as paper webs that are considered to be opaque. See, *Near-Infrared Technology in the Agricultural and Food Industries*, edited by Phil Williams and Karl Norris, Published by the American Association of Cereal Chemists, Inc. St. Paul, Minn., USA. Typically, the radiation emission source and detector 1510 are housed in the sensor body, and a fiber optic bundle guides the incident light to the paper web through a focusing lens in order to achieve a spot size of about 3 mm. Typically, the reflected radiation is collected by the same lens and fiber optic bundle, and directed back to the detector 1510. Such components of such a system typically have a response time of about 100 microseconds, which is sufficiently fast to detect bands on a cigarette making machine running at speeds sufficient to produce about 8,000 cigarette rods per minute, and having either 1 or 2 bands per cigarette rod. For example, for a tobacco rod length of 60 mm, a nominal tobacco rod making speed of 8,000 rods per minute, and a single band of adhesive of 5 mm width per rod, the detection time for each rod is about 625 microseconds.

NIR spectroscopy measures the chemical concentration of constituents in a sample in the wavelength range of about 850 nm to about 2500 nm. Radiation within such wavelengths can be generated using gratings, band pass interference filters, diodes or high speed electronically controlled acousto-optic transmission filters (AOTF). Exemplary detectors used in NIR spectrophotometric systems are lead sulfide (PbS), silicon (Si) and indium gallium arsenide (InGaAs) detectors. NIR-based systems can be used to detect the presence of chemical constituents, such as water, other components of the coating formulations applied to the paper web, or marker materials that are incorporated into the coating formulations. For many additive formulations that are applied to paper webs in accordance with the on-line application techniques of the present invention, those formulations incorporate water (e.g., in many instances at least about 40 weight percent, and usually at least about 50 weight percent of the applied coating formulation is water). Water has strong absorbance bands at 1450 nm and 1940 nm.

A PLC-based control system 1518 provides overall supervisory control of the cigarette manufacturing process. For example, the PLC-based control system 1518 can receive, process and provide process control information concerning pattern application of additive material to the paper web 55, inspection of the paper web, conditions associated with drying of additive material that has been applied to the paper web, and rejection of cigarettes that do not meet certain specifications. A suitable PLC-based system is available as SIMATIC S7-300 controller model 6ES7 315-2AF03-0AB0 available from Siemens Energy and Automation, Incorporated.

During cigarette manufacture, when the cigarette making machine reaches the preset speed, and cigarette production is underway, the cigarette making machine 10 sends a high speed enable signal 1522 to the PLC 1518. The PLC processes that signal and generates an output signal 1524 to a servo control system 1525, which in turn, instructs the servo motor (not shown) to engage the additive applicator apparatus 70 for operation (i.e., the roller system is instructed to position itself into operative engagement and begin operation for additive material application). An output signal 1530 representative of the pattern sensed by the detection system 95 is sent to the PLC 1518 for processing, and the PLC determines, among other things, if there is a fault and if cigarette rod rejection is required. In addition, the detection system 95 sends a second signal 1533 (i.e., a tolerance fault) that indicates if pattern deviation (e.g., a band width deviation) is within or beyond a predetermined tolerance level. If a band 1507, 1508 is missing or out of tolerance (i.e., is an incorrect size), such an event is noted and the PLC determines whether to reject 1536 a cigarette or shut down 1538 the cigarette making machine 10, by communication with the cigarette making machine. Internal shift registers 1541 within the PLC 1518 are used to keep track of the reject cigarette rod information sent to the cigarette maker control system for rejection of the reject tobacco rods at the selected downstream rejection location (not shown). The PLC also determines if system shut down is required (e.g., if consecutive sets of rejects above a set value thereby indicating a major or catastrophic fault requiring machine operator intervention), and the shutdown signal 1538 is sent to the control system (not shown) within the cigarette making machine 10. The reject signal 1536 is also sent to a database 1545 for recording to compute efficiency information, and any faults generated by the PLC 1518 are sent through the cigarette making machine control system (not shown) to a graphical display 1550 for feed back to the machine operator. Information 1551 from the cigarette making machine 10 also is sent to the database 1545.

For a system 1500 designed to detect applied patterned bands 1507, 1508 on a paper web 55, such a detection system receives two input signals 1560, 1562. For example, the first signal 1560 can be a trigger signal that corresponds to a 1:1 ratio with the flying knife cut position 1568 of the continuous tobacco rod (i.e., one cut is represented by one pulse), and the second signal 1562 being an encoder signal that corresponds to the speed 1575 of the continuous cigarette rod. In addition to the presence or absence of an applied band, the position of such a band within a rod and the width of that band can be determined by the combination of these two in put signals 1560, 1562.

Certain cigarette making machine components can be driven using a servo drive control system 1525, or other suitable motion control means. Using servo control systems 1525, the speed, acceleration rate, position, and torque of a motor (not shown) can be programmed digitally. An internal encoder 1580 is integrated into the motor housing (not shown) for an internal feed back for the servo motor (not shown). A servo-based drive control system comprises a controller/amplifier and a servo motor that is used to match or synchronize with the speed of the continuous cigarette rod in order to apply and position a desired pattern (e.g., one or two bands) on what is ultimately each individual cigarette rod. This is accomplished by using input signals 1585, 1587 from an encoder 1590. Signal 1585 from encoder 1590 that is mechanically linked to a suitable rotating shaft (not shown) of the cigarette rod making machine provides information regarding the speed and position of the cut-off knife. In addition, the second signal 1587 is timed to the cut of point of the cut-off knife 1590 in order to reference the cut position of each individual cigarette rod. The detector 95 detects the presence of the additive material applied on the paper web, and signal 1530 also is fed to the servo controller 1580. This signal is processed 1525; and the result is compared to a previously determined, pre-programmed acceptance positional window. That is, the output signal 1530 concerning that detected information (e.g., information regarding positioning of a band 1507 on the paper web 55) is compared to that of what is expected for a paper web that is within desired specifications. The servo controller 1525 also receives a signal 1598 from encoder 1575 to synchronize the operation of the applicator apparatus 70 with the speed of operation of the cigarette making machine 10. As such, the servo controller 1525 directs the applicator apparatus 70 to (i) correct the operation of the application apparatus so as to provide corrected and proper registration by phase adjustment in the servo control system, and (ii) generates out of register fault 1600 to cause further processing within the PLC 1518 to determine whether to reject cigarettes that are not within certain specified specifications or to shut down the cigarette making machine. For example, when a band 1507 that is applied to the paper web 55 is out of registration, the servo motor temporarily speeds up or slows down to allow the positioning the pattern of additive material on the paper web to return back within the desired and specified registration.

Registration of the transversely positioned bands of additive material on a continuous paper web so as to be within a tolerance window is a very desirable feature when those bands are used for the production of cigarettes that meet certain standards with regards to low ignition propensity criteria. In accordance with one aspect of the present invention, registration of the patterns (e.g., bands) applied to continuous paper webs within a tolerance window can be carried out whether the patterns are applied off-line (e.g., as pre-printed patterns) or on-line (e.g., as patterns applied on the cigarette making apparatus). In particular, a 2-axes control system (i.e., a system that controls two independent motors) is used within the cigarette making apparatus in conjunction with a high speed band sensor (i.e., which is fast enough to respond to nominal cigarette making speeds). A first servo motor drives the flying knife of the cigarette making machine. The knife position at rod cut off location is derived by an encoder mechanically coupled to the cut off knife, and this signal is used as a reference point for determining the position of the band. A second servo motor drives the garniture belt and the foraminous conveyor belt, and a second encoder provides the feedback regarding cigarette making speed. The detector senses a band and the location of that band with respect to the cutoff knife. If the bands are out of registration on the cigarette rods, the servo control system typically slows down the garniture belt relative to the cut off knife so that the knife temporally will cut shorter rods until the continuous tobacco rod is in registration. This can be achieved either by speeding up the cut off knife or slowing down the garniture belt. For example, the system can be programmed to make a small adjustment per rod (e.g., such as 1 mm per cut change per rod) so as to walk the system into to registration as smoothly as possible. However, for smaller adjustments, longer periods are required to bring the cigarette rods back within the tolerance window, and hence more short cigarettes will be rejected. Such a registration system is particularly useful for making adjustments (i) during cigarette making machine start up; (ii) during machine operation after recovery from a shutdown or after a new bobbin of paper web is spliced into the machine; (iii) during normal cigarette making machine operation due to factors such as stretching of the paper web.

Figure 16:
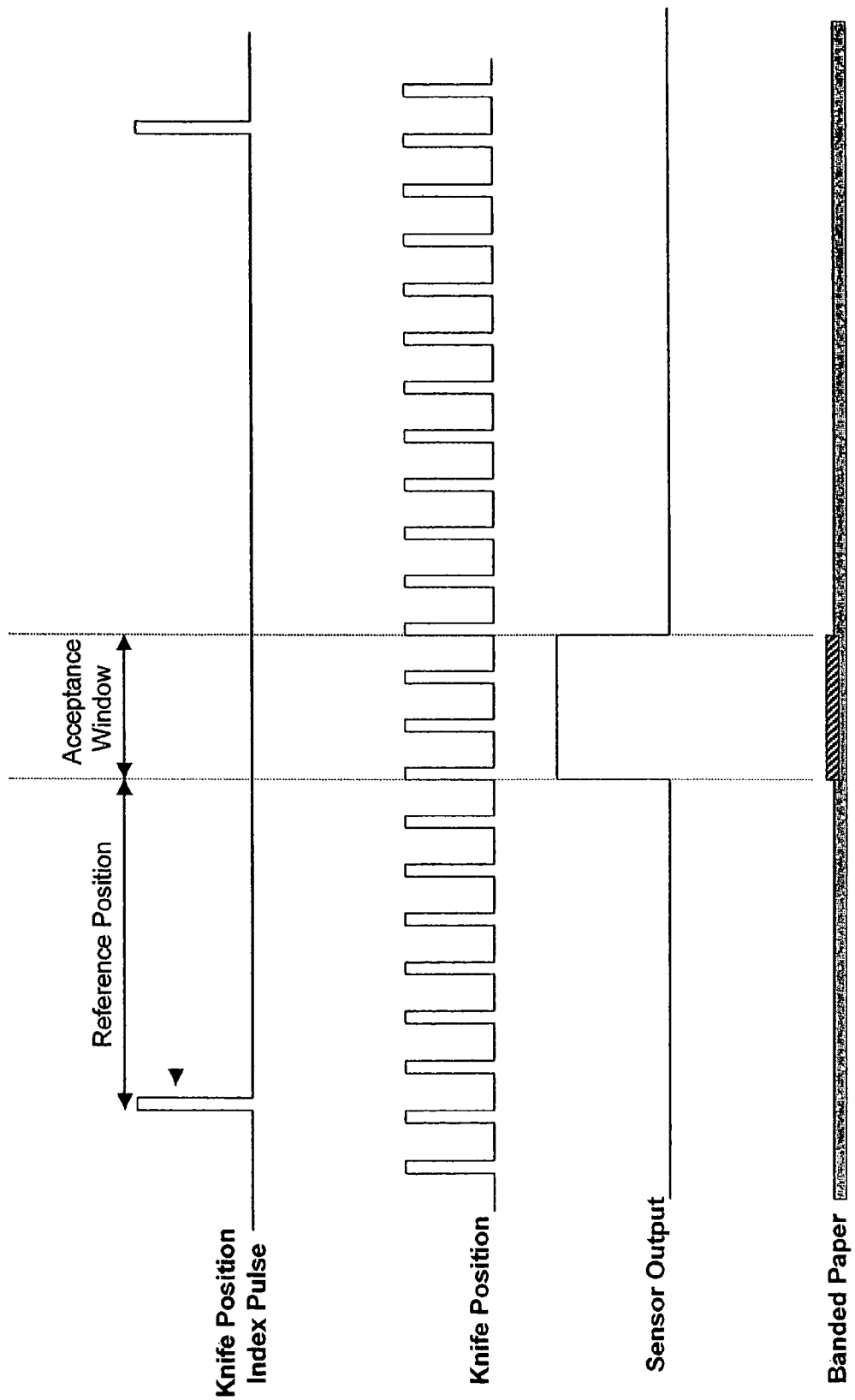
FIGS. 16-19 are schematic representations of various timing signals associated with registration and inspection systems.

Referring to FIG. 16, there is shown an additive application control system timing diagram for band registration on a continuous paper web. The band on the paper web is detected by a sensor, and a corresponding output signal is generated. A signal that coincides to the cut off location of a cigarette rod also is generated. A related signal corresponding to the position of the rod relative to the cut-off knife location on the cigarette rod also is generated. The sensor output is compared to the other two signals. Such a comparison allows for the determination of location of the sensed band, and determination that the location is within an acceptable specified window. Thus, for example, it is possible to consistently produce a plurality of cigarette rods, each cigarette rod possessing one band having a width of 5 mm that is positioned 25 mm from the lighting end of each such cigarette rod.

Figure 17:
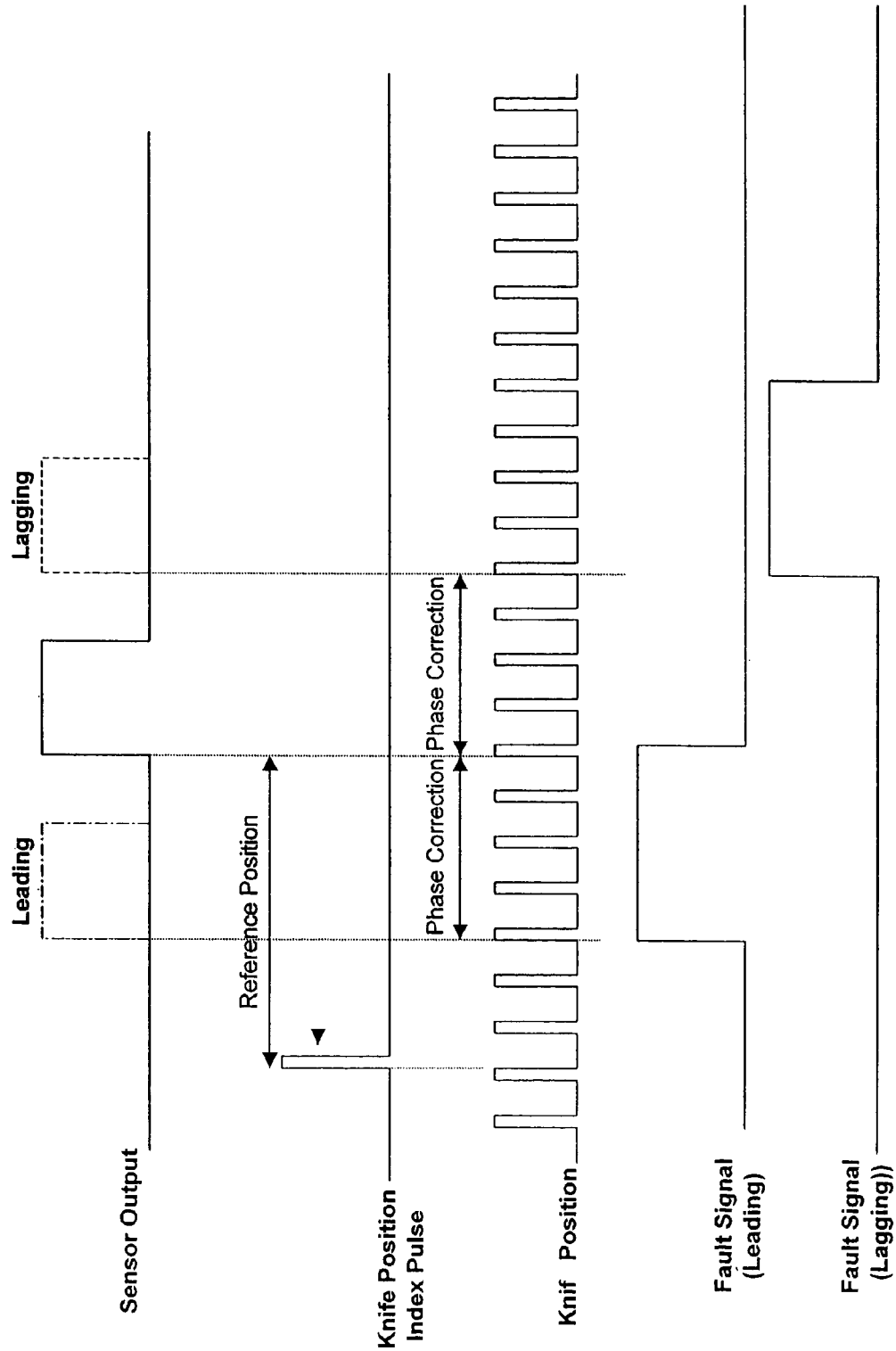

Referring to FIG. 17, there is shown an additive application control system timing diagram for band registration on a continuous paper web, and two bands are shown as being out of position. The band on the paper web is detected by a sensor, and an output signal is generated. A signal that coincides to the cut off location of a cigarette rod also is generated. A related signal corresponding to the position of the rod relative to the cut-off knife location on the cigarette rod also is generated. The sensor output is compared to the other two signals. Such a comparison allows for the determination of location of the sensed band, and determination that location is not within an acceptable specified window (i.e., whether the band is leading or lagging). Thus, the servo control system can be used to adjust operation of the application apparatus back into registration by phase correction. In addition, a fault signal for both leading or lagging bands which do not fit into the expected registration window are generated for all the out of registration rods, and sent to the PLC for processing for rejection at the proper location of the system.

Figure 18:
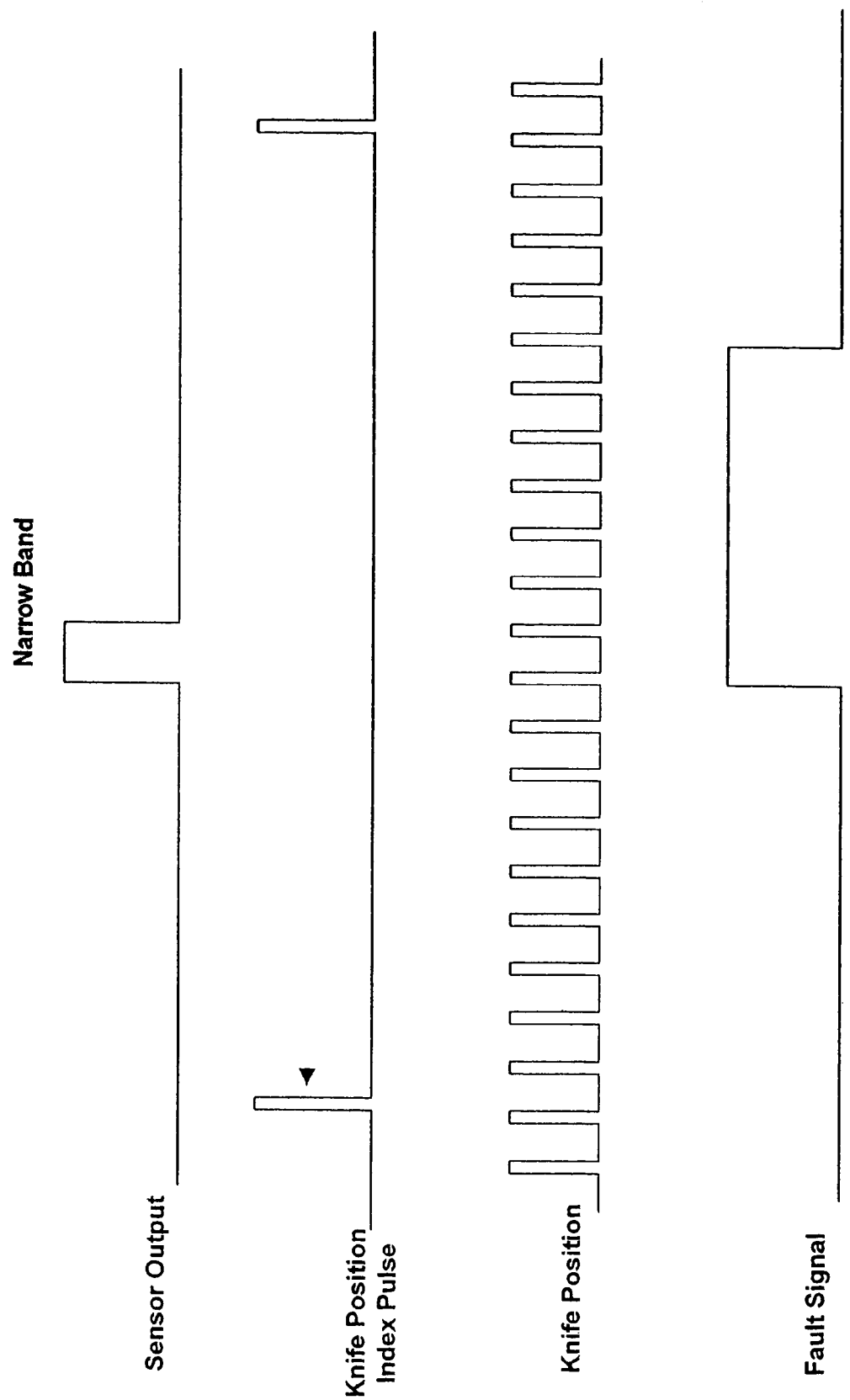

Referring to FIG. 18, there is shown an additive application control system timing diagram for band registration on a continuous paper web, and that band is shown to be too narrow to meet specifications. The band on the paper web is detected by a sensor, and an output signal is generated. A related signal corresponding to the position of the rod relative to the cutoff knife location on the cigarette rod also is generated. The sensor output is compared to the other two signals. Such a comparison allows for the determination of width of the sensed band, and determination that width is not within an acceptable specified window. A fault signal for that out of specification band is sent to the PLC for further processing for rejection or shut down of the cigarette maker.

Figure 19:
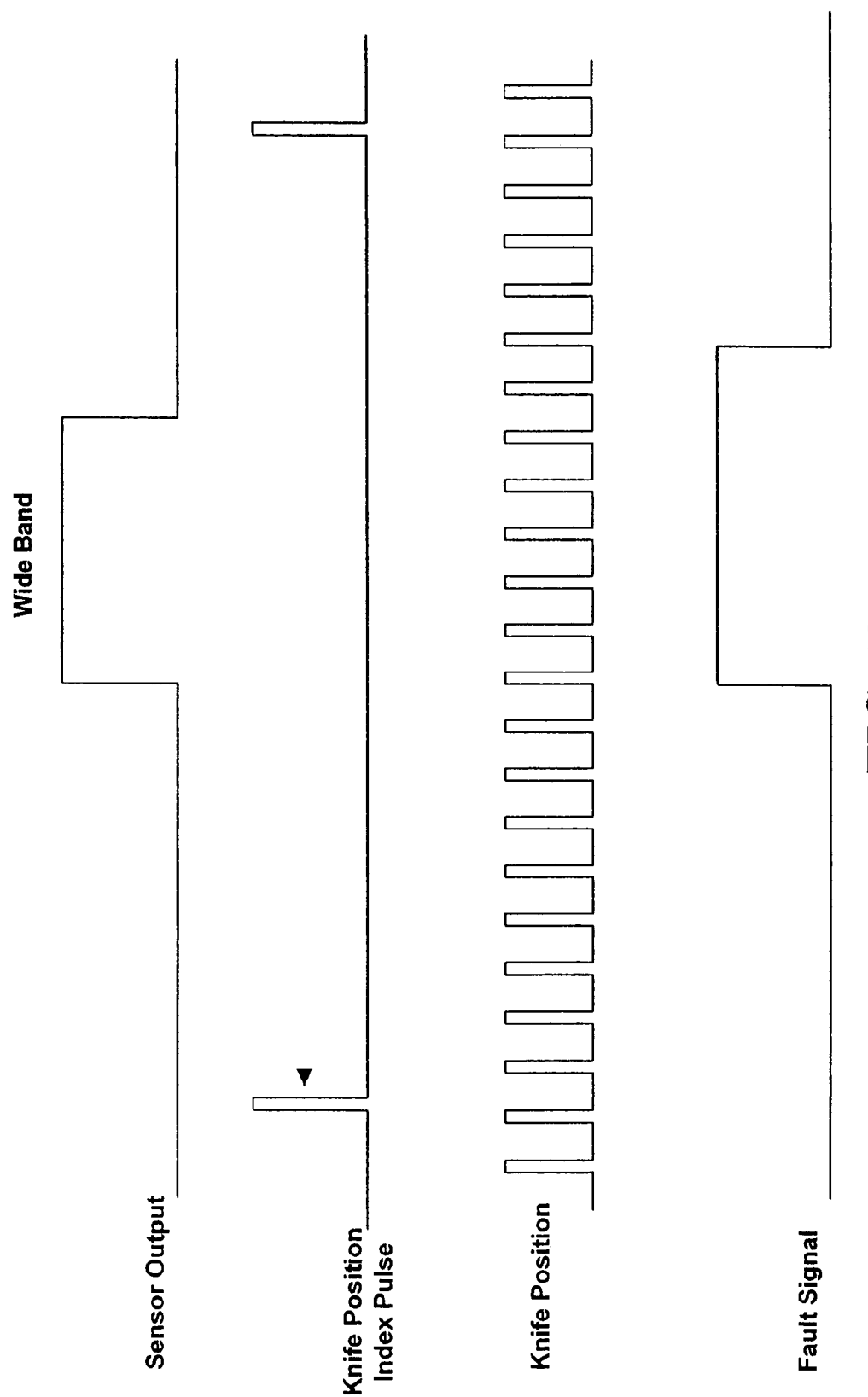

Referring to FIG. 19, there is shown an additive application control system timing diagram for band registration on a continuous paper web, and that band is shown to be too wide to meet specifications. The band on the paper web is detected by a sensor, and an output signal is generated. A related signal corresponding to the position of the rod relative to the cut-off knife location on the cigarette rod also is generated. The sensor output is compared to the other two signals. Such a comparison allows for the determination of width of the sensed band, and determination that width is not within an acceptable specified window. A fault signal for that out of specification band is sent to the PLC for further processing for rejection or shut down of the cigarette maker.

Figure 20:
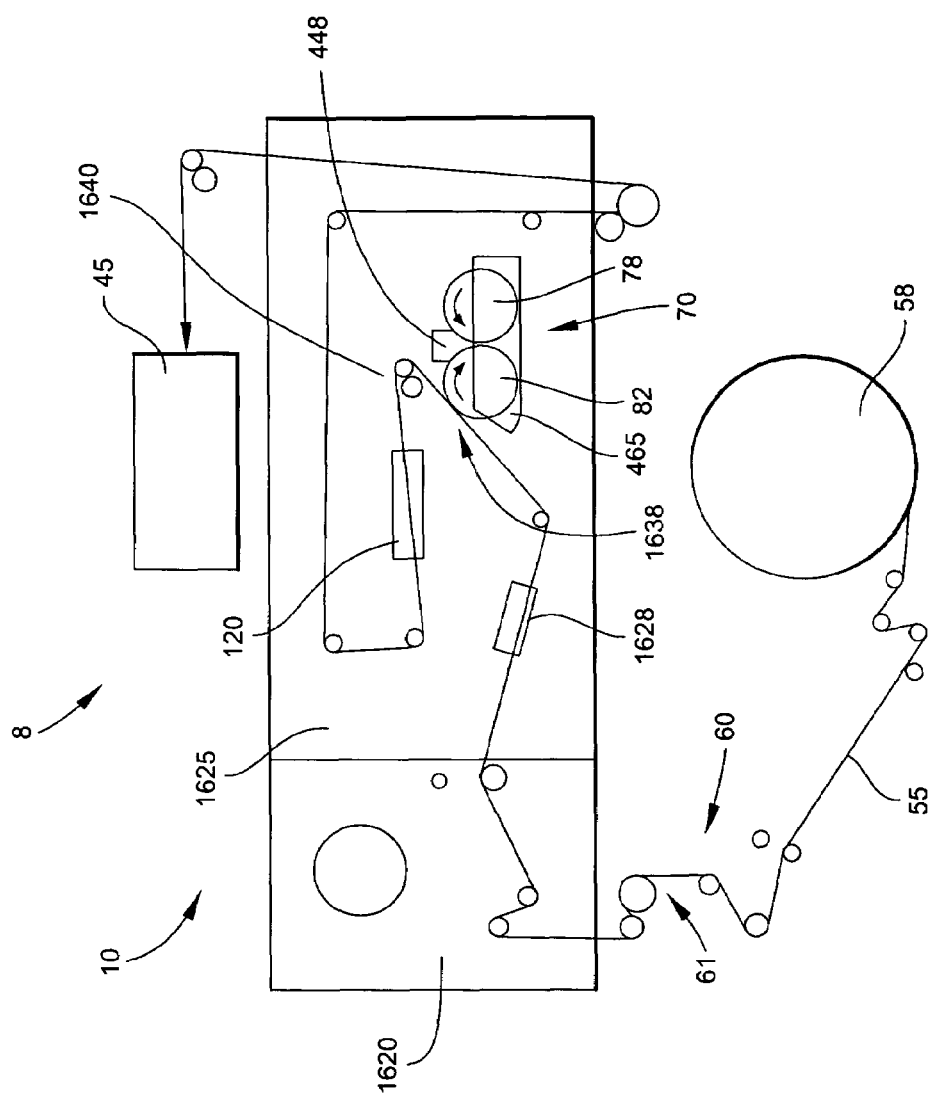
FIG. 20 is a schematic illustration of a side view of an apparatus for making a smoking article and wrapper, and specifically, a schematic illustration of a portion of a cigarette making machine showing a source of wrapping material, an additive applicator apparatus, a source of tobacco filler and a garniture region that is used to produce a continuous cigarette rod.

Referring to FIG. 20, there is shown a schematic illustration of portion of a cigarette making machine 8 having yet another additive applicator apparatus representative of one aspect of the present invention. A portion of a conventional PROTOS cigarette maker 10 manufactured by Hauni-Werke Körber &Co. KG of Germany is shown. The maker 10 is modified to comprise an additive applicator apparatus 70. The cigarette maker 10 includes a large bobbin 58 with a strip 55 of paper web, or cigarette wrapper, wound thereon. Bobbin 58 is mounted for clockwise rotation beneath the cigarette maker garniture 45 and printer section 1620. As the strip 55 of paper web, or wrapper, is unwound from the bobbin 58, it passes around an arrangement of rollers (shown as rollers 60, 61) to take up any slack in the strip 55 and maintain a certain amount of tension on the paper strip.

After the paper strip 55 passes through the printer section 1620, it travels to the additive applicator apparatus region 1625, where it first passes through a paper preheater 1628. The additive applicator 70 is arranged between the bobbin 58 and the garniture 45, and preferably is employed to apply bands of adhesive-type material to the moving paper strip 55. The preheater 1628 is preferably an infrared heater, which preheats the paper web 55 to a temperature in the range of about 180° C. to about 220° C. Preheating of the paper web 55 is optional, but can be preferred, especially in the case of a high speed cigarette maker when preheating the paper can advantageously assist in evaporating the solvent for the subsequently applied additive.

The preheated paper web 55 travels next to the additive applicator assembly 70, sometimes broadly referred to as a "glue pot." The additive applicator assembly 70 comprises a pair of counter-rotating rollers 78, 82, which counter-rotate in the directions shown by the arrows. The additive applicator assembly 70 further comprises an additive feed shoe 448. A drip box 465 encloses the lower portions of the rollers 78, 82 to catch any additive that drips, spatters, or is thrown by centrifugal force or otherwise from the rollers. Rollers 78, 82 are engaged to counter-rotate at identical peripheral speeds, which also correspond to the speed of the paper strip 55 at the point 1638 where the paper strip tangentially contacts the peripheral surface of roller 82. Conventional speed control systems are useful for moving and rotating machine components at precise predetermined speeds and for maintaining zero relative speed between moving and rotating machine components.

Roller 82 is an application roller and roller 78 is a pattern roller, preferably a gravure or intaglio pattern roller provided with a plurality of circumferentially-spaced transverse grooves, or pockets. Additive feed shoe 448 is located between the counter-rotating rollers 78, 82 so as to feed additive material to the pattern roller 78 immediately upstream of the nip between the rollers. Additive material includes adhesives, such as a cigarette seam adhesive, filter plug wrap adhesive, tipping paper adhesive, or the types of additive materials set forth hereinafter. As the rollers 78, 82 counter-rotate, the additive material or adhesive is transferred from the transverse pockets, or grooves, on the pattern roller 78 to the application roller 82 in circumferentially spaced locations on the peripheral surface of the application roller. The application roller 82 is positioned to bear with a slight upward pressure against the paper strip 55 at point 1638 so as to transfer the additive material to the optionally preheated paper strip 55 in longitudinally-spaced, cross-directional bands (not shown) of a predetermined width and spacing.

After the additive material has been applied to the paper strip 55, the paper strip passes through an infrared paper dryer 120 downstream of the additive applicator assembly 70 and upstream of the garniture 45 of the cigarette maker 10. After passing through the dryer 120, the paper strip 55 with the cross-directional bands on one surface thereof travels via another arrangement of rollers 1640 to the garniture 45 where it is formed about a tobacco rod and bonded along an overlapping longitudinal seam formed by the longitudinal side edges of the paper strip 55. The additive material and the paper strip 55 are dried sufficiently in the infrared paper dryer 120 and during passage over the roller arrangement 1640 so that the paper with the spaced, cross-directional adhesive bands applied to it does not tear when it is wrapped about the tobacco rod in the garniture 45.

The additive applicator apparatus 70 causes the additive bands to be applied to the inside surface of the paper cigarette wrapper (i.e., the surface confronting the tobacco rod) as is preferred. However, the additive applicator apparatus 70 can be arranged on the cigarette maker 10 so that the bands of additive material can be applied to the outside surface of the paper cigarette wrapper, if that is desired.

Figure 21:
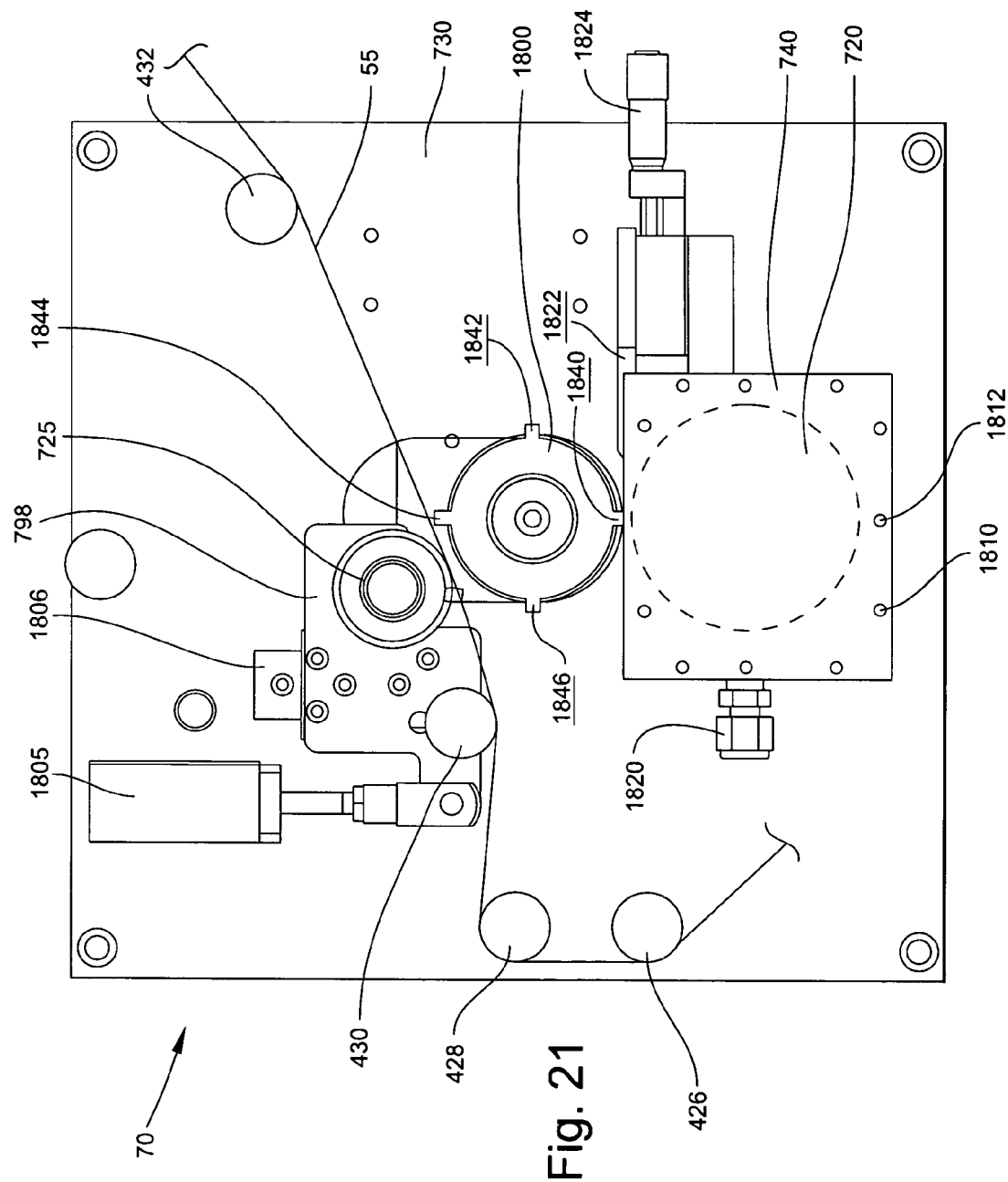
FIG. 21 is a schematic illustration of an additive applicator apparatus of an embodiment of the present invention.

Referring to FIG. 21, there is shown a portion of a cigarette making machine assembly 8; and there also are shown relevant components of another representative additive applicator apparatus 70. Such an applicator 70 is particularly useful for applying to a paper web 55 certain types of viscous additive materials. Such additive materials useful in applications involving cigarette paper include, for example, paste-type formulations of additive materials having viscosities in the range of about 500,000 centipoise to about 2,500,000 centipoise.

Additive applicator 70 is an assembly that includes a pick-up roller 720 and a transfer pressure roller 725 (or back-up roller) mounted on each side of an application roller 1800. Those rollers are mounted through a front roller plate 730 secured to the front exterior region of a cigarette making machine. Each of a plurality of rollers 426, 428, 430, 432 is fixedly mounted to the front roller plate 730; and those rollers provide guides for a path over which the paper web 55 travels from a bobbin (not shown) to the additive applicator 70 and on to other regions of the cigarette making machine 8.

The pick-up roller 720 (shown in phantom) is positioned within a reservoir 740 for the additive material (not shown). The reservoir is maintained in place and secured to the front roller plate 730 by bolts 1810, 1812 or other suitable connection means. The reservoir 740 is connected to a source (not shown) of additive material (e.g., a formulation having the form of a paste), through port 1820 near the top region of the reservoir 740. As such, a source of additive material for the pick-up roller 720 is provided. If desired, the reservoir can be equipped with devices for monitoring the amount of additive material that is present within that reservoir, such as are described hereinbefore with reference to FIG. 4. Typically, the additive material is supplied through tubing (not shown), such as Tygon-type or polyethylene tubing, that feeds the reservoir 740 through port 1820. The reservoir of the additive applicator 70 provides a receptacle for the additive material to the point of deposit onto the pick-up roller 720.

A doctor blade 1822 is positioned near the pick-up roller 720 near the top region of that roller. The doctor blade can be supported in a fixed position relative to the roller, or the doctor blade can be adjustable, for example, by being mounted in so as to be moveable using micrometer 1824. As such, the positioning of the doctor blade 1822 relative to the roll face of roller 720 can be adjusted. Preferably, the doctor blade is positioned in order that additive material that has been applied to the roll face of the pick-up roller is provided in the desired amount. Typically, the doctor blade is positioned so as to provide a layer of additive material on the roll face of the pick-up roller that has the desired thickness, both along the length and width of the roll face. Typically, the doctor blade 1822 is positioned about 0.001 to about 0.002 inch from the surface of the roll face of pick-up roller 720. After the additive material on the roll face of the pick-up roller has been provided in the desired amount, that additive material is transferred from the pick-up roller to the face of appropriate die 1840 of applicator roller 1800.

The pick-up roller 720 preferably is manufactured from a material that can vary, but preferably is manufactured from an elastomeric type material, such as a polyurethane rubber type material, a natural gum rubber, ethylene-propylene diene monomer rubber, or the like. An exemplary pick-up roller has a diameter of about 50 mm to about 100 mm. For the embodiment shown, the pick-up roller rotates counter-clockwise within the reservoir 740, and additive material within the reservoir is deposited on the surface of that roller.

The pick-up roller 720 is in roll contact with a plurality of protruding applicator dies 1840, 1842, 1844, 1846 of application roller 1800. The application roller dies preferably are of the general dimension of the pattern of additive material that is desired to be applied to the paper web 55. An exemplary application roller 1800 is manufactured from stainless steel, elastomeric material, or a combination of those materials. For example, the larger wheel portion of the applicator roller can be manufactured from stainless steel, and the protruding dies can be manufactured as replaceable inserts manufactured from relatively soft elastomeric materials. Alternatively, the wheel and die component parts of the applicator roller can be manufactured from a hard metal material, such as stainless steel. An exemplary applicator roller has a diameter of about 50 mm to about 100 mm, and typically about 85 mm; and possesses four protruding dies each of about 10 mm to about 15 mm in height, about 22 mm to about 25 mm in width, and about 5 mm to about 8 mm in circumferential length. Other sizes and shapes of the dies, other configurations of the dies on the roller, other roller sizes, and the composition of components used to manufacture the roller, can be a matter of design choice. For the embodiment shown, application roller 1800 rotates clockwise.

In a preferred embodiment, each roller 725, 1800 is driven independently. For example, one servo drive (not shown) can control the rotation of transfer roller 725, and a second servo drive (not shown) can control the applicator roller 1800. Controlling operation of the two rollers 725, 1800 with independent servo system allow for independent control of speeds of those two rollers, and hence, the ability to tightly control the tolerances associated with application of additive material to the paper web using those two rollers. Rollers that are independently adjustable also are preferred in that the degree of touching of the roll faces of the respective rollers during roll contact can be controlled. For example, roller lift bracket 798 is slidingly adjustable about pivot plate 1806 by means of actuation by air cylinder 1805 to move roller 725 into and out of roll contact with paper web 55 and protruding dies 1840, 1842, 1844, 1846 of the applicator roller 1800.

In operation, the continuous paper web 55 passes between the roll faces of the transfer roller 725 and the application roller 1800. As a result of the contact experienced by the paper web 55 as it travels between the roll faces of the transfer pressure roller 725 and the applicator roller 1800, additive material transferred to the surfaces of the protruding dies 1840, 1842, 1844, 1846 from the surface of the applicator roller 720 is applied to the paper web 55 in a predetermined pattern. As such, the die faces provide a type of off-set printing of additive material to desired locations on the moving paper web. Movement of the transfer pressure roller 725 can programmed, such as by a microprocessor associated with the operation of the cigarette making machine. Such control by a signal received from the cigarette making machine can allow for retraction of the pressure roller from the paper web 55 so as to not be in contact with the various rollers when the cigarette making machine is not in normal operation; and as such, problems associated with sticking of the paper web to various components of the applicator apparatus 70 are minimized, avoided or prevented.

Figure 22:
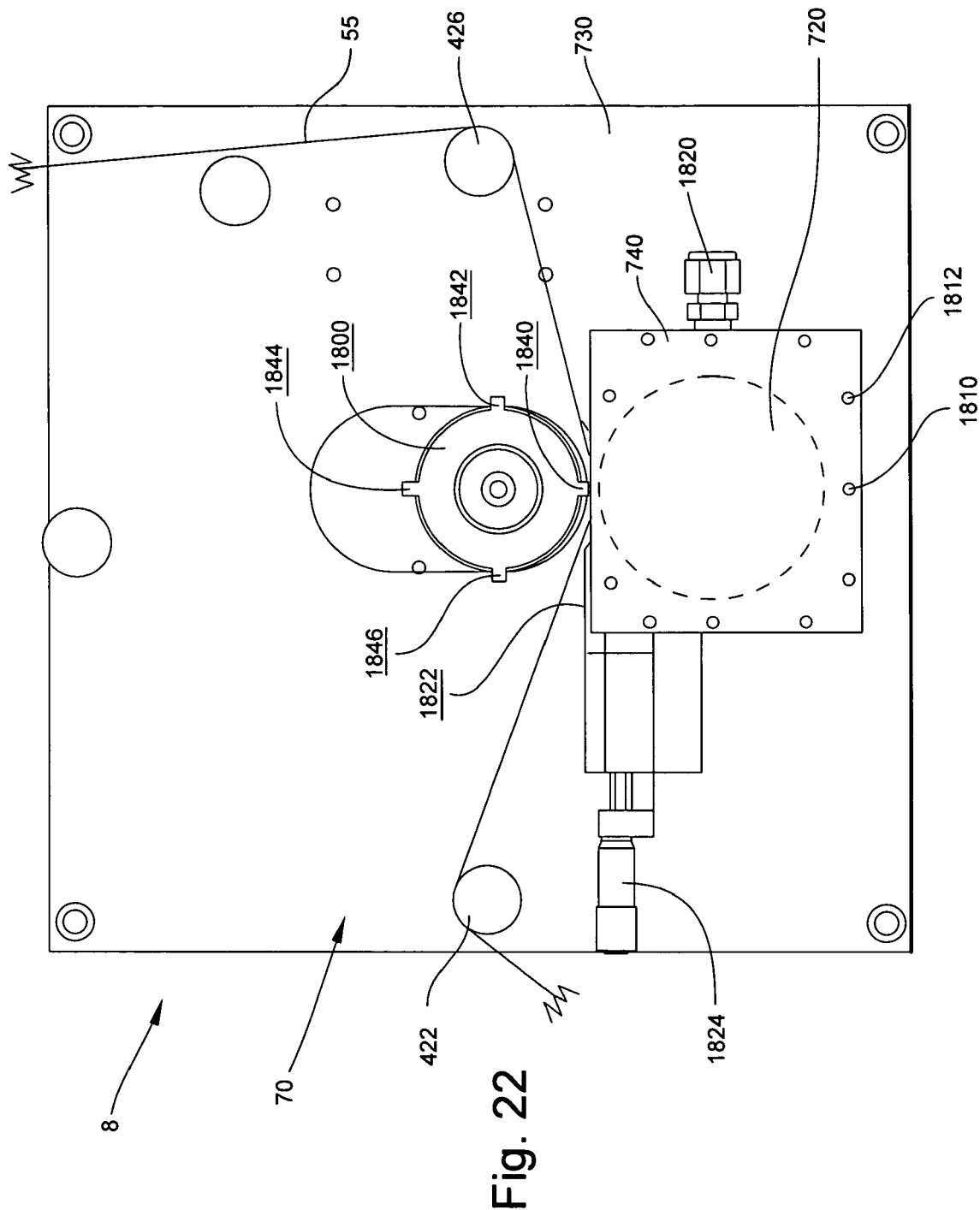
FIG. 22 is a schematic illustration of an additive applicator apparatus of an embodiment of the present invention.

Referring to FIG. 22, there is shown a portion of a cigarette making machine assembly 8; and there also are shown relevant components of another representative additive applicator apparatus 70. Such an applicator 70 is particularly useful for applying to a paper web 55 certain types of viscous additive materials. Such additive materials useful in applications involving cigarette paper include, for example, paste-type formulations of additive materials having viscosities in the range of about 500,000 centipoise to about 2,500,000 centipoise.

Additive applicator 70 is an assembly that includes a pick-up roller 720 in roll contact with an applicator roller 1800. Those rollers are mounted through a front roller plate 730 secured to front exterior of a cigarette making machine. Each of a plurality of rollers 422, 426, is fixedly mounted to the front roller plate 730; and those rollers provide guides for a path over which the paper web 55 travels from a bobbin (not shown) to the additive applicator 70 and on to other regions of the cigarette making machine 8.

The pick-up roller 720 (shown in phantom) is positioned within a reservoir 740 for the additive material (not shown). The reservoir is maintained in place and secured to the front roller plate 730 by bolts 1810, 1812 or other suitable connection means. The reservoir 740 is connected to a source (not shown) of additive material (e.g., a formulation having the form of a paste), through port 1820 near the top region of the reservoir 740. As such, a source of additive material for the pick-up roller 720 is provided. Typically, the additive material is supplied through tubing (not shown), such as Tygon-type tubing or polyethylene tubing, that feeds the reservoir 740 through port 1820.

A doctor blade 1822 is positioned near the pick-up roller 720 near the top region of that roller. The doctor blade can be mounted in a fixed position relative to the roll face of the roller. The doctor blade also can be adjustable, for example, by being positioned so as to be movable using a micrometer 1824. As such, the positioning of the doctor blade 1822 relative to the roll face of roller 720 can be adjusted. Preferably, the doctor blade is positioned in order that additive material that has been applied to the roll face of the pick-up roller is provided in the desired amount. Typically, the doctor blade is positioned so as to provide a layer of additive material on the roll face of the pick-up roller that has the desired thickness, both along the length and width of the roll face. Typically, the doctor blade 1822 is positioned about 0.001 to about 0.002 inch from the surface of the roll face of pick-up roller 720. After the additive material on the roll face of the pick-up roller has been provided in the desired amount, that additive material is transferred from the roll face of the pick-up roller to appropriate locations on the paper web 55.

The pick-up roller 720 preferably is manufactured from a material that can vary, that can be, e.g., a soft material or a hard material, but preferably is manufactured from an elastomeric type material, such as a polyurethane rubber type material, or other suitable material. An exemplary pick-up roller is described previously with reference to FIG. 21. The pick-up roller rotates clockwise (for the embodiment shown) within the reservoir 740, and additive material within the reservoir is deposited on the surface of the roll face of that roller.

The pick-up roller 720 is in roll contact with protruding applicator cams 1840, 1842, 1844, 1846 of application roller 1800. The application roller cams are of the general dimension of the pattern of additive material that is desired to be applied to the paper web 55. An exemplary application roller 1800 is described previously with reference to FIG. 21. For the embodiment shown, application roller 1800 rotates counter-clockwise.

In a preferred embodiment, each roller 725, 1800 is driven independently. For example, one servo drive (not shown) can control the rotation of transfer roller 725, and a second servo drive (not shown) can control the applicator roller 1800. Controlling operation of the two rollers 725, 1800 with independent servo systems allow for independent control of speeds of those two rollers, and hence, the ability to tightly control the tolerances associated with application of additive material to the paper web using those two rollers.

In operation, the continuous paper web 55 passes between the roll faces of the pick-up roller 720 and the application roller 1800. As a result of the contact experienced by the paper web 55 as it travels between pick-up roller 720 and the applicator roller 1800, additive material transferred by the surfaces of the protruding cams 1840, 1842, 1844, 1846 from the surface of the applicator roller 720 is applied to the paper web 55 in a predetermined pattern. That is, the protruding applicator roller cams on the side of paper web, opposite the pick-up roller and the additive material, cause periodic deflection of the paper web toward the pick-up roller; and as such, additive material is transferred from the surface of the pick-up roller to the paper web in a controlled manner as a result of the camming action of the applicator roller. The paper web 55 is routed in a manner such that the paper web has a tendency to move upwards and away from the surface of the applicator pick-up roller when the various cams are not deflecting that paper web downwards. As a result, control of the location of the application of additive material on the paper web can be carried out.

Figure 23:
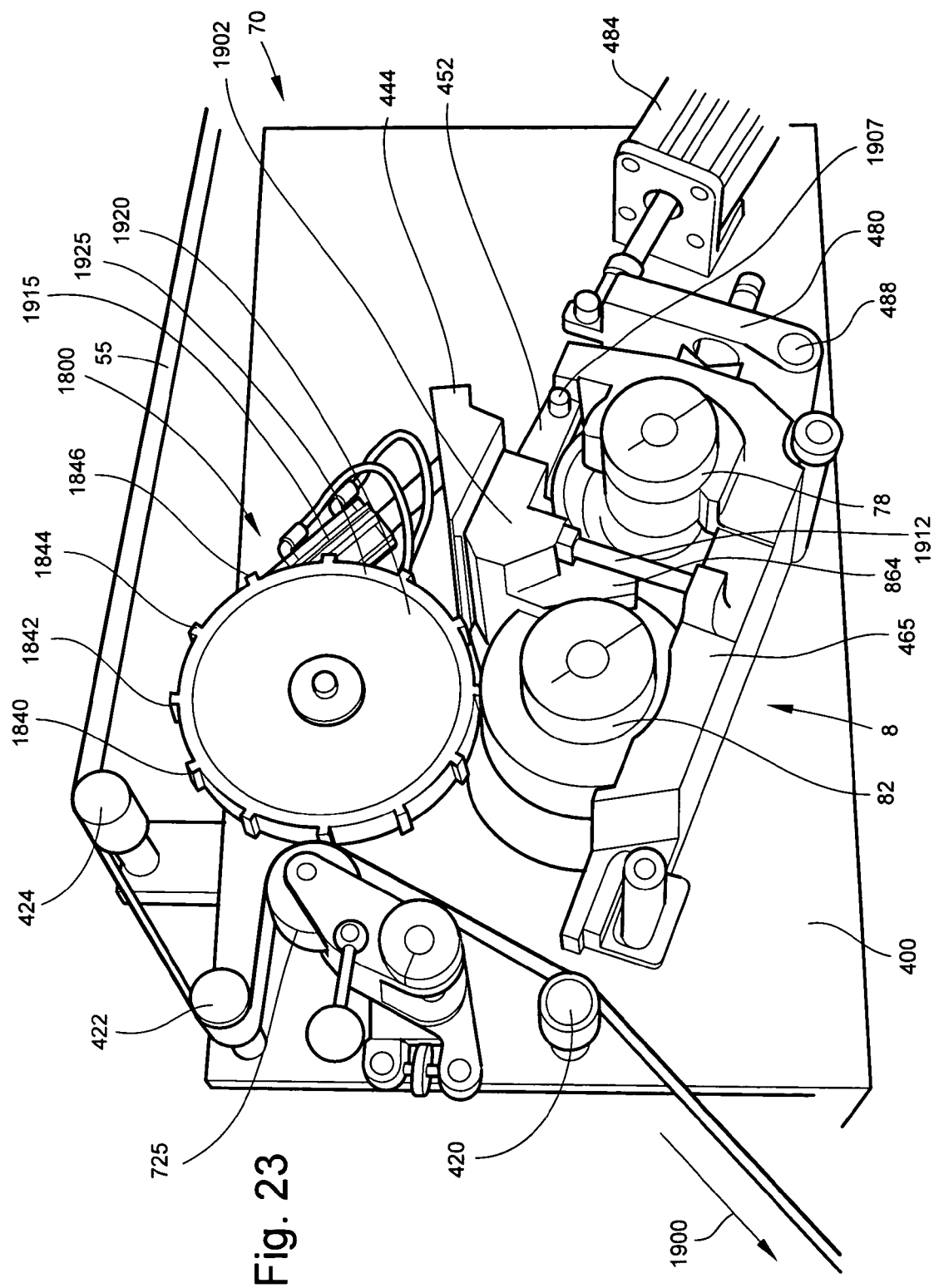
FIG. 23 is a perspective of an additive applicator apparatus of one embodiment of the present invention, that additive applicator apparatus being mounted at an appropriate location on a cigarette making machine assembly.
Figure 24:
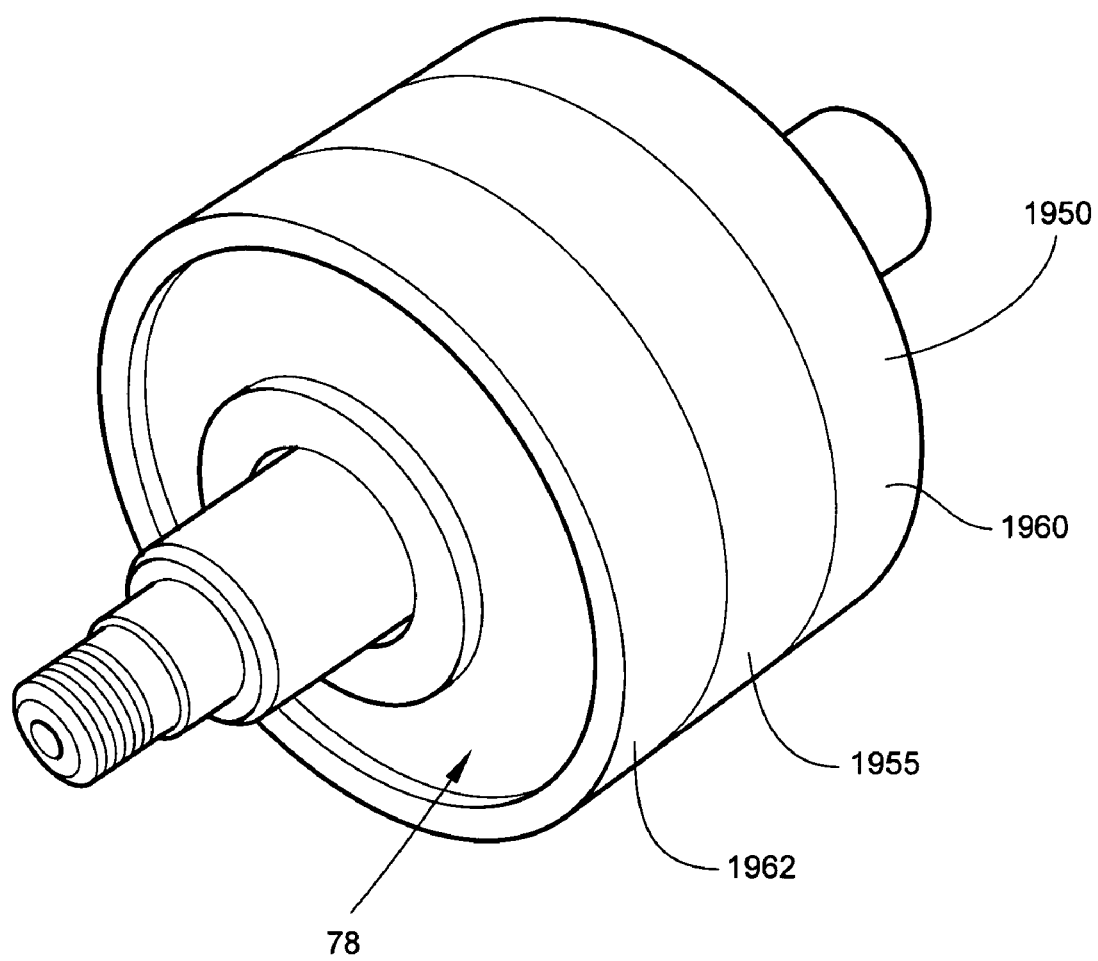
FIGS. 24-28 are perspectives of a portion of an additive applicator apparatus of the type shown in FIG. 23.

Referring to FIG. 23, there is shown a portion of a cigarette making machine assembly 8 of the present invention. In particular, there is shown an additive applicator apparatus 70 representative of one aspect of the present invention. Such an additive applicator 70 is particularly useful for applying to a paper web 55 additive materials (not shown) that can have relatively wide ranges of viscosities (e.g., formulations of additive materials that can be considered to have forms ranging from liquid to relatively thick pastes).

Additive applicator 70 is an assembly that includes a pick-up roller 78 and a transfer roller 82 mounted adjacent to each other, and mounted through a roller support plate 400 on the exterior front face of the cigarette making machine assembly 8. Descriptions of various relevant components of such an additive applicator apparatus 70 are set forth previously with reference to FIGS. 3-7, 21 and 22. Various components of such an additive applicator 70 are manufactured from suitable metals, such as cast or machined aluminum or stainless steel. The pick-up roller 78 and the transfer roller 82 preferably are manufactured from hardened stainless steel. An exemplary pick-up roller has a diameter of about 80 mm to about 130 mm, and a total roll face width of about 55 mm to about 80 mm. An exemplary transfer roller has a diameter of about 80 mm to about 130 mm, and a total roll face width of about 35 mm to about 50 mm. Several fixed guide posts, air bars or rotatable guide rollers 420, 422, 424, are suitably fixedly mounted; such as to either the front roller plate 400 or the chassis of the cigarette making machine assembly 8, depending upon the desired location of those guide posts or rollers. Those guide posts or rollers provide the path over which the paper web 55 travels from a bobbin (not shown) in the direction shown by arrow 1900, past the additive applicator 70, and on to other downstream destinations of the cigarette making machine assembly.

The additive applicator 70 also includes a manifold 444 positioned above an additive material reservoir (not shown). That reservoir is located in the nip zone above pick-up roller 78 and transfer roller 82, and the general size and shape of that reservoir is determined by the configuration of those rollers and control block 1902. As such, a type of puddle of additive material is provided in the nip zone about those rollers. The positioning of the control block 1902 is maintained through the positioning of a reservoir front arm 452 and a reservoir rear arm (not shown). Those reservoir arms are positioned above the pick-up roller 78, and are movable about pivot pin 1907. The control block 1902 can be positioned up or down through the use of an adjustable stop arm 1912. In addition to assisting in providing the boundaries of the reservoir, the control block also provides internal and external porting (not shown) for supply additive material (not shown) from an external source (not shown) and removal of excess additive material for recycling or disposal.

The manifold 444 is attached to a manifold pivot plate (not shown), which is attached to the front roller plate 400. Such attachment leaves the manifold 444 with the capability of moving upward and downward about a manifold pivot pin (not shown). The manifold 444 can be maintained in place during operation of the system through force provided by an air cylinder 1915. Tubing (not shown), such as Tygon-type or polyethylene tubing, or other suitable supply means, is connected to the manifold 444 and originates at a source of additive material (not shown) to provide an input of additive material to the reservoir (not shown). The assembly also includes a collection pot 465 positioned adjacent to and slightly below the pick-up roller 78. The collection pot 465 serves as a temporary collection location for excess additive material removed from the pick-up roller 78. If desired, the reservoir can be equipped with devices for monitoring the amount of additive material that is present within that reservoir, such as are described hereinbefore with reference to FIG. 4. The reservoir of the additive applicator 70 provides a receptacle for the additive material to the point of deposit onto the pick-up roller 78.

Against the front side face of the transfer roller 82 is positioned a scraper 864. A corresponding scraper (not shown) is positioned against the back side face of the transfer roller 82. The scrapers are formed as downwardly extending arms of the control block 1902. As such, excess additive material on the surfaces of the side faces of the transfer roller 82 is scraped from that roller as it passes the scraper. That material then exits at least one outlet port (not shown), which is located within the control block 1902. Typically, two ports, one on each of the front and rear sides of the transfer roller 82, are employed. Then, the excess material is removed through tubes (not shown) to be recycled or discarded. A diaphragm pump (not shown) or other type of suitable means for supply of vacuum can be used to evacuate excess additive material from the system. As such, both side faces of the transfer roller 82 are subjected to surface treatment by two scraper pieces arranged along the side of that roller, so as to remove undesirable excess additive formulation from those surfaces, and hence, maintain those surfaces relatively clean by maintaining those surfaces relatively free of build up of coating formulation. If desired, further surface treatments of either or both of the pick-up roller and transfer roller with air streams, water spray, scrapes or brushes can be employed to assist in maintaining the surfaces of those rollers clean and to assist in reducing the generation of heat caused by friction.

The transfer roller 82 and the pick-up roller 78 are positioned into operative engagement with one another using a roller pressure plate 480. The roller pressure plate 480 is operably connected to an air cylinder 484, or other suitable means for applying force to rollers 78, 82. The air cylinder 484 utilizes compressed air to force the roller pressure plate 480 about a pressure plate pivot shaft 488 into and out of engagement with the transfer roller 82. That plate 480 applies pressure to the collection pot 465 to move that collection pot into engagement with a bearing housing (not shown) on the shaft of pick-up roller 78. Thus, intimate roll contact between the roll faces of transfer roller 82 and pick-up roller 78 can be provided. Movement of the roller pressure plate 480 to engage and disengage the pick-up roller 78 with the transfer roller 82 can programmed, and as such a microprocessor associated with the operation of the cigarette making machine can be used to control movement of that plate 480.

In operation, pick-up roller 78 is rotated counter-clockwise and the transfer roller 82 is rotated clockwise. Hence, additive material introduced into the upper nip region (e.g., reservoir) between the rotating pick-up roller 78 and counter-rotating transfer roller 82 fills a grooved or recessed region (not shown) in the roll face of pick-up roller, and is retained on the roll face of the transfer roller in the region thereof adjacent that grooved or recessed region. As such, there is provided an assembly and method for continuously providing a predetermined supply of additive material to a predetermined region of the roll face of the transfer roller 82.

Additive applicator 70 is an assembly that also includes an application roller 1800 and a transfer pressure roller 725 (or back-up roller) mounted on each side of an application roller 82. Typically, the back-up roller 725 is manufactured from an elastomeric material; and exemplary back-up rollers are those that are used in cigarette making machines that are commercially available. Those rollers are mounted through a front roller plate 400 that is secured to the front exterior region of a cigarette making machine 8. Other back-up roller configurations, such as those types of configurations described previously with reference to FIGS. 5, 6 and 21, also can be employed. The moving paper web 55 is passed between the roll faces of the application roller 1800 and the back-up roller 725.

The manner of arranging and mounting the various rollers can vary. For example, any or all of the rollers can be designed so as to be mounted using a tapered shaft and spindle type of configuration.

The transfer roller 82 is in roll contact with a plurality (e.g., twelve, or other selected number) of protruding applicator dies 1840, 1842, 1844, 1846 of application roller 1800. The application roller dies preferably are of the general dimension of the pattern of additive material that is desired to be applied to the paper web 55. An exemplary application roller 1800 is manufactured from stainless steel, elastomeric material, or a combination of those materials. For example, larger central wheel portion 1920 of the applicator roller can be manufactured from stainless steel, and the protruding dies within the outer roll face 1925 can be shaped manufactured from a relatively soft or flexible elastomeric material. Alternatively, the protruding dies can be manufactured as replaceable inserts manufactured from relatively soft or flexible elastomeric materials. Exemplary elastomeric type materials, are materials such as a polyurethane rubber type material, a natural gum rubber, silicon rubber, and ethylene-propylene diene monomer rubber. Representative protruding dies and associated components fashioned from elastomeric materials can be provided from polyurethane rubber materials of the types available as Cytec Compound #TV-8070 Polyurethane 60-65 Durometer "A", Cytec Compound #TV-8050 Polyurethane 40-45 Durometer "A", and Cytec Compound #TV-8090 Polyurethane 80-85 Durometer "A", from Cytec Inc. Alternatively, the wheel and die component parts of the applicator roller can be manufactured from a hard metal material, such as stainless steel. An exemplary applicator roller has a diameter of about 100 mm to about 200 mm, and typically about 130 mm to about 170 mm; and possesses about four to about sixteen protruding dies each of about 1 mm to about 4 mm in radial height, about 22 mm to about 25 mm in width, and about 5 mm to about 8 mm in circumferential length. Such an applicator roller can be used to apply to one surface of a web of cigarette paper wrapping material spaced bands that are oriented transversely to the longitudinal axis of that paper web. Other sizes and shapes of the dies, other configurations of the dies on the roller, other roller sizes, and the composition of components used to manufacture the roller, can be a matter of design choice. For the embodiment shown, application roller 1800 rotates counter-clockwise.

For a representative embodiment, the pick-up roller 78 and the transfer roller 82 each have diameters of about 103 mm. The transfer roller 82 has a roll face having a width of about 40 mm. The pick-up roller 78 has a roll face having a width of about 68 mm, and a groove having a width of about 22.5 mm is located about equidistant from each side of that roller and circumscribes the entire roll face of that roller. The groove has a depth that can vary, and the depth of a representative groove is about 0.001 inch to about 0.003 inch. The application roller has a width of about 23 mm; and has an inner roller having a diameter of about 130 mm, and an outer face of polyurethane-type rubber material having a radial thickness of about 7 mm, and extending from the outer face are twelve equally spaced dies each having a radial height of about 2.5 mm and a circumferential length of about 6 mm. Such an application roller 1800 can be used to apply to a cigarette paper wrapper an adhesive formulation in the form of spaced bands that are arranged to extend across at least a portion of the width of that wrapper, and that have widths of about 23 mm and lengths of about 6 mm.

In a preferred embodiment, each of the transfer roller 82 and the application roller 1800 is driven independently. For example, one servo drive (not shown) can control the rotation of application roller 1800, and a second servo drive (not shown) can control the transfer roller 82. The rotation of the pick-up roller 78 relative to the rotation of the transfer roller 78 can be tightly controlled (e.g., in terms of a timed speed of rotation) in the general manner described previously with reference to FIG. 4. Controlling operation of the various rollers with independent servo systems allows for independent control of speeds of the two supply rollers (e.g., the pick-up and transfer rollers) relative to the application roller, and hence, the ability to tightly control the tolerances associated with application of additive material to the paper web using a multi-roller system. Additionally, it is preferred that rollers that are independently adjustable, in that the degree of touching of the roll faces of the respective rollers during roll contact can be controlled. If desired, each of the application roller 1800, transfer roller 82 and pick-up roller 78 each can be independently operated using three separate servo systems.

In operation, during the process of cigarette manufacture, the pick-up roller 78 is rotated counter-clockwise, and the transfer roller 82 is rotated clock-wise. Those rollers are engaged in contact by pressure supplied by the pressure plate 480. Additive material (not shown) is fed from a source (not shown) to the manifold 444, and from the manifold to the reservoir (not shown). As such additive material is introduced into the upper nip region between the roll faces of the pick-up roller 78 and the transfer roller 82. Due to the continuous groove (not shown) in the roll face of the pick-up roller, additive material has a tendency to fill that groove; and due to the maintained roll contact between the pick-up and transfer rollers, additive material is applied as a continuous stripe on a portion of the roll face of the transfer roller in the region thereof adjacent the groove of the pick-up roller. The application roller 1800, which is in roll contact with the transfer roller, rotates counter-clockwise. Hence, coating formulations, such as mixtures incorporating modified starches and water, can be applied in the desired amount and in the desired manner, on the appropriate region of the roll face of transfer roller, and that formulation then can be efficiently and effectively transferred from the transfer roller to the appropriate regions of the application roller. The continuous paper web 55 passes between the roll faces of the transfer roller 1800 and the back-up roller 725. As a result of the contact experienced by the paper web 55 as it travels between the roll faces of the transfer pressure roller 725 and the applicator roller 1800, additive material transferred to the surfaces of the protruding dies 1840, 1842, 1844, 1846 from the surface of the applicator roller is applied to the paper web 55 in a predetermined pattern. As such, the die faces provide a type of off-set printing of additive material to desired locations on the moving paper web. As a result, the additive material on the surface of the application roller 1800 is transferred to the inside surface of the advancing paper web 55 at locations corresponding to the pattern on the roller face of the application roller. Operation and interaction of the transfer roller 82 and application roller 1800 relative to one another are such that the transfer roller supplies the desired amount of additive material to the die faces of the application roller. Operation and interaction of the die faces of the application roller 1800 and the paper web 55 are such that additive material on successive die faces is applied at predetermined and desired locations of the paper web. That is, the paper web 55 is supplied at a very high rate of speed, and hence, the various rollers also rotate as a correspondingly high rate of speed. The paper web 55 having additive material applied thereto then is advanced to downstream locations of the cigarette making machine.

Referring to FIG. 24, there is shown a pick-up roller 78 that is representative of the type of pick-up roller described previously with reference to FIG. 24. The pick-up roller 78 possesses a roll face 1950, as well as a circumferentially extending groove 1955 that extends completely around the periphery of the roll face. The width of the groove can vary, and can be designed to provide a desired amount of additive material formulation (not shown). The depth of the groove can also vary, and can be designed to provide a desired amount of additive material formulation (not shown). The groove 1955 most preferably is positioned such that the recess in the roll face of the roller is located between front side roll face surface 1960 and rear side roll face surface 1962. As such, in operation, the roll face (not shown) of the transfer roller (not shown) is in roll contact with side roll face surfaces 1960, 1962 of the pick-up roller 78; and a hollow region (not shown) is formed in the region where those rollers are in roll contact, due to the presence of the groove 1955 in the roll face 1950 of the pick-up roller. Although a preferred embodiment possesses one continuous groove, other groove designs can be employed. For example, a series of continuous grooves, grooves forming the shape of a grid, or other type of pattern, can be employed.

Figure 25:
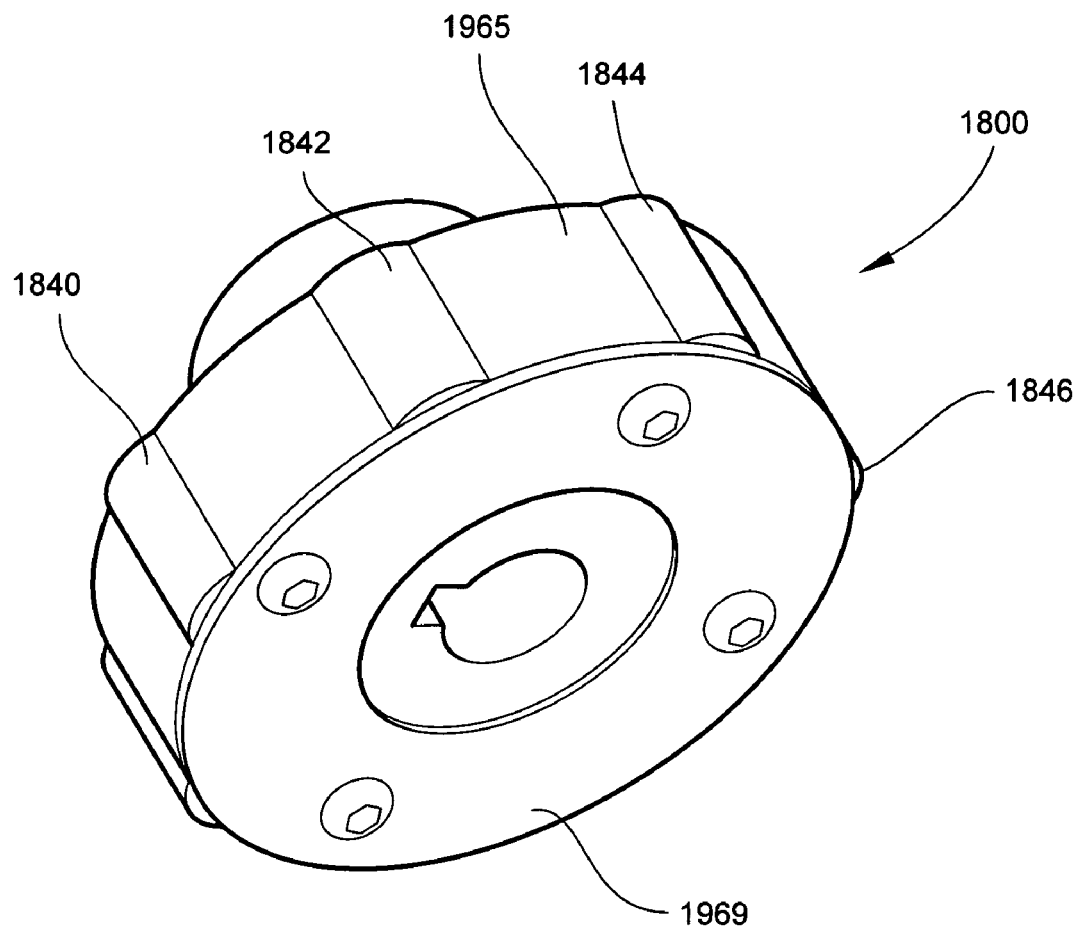

Referring to FIG. 25, there is shown an alternate type of application roller 1800 that is representative of the type of application roller described previously with reference to FIG. 23. Such an application roller can be used as the application roller in the types of applicator systems described previously with reference to FIGS. 21 and 22. The application roller possesses a plurality of spaced dies 1840, 1842, 1844, 1846 positioned at desired locations on the roll face 1965 (e.g., the peripheral surface) of the roller 1800. The dies are provided from cylinders of elastomeric material positioned in semi-circular types of recesses formed in the large central region of the roller. A removable side plate 1969 helps assist in maintaining the dies in place on the roll face of the roller.

Figure 26:
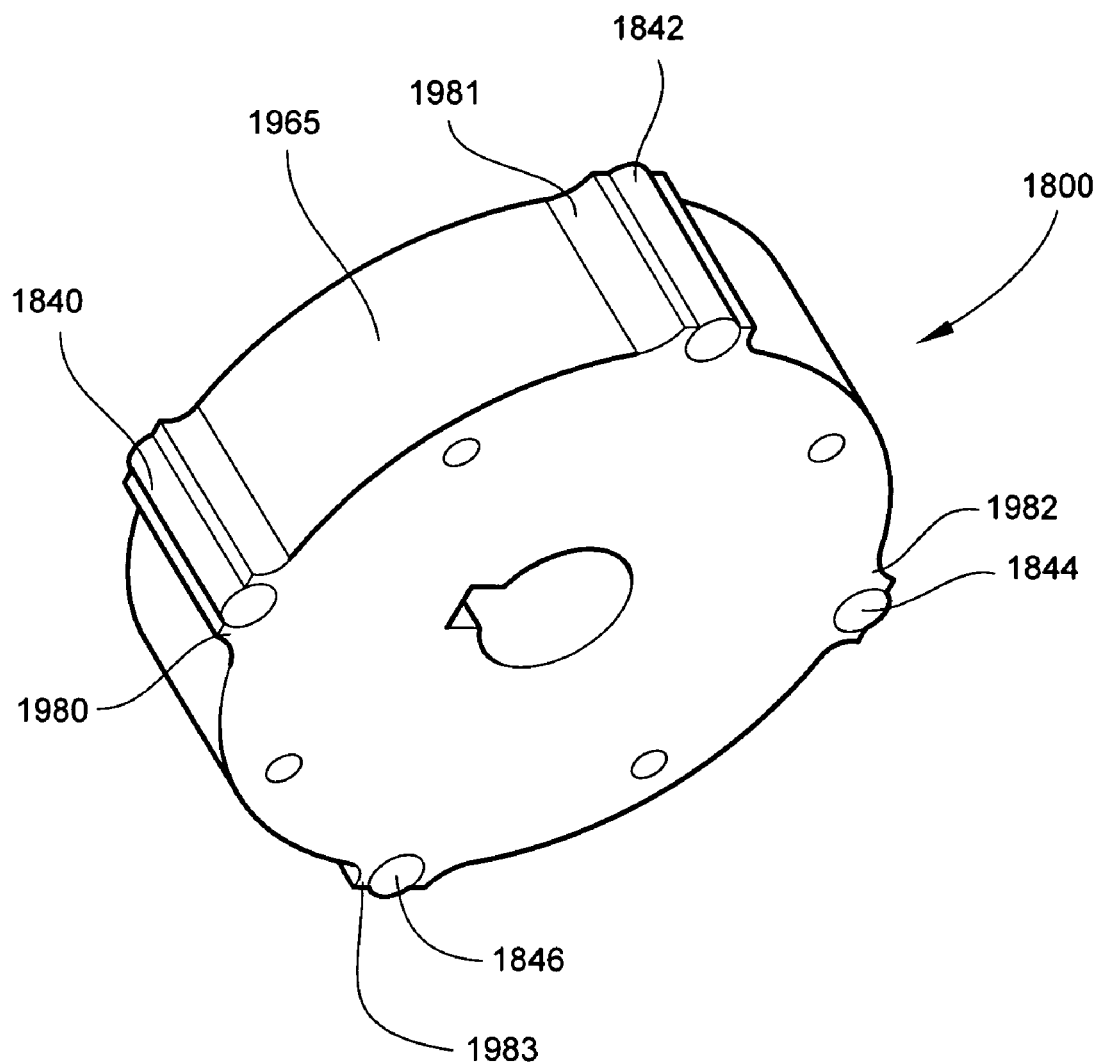

Referring to FIG. 26, there is shown an alternate type of application roller 1800 that is representative of the type of application roller described previously with reference to FIG. 23. Such an application roller can be used as the application roller in the types of applicator systems described previously with reference to FIGS. 21 and 22. The application roller possesses a plurality of spaced dies 1840, 1842, 1844, 1846 positioned at desired locations on the roll face 1965 of the roller 1800. The dies 1840, 1842, 1844, 1846 are provided from cylinders of elastomeric material positioned in outwardly extending insertion regions 1980, 1981, 1982, 1983, respectively, formed in the large central region of the roller. A removable side plate (not shown) helps assist in maintaining the dies in place on the roll face of the roller.

Figure 27:
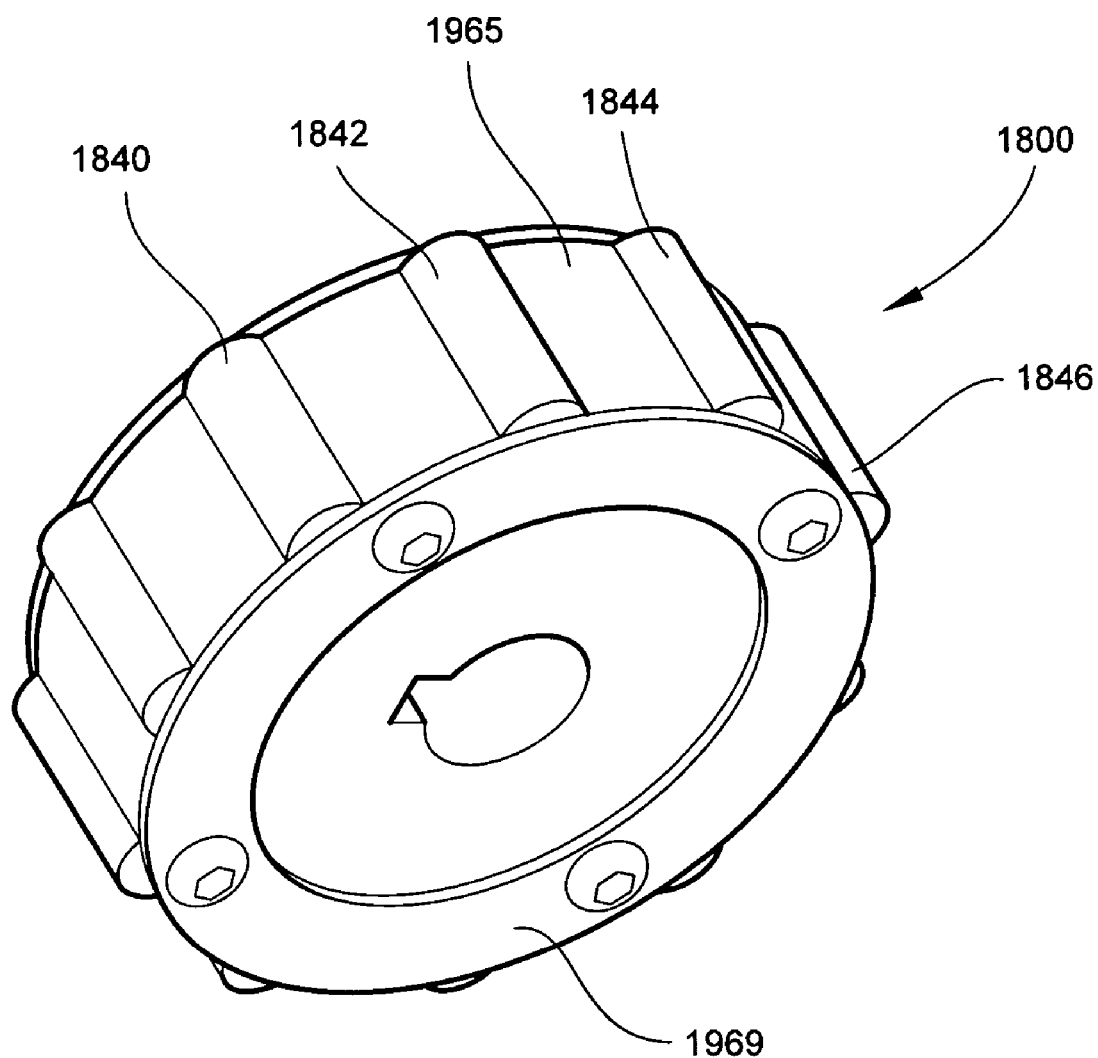

Referring to FIG. 27, there is shown an alternate type of application roller 1800 that is representative of the type of application roller described previously with reference to FIG. 23. Such an application roller can be used as the application roller in the types of applicator systems described previously with reference to FIGS. 21 and 22. The application roller possesses a plurality of spaced dies 1840, 1842, 1844, 1846 positioned at desired locations on the roll face 1965 of the roller 1800. The dies are provided from cylinders of elastomeric material positioned in corresponding semi-circular types of recesses formed in the large central region of the roller. A removable side plate 1969 helps assist in maintaining the dies in place on the roll face of the roller.

Figure 28:
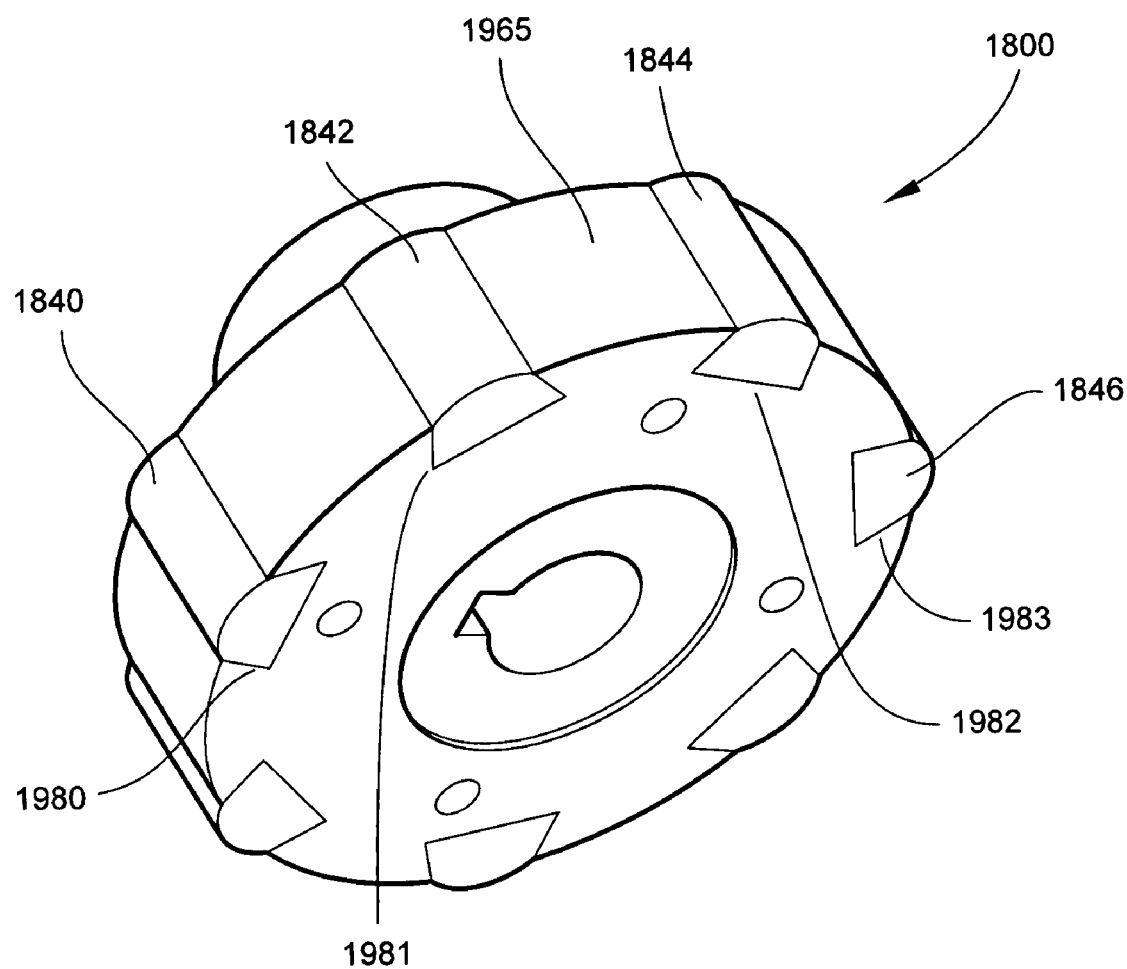

Referring to FIG. 28, there is shown an alternate type of application roller 1800 that is representative of the type of application roller described previously with reference to FIG. 23. Such an application roller can be used as the application roller in the types of applicator systems described previously with reference to FIGS. 21 and 22. The application roller possesses a plurality of spaced dies 1840, 1842, 1844, 1846 positioned at desired locations on the roll face 1965 of the roller 1800. The dies are provided from shaped pieces of elastomeric material positioned in corresponding formed recesses 1980, 1981, 1982, 1983 (e.g., wedge-shaped types of recesses) formed in the large central region of the roller. A removable side plate (not shown) helps assist in maintaining the dies in place on the roll face of the roller.

The various components, systems and methods can be employed individually, or in various combinations with one another. In one regard, a cigarette making machine assembly can incorporate an on-line additive application system for a paper web, a modified finger rail assembly and/or a modified garniture entrance cone, a registration system, an inspection system, and heating/cooling control system, each of which are of the type that have been described as various aspects of the present invention. In another regard, for example, the on-line additive application systems can be incorporated into cigarette making machine assemblies without any or all of those other components that have been described as various aspects of the present invention. In another regard, for example, the modified finger rail assemblies and/or the modified garniture entrance cones can be incorporated into cigarette making machine assemblies that do not possess any or all of those other components or features that have been described as various aspects of the present invention. In addition, for example, cigarette making machine assemblies possessing on-line application systems, modified finger rail assemblies and/or modified garniture entrance cones and heating/cooling control systems of the types of the present invention can be employed without using registration systems and/or inspection systems. Likewise, for example, cigarette making machine assemblies possessing registration systems and/or inspection systems of the types of the present inventions can be employed without using those modified finger rail assemblies, modified garniture entrance cones and/or heating/cooling control systems that have been described as various aspects of the present invention.

The various aspects of the present invention, whether employed individually or in some combination, offer several advantages and improvements to conventional systems and methods for cigarette manufacture. The present invention allows a cigarette manufacturer to apply predetermined and discrete amounts of an additive material to a continuous advancing strip of a paper web at desired locations on that paper web, during the manufacture of a continuous cigarette rod using conventional types of cigarette making equipment and methodologies. Of particular interest are bands of additive material that are positioned perpendicularly to the longitudinal axis of the paper web, and those bands can be positioned so as to extend across less than the total width of that paper web. As such, the location of additive material can be controlled so as to not be located in the lap zone of the continuous cigarette rod (e.g., where the side seam adhesive is applied). Thus, for example, a continuous paper web having a width of about 27 mm and used to provide a cigarette rod having a circumference of about 24.5 mm (i.e., such that the lap zone has a width of about 2.5 mm) can have a band applied to that web such that the band is not located within the lap zone where side seam adhesive is applied; and as such, such a band can have a transversely extending length of about 22 mm to about 24.5 mm. The present invention allows a cigarette manufacturer to apply to paper webs additive formulations that have a wide range of chemical and physical properties, and that are provided for application in a wide variety of forms (e.g., a wide range of viscosities). The finger rail modifications, the garniture entrance cone modifications and the heating/cooling control systems of the present invention provide a manufacturer of cigarettes an efficient and effective way to produce cigarettes having additive material applied to the wrapping materials of those cigarette rods in an on-line fashion, during the manufacture of those cigarette rods. That is, the present invention advantageously provides a means for retaining an additive material on a paper web and preventing transfer of the additive material to the surfaces of various components of a cigarette making machine. In addition, the present invention allows a manufacturer of cigarettes to apply additive materials to paper webs without adversely affecting the physical properties and integrity of that paper web to any significant degree. Registration of patterns (e.g., bands) applied to the paper wrapping materials of tobacco rods promotes the ability of cigarette manufacturers to provide consistent quality cigarette rods, and the ability to control the properties of cigarettes through on-line production techniques offers advantages over cigarettes that are manufactured using pre-printed paper wrapping materials. The present invention also provides a manufacturer of cigarettes with the ability to ensure the production of high quality cigarettes with applied patterns registered in the desired locations of those cigarettes.

Certain preferred paper wrapping materials used in carrying out the present invention are useful for the manufacture of cigarettes designed to exhibit reduced ignition propensity. That is, cigarettes incorporating certain wrapping materials, when placed on a flammable substrate, tend to self extinguish before burning that substrate. Of particular interest are those cigarettes possessing tobacco rods manufactured using appropriate wrapping materials possessing bands composed of appropriate amounts of appropriate components so as to have the ability to meet certain cigarette extinction criteria.

The paper wrapping material that is further processed to provide the patterned wrapping material can have a wide range of compositions and properties. The selection of a particular wrapping material will be readily apparent to those skilled in the art of cigarette design and manufacture. Typical paper wrapping materials are manufactured from fibrous materials, and optional filler materials, to form so-called "base sheets." Wrapping materials of the present invention can be manufactured without significant modifications to the production techniques or processing equipment used to manufacture those wrapping materials.

Typical wrapping material base sheets suitable for use as the circumscribing wrappers of tobacco rods for cigarettes have basis weights that can vary. Typical dry basis weights of base sheets are at least about 15 $g/m^2$, and frequently are at least about 20 $g/m^2$; while typical dry basis weights do not exceed about 80 $g/m^2$, and frequently do not exceed about 60 $g/m^2$. Many preferred wrapping material base sheets have basis weights of less than 50 $g/m^2$, and even less than 40 $g/m^2$. Certain preferred paper wrapping material base sheets have basis weights between about 20 $g/m^2$ and about 30 $g/m^2$.

Typical wrapping material base sheets suitable for use as the circumscribing wrappers of tobacco rods for cigarettes have inherent porosities that can vary. Typical base sheets have inherent porosities that are at least about 5 CORESTA units, usually are at least about 10 CORESTA units, often are at least about 15 CORESTA units, and frequently are at least about 20 CORESTA units. Typical base sheets have inherent porosities that are less than about 200 CORESTA units, usually are less than about 150 CORESTA units, often are less than about 85 CORESTA units, and frequently are less than about 70 CORESTA units. A CORESTA unit is a measure of the linear air velocity that passes through a 1 $cm^2$ area of wrapping material at a constant pressure of 1 centibar. See, CORESTA Publication ISO/TC0126/SC I N159E (1986). The term "inherent porosity" refers to the porosity of that wrapping material itself to the flow of air. A particularly preferred paper wrapping material base sheet is composed of wood pulp and calcium carbonate, and exhibits an inherent porosity of about 20 to about 50 CORESTA units.

Typical paper wrapping material base sheets suitable for use as the circumscribing wrappers of tobacco rods for cigarettes incorporate at least one type of fibrous material, and can incorporate at least one filler material, in amounts that can vary. Typical base sheets include about 55 to about 100, often about 65 to about 95, and frequently about 70 to about 90 percent fibrous material (which most preferably is a cellulosic material); and about 0 to about 45, often about 5 to about 35, and frequently about 10 to about 30 percent filler material (which most preferably is an inorganic material); based on the dry weight of that base sheet.

The wrapping material incorporates a fibrous material. The fibrous material can vary. Most preferably, the fibrous material is a cellulosic material, and the cellulosic material can be a lignocellulosic material. Exemplary cellulosic materials include flax fibers, hardwood pulp, softwood pulp, hemp fibers, esparto fibers, kenaf fibers, jute fibers and sisal fibers. Mixtures of two or more types of cellulosic materials can be employed. For example, wrapping materials can incorporate mixtures of flax fibers and wood pulp. The fibers can be bleached or unbleached. Other fibrous materials that can be incorporated within wrapping materials include microfibers materials and fibrous synthetic cellulosic materials. See, for example, U.S. Pat. No. 4,779,631 to Durocher and U.S. Pat. No. 5,849,153 to Ishino. Representative fibrous materials, and methods for making wrapping materials therefrom, are set forth in U.S. Pat. No. 2,754,207 to Schur et al; and U.S. Pat. No. 5,474,095 to Allen et al.; and PCT WO 01/48318.

The wrapping material normally incorporates a filler material. Certain types of filler materials are set forth in PCT WO 03/043450. Preferably, the filler material has the form of essentially water insoluble particles. Additionally, the filler material normally incorporates inorganic components. Filler materials incorporating calcium salts are particularly preferred. One exemplary filler material has the form of calcium carbonate, and the calcium carbonate most preferably is used in particulate form. See, for example, U.S. Pat. No. 4,805,644 to Hampl; U.S. Pat. No. 5,161,551 to Sanders; and U.S. Pat. No. 5,263,500 to Baldwin et al.; and PCT WO 01/48,316. Other filler materials include agglomerated calcium carbonate particles, calcium tartrate particles, magnesium oxide particles, magnesium hydroxide gels; magnesium carbonate-type materials, clays, diatomaceous earth materials, titanium dioxide particles, gamma alumina materials and calcium sulfate particles. See, for example, U.S. Pat. No. 3,049,449 to Allegrini; U.S. Pat. No. 4,108,151 to Martin; U.S. Pat. No. 4,231,377 to Cline; U.S. Pat. No. 4,450,847 to Owens; U.S. Pat. No. 4,779,631 to Durocher; U.S. Pat. No. 4,915,118 to Kaufman; U.S. Pat. No. 5,092,306 to Bokelman; U.S. Pat. No. 5,109,876 to Hayden; U.S. Pat. No. 5,699,811 to Paine; U.S. Pat. No. 5,927,288 to Bensalem; U.S. Pat. No. 5,979,461 to Bensalem; and U.S. Pat. No. 6,138,684 to Yamazaki; and European Patent Application 357359. Certain filler-type materials that can be incorporated into the wrapping materials can have fibrous forms. For example, components of the filler material can include materials such as glass fibers, ceramic fibers, carbon fibers and calcium sulfate fibers. See, for example, U.S. Pat. No. 2,998,012 to Lamm; U.S. Pat. No. 4,433,679 to Cline; and U.S. Pat. No. 5,103,844 to Hayden et al.; PCT WO 01/41590; and European Patent Application 1,084,629. Mixtures of filler materials can be used. For example, filler material compositions can incorporate mixtures of calcium carbonate particles and precipitated magnesium hydroxide gel, mixtures of calcium carbonate particles and calcium sulfate fibers, or mixtures of calcium carbonate particles and magnesium carbonate particles.

There are various ways by which the various additive components can be added to, or otherwise incorporated into, the base sheet. Certain additives can be incorporated into the wrapping material as part of the paper manufacturing process associated with the production of that wrapping material. Alternatively, additives can be incorporated into the wrapping material using size press techniques, spraying techniques, printing techniques, or the like. Such techniques, known as "off-line" techniques, are used to apply additives to wrapping materials after those wrapping materials have been manufactured. Various additives can be added to, or otherwise incorporated into, the wrapping material simultaneously or at different stages during or after the paper manufacturing process.

The base sheets can be treated further, and those base sheets can be treated so as to impart a change to the overall physical characteristics thereof and/or so as to introduce a change in the overall chemical compositions thereof. For example, the base sheet can be electrostatically perforated. See, for example, U.S. Pat. No. 4,924,888 to Perfetti et al. The base sheet also can be embossed, for example, in order to provide texture to major surface thereof. Additives can be incorporated into the wrapping material for a variety of reasons. Representative additives, and methods for incorporating those additives to wrapping materials, are set forth in U.S. Pat. No. 5,220,930 to Gentry, which is incorporated herein by reference. See, also, U.S. Pat. No. 5,168,884 to Baldwin et al. Certain components, such as alkali metal salts, can act a burn control additives. Representative salts include alkali metal succinates, citrates, acetates, malates, carbonates, chlorides, tartrates, propionates, nitrates and glycolates; including sodium succinate, potassium succinate, sodium citrate, potassium citrate, sodium acetate, potassium acetate, sodium malate, potassium malate, sodium carbonate, potassium carbonate, sodium chloride, potassium chloride, sodium tartrate, potassium tartrate, sodium propionate, potassium propionate, sodium nitrate, potassium nitrate, sodium glycolate and potassium glycolate; and other salts such as monoammonium phosphate. Certain alkali earth metal salts also can be used. See, for example, U.S. Pat. No. 2,580,568 to Matthews; U.S. Pat. No. 4,461,311 to Matthews; U.S. Pat. No. 4,622,983 to Matthews; U.S. Pat. No. 4,941,485 to Perfetti et al.; U.S. Pat. No. 4,998,541 to Perfetti et al.; and PCT WO 01/08514. Certain components, such as metal citrates, can act as ash conditioners or ash sealers. See, for example, European Patent Application 1,084,630. Other representative components include organic and inorganic acids, such as malic, levulinic, boric and lactic acids. See, for example, U.S. Pat. No. 4,230,131 to Simon. Other representative components include catalytic materials. See, for example, U.S. Pat. No. 2,755,207 to Frankenburg. Typically, the amount of chemical additive does not exceed about 3 percent, often does not exceed about 2 percent, and usually does not exceed about 1 percent, based on the dry weight of the wrapping material to which the chemical additive is applied. For certain wrapping materials, the amount of certain additive salts, such as burn chemicals such as potassium citrate and monoammonium phosphate, preferably are in the range of about 0.5 to about 0.8 percent, based on the dry weight of the wrapping material to which those additive salts are applied. Relatively high levels of additive salts can be used on certain types of wrapping materials printed with printed regions that are very effective at causing extinction of cigarettes manufactured from those wrapping materials. Exemplary flax-containing cigarette paper wrapping materials having relatively high levels of chemical additives have been available as Grade Names 512, 525, 527, 540, 605 and 664 from Schweitzer-Mauduit International. Exemplary wood pulp-containing cigarette paper wrapping materials having relatively high levels of chemical additives have been available as Grade Names 406 and 419 from Schweitzer-Mauduit International.

Flavoring agents and/or flavor and aroma precursors (e.g., vanillin glucoside and/or ethyl vanillin glucoside) also can be incorporated into the paper wrapping material. See, for example, U.S. Pat. No. 4,804,002 to Herron; and U.S. Pat. No. 4,941,486 to Dube et al. Flavoring agents also can be printed onto cigarette papers. See, for example, the types of flavoring agents used in cigarette manufacture that are set forth in Gutcho, *Tobacco Flavoring Substances and Methods*, Noyes Data Corp. (1972) and Leffingwell et al., *Tobacco Flavoring for Smoking Products* (1972).

Films can be applied to the paper. See, for example, U.S. Pat. No. 4,889,145 to Adams; U.S. Pat. No. 5,060,675 to Milford et al., and PCT WO 02/43513 and PCT WO 02/055294. Catalytic materials can be incorporated into the paper. See, for example, PCT WO 02/435134.

Typical paper wrapping materials that can be used in carrying out the present invention are manufactured under specifications directed toward the production of a wrapping material having an overall generally consistent composition and physical parameters. For those types of wrapping materials, the composition and parameters thereof preferably are consistent when considered over regions of each of the major surfaces of those materials. However, typical wrapping materials tend to have a "two-sided" nature, and thus, there can be changes in the composition and certain physical parameters of those materials from one major surface to the other.

Though less preferred, the wrapping material can be manufactured using a paper making process adapted to provide a base web comprising multiple layers of cellulosic material. See, U.S. Pat. No. 5,143,098 to Rogers et al.

Much less preferred paper wrapping materials can have compositions and/or properties that differ over different regions of each of their major surfaces. The wrapping material can have regions of increased or decreased porosity provided by control of the composition of that material, such as by controlling the amount or type of the filler. The wrapping material can have regions of increased or decreased air permeability provided by embossing or perforating that material. See, for example, U.S. Pat. No. 4,945,932 to Mentzel et al. The wrapping material can have regions (e.g., predetermined regions, such as bands) treated with additives, such as certain of the aforementioned salts. However, wrapping materials having a patterned nature are not necessary when various aspects of the present invention are used to apply patterns to those wrapping materials using on-line pattern application techniques.

Paper wrapping materials suitable for use in carrying out the present invention are commercially available. Representative cigarette paper wrapping materials have been available as Ref. Nos. 419, 454, 456, 460 and 473 Ecusta Corp.; Ref. Nos. Velin 413, Velin 430, VE 825 C20, VE 825 C30, VE 825 C45, VE 826 C24, VE 826 C30 and 856 DL from Miquel; Tercig LK18, Tercig LK24, Tercig LK38, Tercig LK46 and Tercig LK60 from Tervakoski; and Velin Beige 34, Velin Beige 46, Velin Beige 60, and Ref. Nos. 454 DL, 454 LV, 553 and 556 from Wattens. Exemplary flax-containing cigarette paper wrapping materials have been available as Grade Names 105, 114, 116, 119, 170, 178, 514, 523, 536, 520, 550, 557, 584, 595, 603, 609, 615 and 668 from Schweitzer-Mauduit International. Exemplary wood pulp-containing cigarette paper wrapping materials have been available as Grade Names 404, 416, 422, 453, 454, 456, 465, 466 and 468 from Schweitzer-Mauduit International.

The composition of the additive material or coating formulation can vary. Generally, the composition of the coating is determined by the ingredients of the coating formulation. Preferably, the coating formulation has an overall composition, and is applied in a manner and in an amount, such that the physical integrity of the wrapping material is not adversely affected when the coating formulation is applied to selected regions of the wrapping material.

It also is desirable that components of the coating formulation not introduce undesirable sensory characteristics to the smoke generated by a smoke article incorporating a wrapping material treated with that coating formulation. Thus, suitable combinations of various components can act to reduce the effect of coatings on sensory characteristics of smoke generated by the smoking article during use. Preferred coatings provide desirable physical characteristics to cigarettes manufactured from wrapping materials incorporating those coatings. Preferred coatings also can be considered to be adhesives, as it is desirable for those coatings to remain in intimate contact with (e.g., to adhere to or otherwise remain secured to) desired locations on the wrapping material.

Examples of coating formulations and representative components thereof are set forth in U.S. Pat. No. 4,889,145 to Adams; and U.S. Pat. No. 5,060,675 to Milford et al.; U.S. patent application Ser. No. 2003/0,145,869 to Kitao et al.; U.S. patent application Ser. No. 2003/0,150,466 to Kitao et al.; and U.S. patent application Ser. No. 09/892,834, filed Jun. 27, 2001; PCT WO 02/043513; PCT WO 02/055294; and European Patent Application 1,234,514. Other coating formulations are described herein.

The coating formulation most preferably includes a film-forming agent. The film-forming agent most preferably is a polymeric material or resin. Exemplary film-forming agents include alginates (e.g., sodium alginate or ammonium alginate, including those alginates available as Kelcosol from Kelco), pectins (e.g., including those available as TIC Pre-tested HM from TIC Gums), derivatives of cellulose (e.g., carboxymethylcellulose including the Aqualon sodium carboxymethylcellulose CMC from Hercules Incorporated, and other polymeric materials such as hydroxypropylcellulose and hydroxyethylcellulose), ethylene vinyl acetate copolymers, guar gum (e.g., including Type M, Type MM, Type MM high viscosity from Frutarom; and Ticagel from TIC Gums), xanthan gum (e.g., including Keltrol from Kelco), starch (e.g., corn starch, rice starch and dextrin), modified starch (e.g., oxidized tapioca starch and oxidized corn starch), polyvinyl acetate and polyvinyl alcohol. Suitable combinations of various film-forming agents also can be employed. Exemplary blends include water-based blends of ethylene vinyl acetate copolymer emulsion and polyvinyl alcohol. Other exemplary blends are water-based blends provided by mixing starches or modified starches with emulsion polymers or copolymers.

The solvent or liquid carrier for the coating formulation can vary. The solvent can be a liquid having an aqueous character, and can include relatively pure water. An aqueous liquid is a suitable solvent or carrier for film-forming agents such as water-based emulsions, starch-based materials, sodium carboxymethylcellulose, ammonium alginate, guar gum, xanthan gum, pectins, polyvinyl alcohol and hydroxyethylcellulose. Starch-based materials are film-forming agents that are composed of starch or components derived from starch. It is preferred that the solvent not be a non-aqueous solvent, such as ethanol, n-propyl alcohol, iso-propyl alcohol, ethyl acetate, n-propyl acetate, iso-propyl acetate, toluene, and the like. Formulations that incorporate solvents in amounts and forms such that those solvents do not adversely affect the quality of the wrapping material (e.g., by causing swelling of the fibers of the wrapping material, by causing puckering of the wrapping material, or by causing wrinkling of the wrapping material) are particularly preferred.

Generally, the selection of solvent depends upon the nature of the film-forming polymeric material, and the particular polymeric material that is selected readily dissolves (i.e., is soluble) or is highly dispersible in a highly preferred solvent. Although not all components of the coating formulation are necessarily soluble in the liquid carrier, it is most preferable that the film-forming polymeric material be soluble (or at least highly dispersible) in that liquid. By "soluble" in referring to the components of the coating formulation with respect to the liquid solvent is meant that the components for a thermodynamically stable mixture when combined with the solvent, have a significant ability to dissolve in that solvent, and do not form precipitates to any significant degree when present in that solvent.

The coating formulation also can include a filler material. Exemplary filler materials can be the essentially water insoluble types of filler materials previously described. Preferred filler materials have a finely divided (e.g., particulate) form. Typical fillers are those that have particle sizes that are less than about 3 microns in diameter. Typical particle sizes of suitable fillers range from about 0.3 micron to 2 microns in diameter. The filler materials can have a variety of shapes. Exemplary filler materials are those that are composed of inorganic materials including metal particles and filings, calcium carbonate (e.g., precipitated-type fillers, including those having a prismatic form), calcium phosphate, clays (e.g., attapulgite clay), talc, aluminum oxide, mica, magnesium oxide, calcium sulfate, magnesium carbonate, magnesium hydroxide, aluminum oxide and titanium dioxide. See, for example, the types of filler materials set forth in U.S. Pat. No. 5,878,753 to Peterson et al. Representative calcium carbonate fillers are those available as Albacar PCC, Albafil PCC, Albaglos PCC, Opacarb PCC, Jetcoat PCC and Calopake F PCC from Specialty Minerals, Inc. Exemplary filler materials also can be composed of organic materials including starches, modified starches and flours (e.g., rice flour), particles of polyvinyl alcohol, particles of tobacco (e.g., tobacco dust), and other like materials. The filler material also can be fibrous cellulosic materials. See, for example, U.S. Pat. No. 5,417,228 to Baldwin et al. Although less preferred, alternate fillers can include carbon-based materials (e.g., graphite-type materials, carbon fiber materials and ceramics), metallic materials (e.g., particles of iron), and the like. The filler material also can be a water soluble salt (e.g., potassium chloride, sodium chloride, potassium citrate, sodium citrate, calcium chloride or magnesium chloride).

The coating formulations can incorporate other ingredients in addition to the aforementioned coating materials. Those ingredients can be dispersed or suspended within the coating formulation. Those other ingredients can be employed in order to provide specific properties or characteristics to the wrapping material. Those ingredients can be preservatives (e.g., potassium sorbate), humectants (e.g., ethylene glycol and propylene glycol), pigments, dyes, colorants, burn promoters and enhancers, burn retardants and inhibitors, plasticers (e.g., dibutyl phthalate, polyethylene glycol, polypropylene glycol and triacetin), sizing agents, syrups (e.g., high fructose corn syrup), flavoring agents (e.g, ethyl vanillin and caryophyllene oxide), sugars (e.g., rhamnose), flavor precursors, hydrate materials, such as metal hydrates (e.g., borax, magnesium sulfate decahydrate, sodium silicate pentahydrate and sodium sulfate decahydrate), viscosity reducing agents (e.g., urea), and the like. Certain of those ingredients are soluble in the solvent of the coating formulation (e.g., certain salts, acids and bases are soluble in solvents such as water). Certain of those ingredients are insoluble in the solvent of the coating formulation (e.g., particles of metallic materials are insoluble in most of the solvents used for coating formulations).

The coating formulation typically has a liquid, syrup or paste form, and is applied as such. Depending upon the actual ingredients that are combined with the solvent, the coating formulation has the form of a solution, an emulsion (e.g., a water-based emulsion), or a liquid having solid materials dispersed therein. Generally, the film-forming agent is dissolved or dispersed in a suitable solvent to form the coating formulation. Certain other optional ingredients also are dissolved, dispersed or suspended in that formulation. Additionally, optional filler material also is dispersed within that formulation. Preferably, the filler material is essentially insoluble and essentially chemically non-reactive with the solvent, at least at those conditions at which the formulation is employed.

The relative amounts of the various components of the coating formulation can vary. Typically, the coating formulation includes at least about 30 percent solvent, usually at least about 40 percent solvent, and often at least about 50 percent solvent, based on the total weight of that formulation. Typically, the amount of solvent within the coating formulation does not exceed about 95 percent, usually does not exceed about 90 percent, and often does not exceed about 85 percent, based on the total weight of that formulation. Most preferably, the coating formulation includes at least about 0.5 percent film-forming agent, usually at least about 1 percent film-forming agent, and often at least about 2 percent film-forming agent, based on the total weight of that formulation. Typically, the amount of film-forming agent within the coating formulation does not exceed about 60 percent, usually does not exceed about 50 percent, and often does not exceed about 40 percent, based on the total weight of that formulation. Typically, the coating formulation includes at least about 3 percent of the optional filler material, usually at least about 5 percent filler material, and often at least about 10 percent filler material, based on the total weight of that formulation. Typically, the amount of optional filler material within the coating formulation does not exceed about 35 percent, usually does not exceed about 30 percent, and often does not exceed about 25 percent, based on the total weight of that formulation.

The amounts of other optional components of the coating formulation can vary. The amount of plasticizer often ranges from about 0.5 percent to about 5 percent, preferably about 2 to about 3 percent, based on the total weight of the formulation. The amount of humectant often ranges from about 1 percent to about 5 percent, preferably about 2 to about 3 percent, based on the total weight of the formulation. The amount of wetting agent often ranges from about 0.5 percent to about 2 percent, preferably about 0.8 to about 1 percent, based on the total weight of the formulation. The amount of preservative often ranges from about 0.01 percent to about 0.3 percent, preferably about 0.5 percent, based on the total weight of the formulation. The amount of burn chemical often ranges from about 1 percent to about 15 percent, preferably about 5 to about 10 percent, based on the total weight of the formulation. The amount of viscosity reducing agent often ranges from about 1 percent to about 10 percent, preferably about 2 percent to about 6 percent, based on the total weight of the formulation. The amount of burn chemical often ranges from about 1 percent to about 15 percent, preferably about 5 to about 10 percent, based on the total weight of the formulation. The amount of metal hydrate often ranges from about 3 percent, usually at least about 5 percent, and often at least about 10 percent, based on the total weight of that formulation; but the amount of metal hydrate usually does not exceed about 35 percent, often does not exceed about 30 percent, and frequently does not exceed about 25 percent, based on the total weight of that formulation.

Flavoring agents can be incorporated into the coating formulations. Preferably, the flavoring agents exhibit sensory characteristics that can be described as having notes that are sweet, woody, fruity, or some combination thereof. The flavoring agents preferably are employed in amounts that depend upon their individual detection thresholds. Typically, the flavoring agents are employed in sufficient amounts so as to mask or ameliorate the off-tastes and malodors associated with burning paper. Combinations of flavoring agents (e.g., a flavor package) can be employed in order to provide desired overall sensory characteristics to smoke generated from the smoking articles incorporating those flavoring agents. Most preferably, those flavoring agents are employed in amounts and manners so that the sensory characteristics of those flavoring agents are hardly detectable; and those flavoring agents do not adversely affect the overall sensory characteristics of smoking article into which they are incorporated. Preferred flavoring agents can be incorporated into printing formulations, have low vapor pressures, do not have a tendency to migrate or evaporate under normal ambient conditions, and are stable under the processing conditions experienced by wrapping materials of the present invention. Exemplary flavoring agents that provide sweet notes include ethyl vanillin, vanillin, heliotropin, methylcyclopentenolone; and those flavoring agents typically are employed in amounts of 0.001 to about 0.01 percent, based on the total weight of the coating formulation into which they are incorporated. An exemplary flavoring agent that provides woody notes includes caryophyllene oxide; and that flavoring agent typically is employed in amounts of 0.2 to about 0.6 percent, based on the total weight of the coating formulation into which it is incorporated. Exemplary flavoring agents that provide fruity notes include ketones such as 4-hydroxphenyl-2-butanone and lactones such as gamma-dodecalactone; and those flavoring agents typically are employed in amounts of 0.001 to about 0.1 percent, based on the total weight of the coating formulation into which they are incorporated.

Certain additive materials can be applied to the wrapping material in the form of a coating formulation that is in a so-called "solid polymer" form. That is, film-forming materials, such as ethylene vinyl acetate copolymers and certain starches, can be mixed with other components of the coating formation, and applied to the wrapping material without the necessity of dissolving those film-forming materials in a suitable solvent. Typically, solid polymer coating formulations are applied at elevated temperatures relative to ambient temperature; and the viscosities of the film-forming materials of those heated coating formulations typically have an extremely wide range of viscosities.

One suitable formulation for an additive material for a paper web incorporates a water-based coating that is employed in liquid form, and that coating is an adhesive formulation of R.J. Reynolds Tobacco Company used as a cigarette seam adhesive and designated as CS-1242. The CS-1242 formulation is a water emulsion-based adhesive consisting of about 87 to about 88 weight percent ethylene vinyl acetate copolymer emulsion sold under the designation Resyn 32-0272 by National Starch & Chemical Company, and about 12 to about 13 weight percent adhesive concentrate stabilizer of R.J. Reynolds Tobacco Company known as AC-9. The AC-9 adhesive concentrate stabilizer consists of about 92 weight percent water and about 8 weight percent polyvinyl alcohol resin available as Celvol 205 from Celanese Chemicals. Such a formulation exhibits a viscosity of about 400 centipoise. If desired, the formulation can contain dyes or pigments for aesthetic purposes or to facilitate automated inspection of paper wrapping materials to which the formulation is applied. Such a formulation is particularly suitable for use with an application system of the type described previously with reference to FIGS. 3 and 4.

Certain preferred formulations incorporate starch. Typical formulations incorporate about 30 to about 55 weight percent starch, about 35 to about 55 weight percent water, and about 0 to about 35 weight percent other components (e.g., such as the types of additive components and processing aids that have been described previously). If desired, mixtures of starch and emulsion polymers, or mixtures of starch and emulsion copolymers, can be used. For example, a formulation can be provided by mixing starch in water with a polyvinylalcohol-stabilized emulsion polymer or copolymer (e.g., ethylene vinylacetate); or by mixing starch in water with a surfactant-stabilized emulsion polymer or copolymer.

One suitable formulation for an additive material for a paper web is a starch-based aqueous formulation. A representative formulation includes about 10 weight percent sodium chloride, about 0.5 weight percent potassium sorbate, about 35 weight percent oxidized tapioca starch available as Flo-Max 8 from National Starch & Chemical Company, about 20 weight percent calcium carbonate, and about 34.5 weight percent water. Such a formulation exhibits a viscosity of about 1,000 centipoise. If desired, the formulation can contain dyes or pigments for aesthetic purposes or to facilitate automated inspection of paper wrapping materials to which the formulation is applied. Such a formulation is particularly suitable for use with an application system of the type described previously with reference to FIGS. 3 and 4.

Another suitable formulation for an additive material for a paper web is a starch-based aqueous formulation. A representative formulation includes about 5 weight percent sodium chloride, about 0.5 weight percent potassium sorbate, about 49.8 weight percent oxidized tapioca starch available as Flo-Max 8 from National Starch & Chemical Company, and about 44.7 weight percent water. Preferably, the mixture is heated at an elevated temperature (e.g., about 170° F.) for a period of time (e.g., about 10 minutes) sufficient to result in the formation of a desirable paste. Such a formulation exhibits a viscosity in the range of about 200,000 centipoise to about 2,000,000 centipoise. The viscosity of such a formulation increases over time after initial manufacture. If desired, the formulation can contain dyes or pigments for aesthetic purposes or to facilitate automated inspection of paper wrapping materials to which the formulation is applied. Such a formulation is particularly suitable for use with an application system of the type described previously with reference to FIGS. 5-7.

Another suitable formulation for an additive material for a paper web is a starch-based aqueous formulation. A representative formulation includes about 10 weight percent sodium chloride, about 0.5 weight percent potassium sorbate, about 40 weight percent oxidized tapioca starch available as Flo-Max 8 from National Starch & Chemical Company, and about 49.5 weight percent water. Preferably, the mixture is heated at an elevated temperature (e.g., about 170° F.) for a period of time (e.g., about 10 minutes) sufficient to result in the formation of a desirable paste. After manufacture and storage, such a formulation exhibits a viscosity in the range of about 200,000 centipoise to about 2,000,000 centipoise. The viscosity of such a formulation gradually increases over time after initial manufacture. If desired, the formulation can contain dyes or pigments for aesthetic purposes or to facilitate automated inspection of paper wrapping materials to which the formulation is applied. Such a formulation is particularly suitable for use with an application system of the type described previously with reference to FIGS. 5-7.

Another suitable formulation for an additive material for a paper web is a starch-based aqueous formulation. A representative formulation includes about 10 weight percent sodium chloride, about 40 weight percent oxidized tapioca starch available as Flo-Max 8 from National Starch & Chemical Company, and about 50 weight percent water. Preferably, the mixture is heated at an elevated temperature (e.g., about 165° F.) for a short period of time (e.g., about 10 minutes). Such a formulation exhibits an initial viscosity in the range of about 2,000 centipoise to about 10,000 centipoise, and often about 3,000 to about 6,000 centipoise. The viscosity of such a formulation can have a tendency to increase over time after initial manufacture; and typically can increase to over 100,000 centipoise. If desired, the formulation can contain dyes or pigments for aesthetic purposes or to facilitate automated inspection of paper wrapping materials to which the formulation is applied. Surfactants and soaps also can be incorporated into such a formulation, in order to assist in retarding viscosity growth over time. For such a type of formulation, it is desirable to employ the formulation such that the solids content thereof is at least in the range of about 44 to about 47 weight percent. Such a formulation is particularly suitable for use with an application system of the type described previously with reference to FIG. 23.

The amount of coating formulation that is applied to the paper wrapping material can vary. Typically, coating of the wrapping material provides a coated wrapping material having an overall dry basis weight (i.e., the basis weight of the whole wrapping material, including coated and uncoated regions) of at least about 1.05 times, often at least about 1.1 times, and frequently at least about 1.2 times, that of the dry basis weight of that wrapping material prior to the application of coating thereto. Typically, coating of the wrapping material provides a coated paper having an overall dry basis weight of not more about 1.4 times, and often not more than about 1.3 times, that of the dry basis weight of the wrapping material that has the coating applied thereto. Typical overall dry basis weights of those wrapping materials are about 20 g/m² to about 40 g/m²; preferably about 25 g/m² to about 35 g/m². For example, a paper wrapping material having a dry basis weight of about 25 g/m² can be coated in accordance with the present invention to have a resulting overall dry basis weight of about 26.5 g/m² to about 35 g/m², and often about 28 g/m² to about 32 g/m².

The dry weights of the coated regions of wrapping material of the present invention can vary. For wrapping materials that are used for the manufacture of cigarettes designed to meet certain cigarette extinction test criteria, it is desirable that the wrapping materials have sufficient coating formulation applied thereto to in the form of appropriately shaped and spaced bands in order that the dry weight of additive material applied to those wrapping materials totals at least about 1 pound/ream, often at least about 2 pounds/ream, and frequently at least about 3 pounds/ream; while the total dry weight of that applied additive material normally does not exceed about 10 pounds/ream.

Typical coated regions of paper wrapping materials of the present invention that are suitable for use as the circumscribing wrappers of tobacco rods for cigarettes have inherent porosities that can vary. Typically, the inherent porosities of the coated regions of the wrapping materials are less than about 8.5 CORESTA units, usually are less than about 8 CORESTA units, often are less than about 7 CORESTA units, and frequently are less than about 6 CORESTA units. Typically, the inherent porosities of the coated regions of the wrapping materials are at least about 0.1 CORESTA unit, usually are at least about 0.5 CORESTA unit, often are at least about 1 CORESTA unit. Preferably, the inherent porosities of the coated regions of the wrapping materials, particularly those wrapping materials that are used for the manufacture of cigarettes designed to meet certain cigarette extinction test criteria, are between about 0.1 CORESTA unit and about 4 CORESTA units.

The paper wrapping material of the present invention can have can be coated in patterns having predetermined shapes. The coating can have the form of bands, cross directional lines or bands (including those that are perpendicular to the longitudinal axis of the wrapping material), stripes, grids, longitudinally extending lines, circles, hollow circles, dots, ovals, checks, spirals, swirls, helical bands, diagonally crossing lines or bands, triangles, hexagonals, honeycombs, ladder-type shapes, zig zag shaped stripes or bands, sinusoidal shaped stripes or bands, square wave shaped stripes or bands, patterns composed of coated regions that are generally "C" or "U" shaped, patterns composed of coated regions that are generally "E" shaped, patterns composed of coated regions that are generally "S" shaped, patterns composed of coated regions that are generally "T" shaped, patterns composed of coated regions that are generally "V" shaped, patterns composed of coated regions that are generally "W" shaped, patterns composed of coated regions that are generally "X" shaped, patterns composed of coated regions that are generally "Z" shaped, or other desired shapes. Combinations of the foregoing shapes also can used to provide the desired pattern.

The relative sizes or dimensions of the various shapes and designs can be selected as desired. For example, shapes of coated regions, compositions of the coating formulations, or amounts or concentrations of coating materials, can change over the length of the wrapping material. The relative positioning of the printed regions can be selected as desired. For example, wrapping materials that are used for the production of cigarettes designed to meet certain cigarette extinction test criteria, the pattern most preferably has the form of spaced continuous bands that are aligned transversely or cross directionally to the longitudinal axis of the wrapping material. However, cigarettes can be manufactured from wrapping materials possessing discontinuous bands positioned in a spaced apart relationship. For wrapping materials of those cigarettes, it is most preferred that discontinuous bands (e.g., bands that are composed of a pattern, such as a series of dots, grids or stripes) cover at least about 70 percent of the surface of the band area or region of the wrapping material.

Preferred wrapping materials possess coatings in the form of bands that extend across the wrapping material, generally perpendicular to the longitudinal axis of the wrapping material. The widths of the individual bands can vary, as well as the spacings between those bands. Typically, those bands have widths of at least about 0.5 mm, usually at least about 1 mm, frequently at least about 2 mm, and most preferably at least about 3 mm. Typically, those bands have widths of up to about 8 mm, usually up to about 7 mm. Preferred bands have widths of about 4 mm to about 7 mm. Such bands can be spaced apart such that the spacing between the bands is at least about 10 mm; often at least about 15 mm, frequently at least about 20 mm, often at least about 25 mm, in certain instances at least about 30 mm, and on occasion at least about 35 mm; but such spacing usually does not exceed about 50 mm.

There are several factors that determine a specific coating pattern for a wrapping material of the present invention. It is desirable that the components of the coating formulations applied to wrapping materials not adversely affect to any significant degree (i) the appearance of cigarettes manufactured from those wrapping materials, (ii) the nature or quality of the smoke generated by those cigarettes, (iii) the desirable burn characteristics of those cigarettes, or (iv) the desirable performance characteristics of those cigarettes. It also is desirable that wrapping materials having coating formulations applied thereto not introduce undesirable off-taste, or otherwise adversely affect the sensory characteristics of the smoke generated by cigarettes manufactured using those wrapping materials. In addition, preferred cigarettes of the present invention do not have a tendency to undergo premature extinction, such as when lit cigarettes are held in the smoker's hand or when placed in an ashtray for a brief period of time.

Cigarettes designed to meet certain cigarette extinction test criteria can be produced from wrapping materials of the present invention. Banded regions on a wrapping material are produced using additive materials that are effective in reducing the inherent porosity of the wrapping material in those regions. Film-forming materials and fillers applied to the wrapping material in those banded regions are effective in increasing the weight of the wrapping material in those regions. Filler materials that are applied to the wrapping material in those banded regions are effective in decreasing the burn rate of the wrapping materials in those regions. Typically, when wrapping materials of relatively high inherent porosity are used to manufacture cigarettes, those wrapping materials possess relatively high weight bands that introduce a relatively low inherent porosity to the banded regions. Film-forming materials have a tendency to reduce the porosity of the wrapping material, whether or not those materials are used in conjunction with fillers. However, coatings that combine porosity reduction with added coating weight to wrapping materials also are effective in facilitating extinction of cigarettes manufactured from those wrapping materials. Low porosity in selected regions of a wrapping material tends to cause a lit cigarette to extinguish due to the decrease in access to oxygen for combustion for the smokable material within that wrapping material. Increased weight of the wrapping material also tends to cause lit cigarette incorporating that wrapping material to extinguish. As the inherent porosity of the wrapping material increases, it also is desirable to (a) select a film-forming material so as to cause a decrease the inherent porosity of the coated region of the wrapping material and/or (b) provide a coating that provides a relatively large amount of added weight to the coated region of the wrapping material.

Paper wrapping materials of the present invention are useful as components of smoking articles such as cigarettes. Preferably, one layer of the wrapping material of the present invention is used as the wrapping material circumscribing the smokable material, and thereby forming the tobacco rod of a cigarette. In one regard, it is preferable that the wrapping material possesses the coated regions located on the "wire" side thereof, and the "wire" side of that wrapping material forms the inner surface of the circumscribing wrapping material of the tobacco rod. Typically, the "felt" side of the wrapping material is used as the visible outer surface of the tobacco rod. The terms "wire side" and "felt side" in referring to the major surfaces of paper sheet are readily understood as terms of art to those skilled in the art of paper and cigarette manufacture.

Cigarettes of the present invention possessing tobacco rods manufactured using certain appropriately treated wrapping materials of the present invention, when tested using the methodology set forth in the Cigarette Extinction Test Method by the National Institute of Standards and Technology (NIST), Publication 851 (1993) using 10 layers of Whatman No. 2 filter paper, meet criteria requiring extinction of greater than about 50 percent, preferably greater than about 75 percent, and most preferably about 100 percent, of cigarettes tested. Certain cigarettes of the present invention possessing tobacco rods manufactured using certain appropriately treated wrapping materials of the present invention, when tested using the methodology set forth in the methodology set forth in ASTM Designation: E 2187-02b using 10 layers of Whatman No. 2 filter paper, meet criteria requiring extinction of greater than about 50 percent, preferably greater than about 75 percent, and most preferably about 100 percent, of cigarettes tested. Preferably, each cigarette possesses at least one band located in a region of its tobacco rod such that the band is capable of providing that cigarette with the ability to meet those cigarette extinction criteria. For a tobacco rod of a particular length incorporating a wrapping material possessing bands that are aligned transversely to the longitudinal axis of the wrapping material in a spaced apart relationship, the ratio of the length of the tobacco rod to the sum of the width of a band and the distance between the bands is 1 to 2, preferably about 1.1 to about 1.4, and most preferably about 1.2.

For an exemplary full flavor cigarette having a tobacco rod length of about 63 mm and a filter element length of about 21 mm, cross directional bands of about 6 mm width can be spaced at about 20 mm intervals on the wrapping materials used to manufacture those cigarettes. Alternatively, for those types of cigarettes, bands of about 4 mm width can be spaced at about 22 mm intervals on the wrapping materials used to manufacture those cigarettes. Alternatively, for those types of cigarettes, bands of about 6 mm width can be spaced at about 39 mm intervals. For an exemplary full flavor cigarette having a tobacco rod length of about 70 mm and a filter element length of about 30 mm, cross directional bands of about 6 mm width can be spaced at about 44 mm intervals on the wrapping materials used to manufacture those cigarettes. For an exemplary ultra low tar cigarette having a tobacco rod length of about 57 mm and a filter element length of about 27 mm, cross directional bands of about 7 mm width can be spaced at about 20 mm intervals. Alternatively, for those types of cigarettes, bands of about 6 mm width can be spaced at about 33 mm intervals, or at about 39 mm intervals, on the wrapping materials used to manufacture those cigarettes. For an exemplary ultra low tar cigarette having a tobacco rod length of about 68 mm and a filter element length of about 31 mm, cross directional bands of about 6 mm width can be spaced at about 44 mm intervals on the wrapping materials used to manufacture those cigarettes. Full flavor cigarettes are classified as those that yield about 14 mg or more of FTC "tar." Ultra low tar cigarettes are classified as those that yield less than about 7 mg of FTC "tar." Those cigarettes, have tobacco rods having appropriate wrapping materials possessing bands composed of appropriate amounts of appropriate components have the ability to meet the aforementioned cigarette extinction criteria.

Cigarettes of the present invention can be manufactured from a variety of components, and can have a wide range of formats and configurations. Typical cigarettes of the present invention having cross directional bands applied to the wrapping materials of the tobacco rods of those cigarettes have static burn rates (i.e., burn rates of those cigarettes under non-puffing conditions) of about 50 to about 60 mg tobacco rod weight per minute, in the non-banded regions of those cigarettes. Typical cigarettes of the present invention having cross directional bands applied to the wrapping materials of the tobacco rods of those cigarettes have static burn rates (i.e., burn rates of those cigarettes under non-puffing conditions) of less than about 50 mg tobacco rod weight per minute, preferably about 40 to about 45 mg tobacco rod weight per minute, in the banded regions of those cigarettes.

The tobacco materials used for the manufacture of cigarettes of the present invention can vary. Descriptions of various types of tobaccos, growing practices, harvesting practices and curing practices are set for in *Tobacco Production, Chemistry and Technology*, Davis et al. (Eds.) (1999). The tobacco normally is used in cut filler form (e.g., shreds or strands of tobacco filler cut into widths of about 1/10 inch to about 1/60 inch, preferably about 1/20 inch to about 1/35 inch, and in lengths of about 1/4 inch to about 3 inches). The amount of tobacco filler normally used within a cigarette ranges from about 0.6 g to about 1 g. The tobacco filler normally is employed so as to filler the tobacco rod at a packing density of about 100 mg/cm$^3$ to about 300 mg/cm$^3$, and often about 150 mg/cm$^3$ to about 275 mg/cm$^3$. Tobaccos can have a processed form, such as processed tobacco stems (e.g., cut-rolled or cut-puffed stems), volume expanded tobacco (e.g., puffed tobacco, such as propane expanded tobacco and dry ice expanded tobacco (DIET)), or reconstituted tobacco (e.g., reconstituted tobaccos manufactured using paper-making type or cast sheet type processes).

Typically, tobacco materials for cigarette manufacture are used in a so-called "blended" form. For example, certain popular tobacco blends, commonly referred to as "American blends," comprise mixtures of flue-cured tobacco, burley tobacco and Oriental tobacco, and in many cases, certain processed tobaccos, such as reconstituted tobacco and processed tobacco stems. The precise amount of each type of tobacco within a tobacco blend used for the manufacture of a particular cigarette brand varies from brand to brand. See, for example, *Tobacco Encyclopedia*, Voges (Ed.) p. 44-45 (1984), Browne, *The Design of Cigarettes*, 3$^{rd}$ Ed., p. 43 (1990) and *Tobacco Production, Chemistry and Technology*, Davis et al. (Eds.) p. 346 (1999). Other representative tobacco blends also are set forth in U.S. Pat. No. 4,924,888 to Perfetti et al.; U.S. Pat. No. 5,056,537 to Brown et al.; and U.S. Pat. No. 5,220,930 to Gentry; and Bombick et al., *Fund. Appl. Toxicol.*, 39, p. 11-17 (1997). See, also, PCT WO 02/37990.

If desired, in addition to the aforementioned tobacco materials, the tobacco blend of the present invention can further include other components. Other components include casing materials (e.g., sugars, glycerin, cocoa and licorice) and top dressing materials (e.g., flavoring materials, such as menthol). The selection of particular casing and top dressing components is dependent upon factors such as the sensory characteristics that are desired, and the selection of those components will be readily apparent to those skilled in the art of cigarette design and manufacture. See, Gutcho, *Tobacco Flavoring Substances and Methods*, Noyes Data Corp. (1972) and Leffingwell et al., *Tobacco Flavoring for Smoking Products* (1972).

Smoking articles also can incorporate at least one flavor component within the side seam adhesive applied to the wrapping material during the manufacture of the tobacco rods. That is, for example, various flavoring agents can be incorporated in a side seam adhesive CS-2201A available from R. J. Reynolds Tobacco Company, and applied to the seam line of the wrapping material. Those flavoring agents are employed in order to mask or ameliorate any off-taste or malodor provided to the smoke generated by smoking articles as a result of the use of the wrapping materials of the present invention, such as those wrapping materials having coating formulations incorporating certain cellulosic-based or starch-based components applied thereto. Exemplary flavors include methyl cyclopentenolone, vanillin, ethyl vanillin, 4-parahydroxyphenyl-2-butanone, gamma-undecalactone, 2-methoxy-4-vinylphenol, 2-methoxy-4-methylphenol, 5-ethyl-3-hydroxy-4-methyl-2(5H)-furanone, methyl salicylate, clary sage oil and sandalwood oil. Typically, such types of flavor components are employed in amounts of about 0.2 percent to about 6.0 percent, based on the total weight of the adhesive and flavor components.

Exemplary cigarettes, and exemplary components, parameters and specifications thereof, are described in U.S. Pat. No. 5,220,930 to Gentry; PCT WO 02/37990 and U.S. patent application Ser. No. 2002/0,166,563; which are incorporated herein by reference.

Although the present invention has been described with reference to particular embodiments, it should be recognized that these embodiments are merely illustrative of the principles of the present invention. Those of ordinary skill in the art of smoking article design and manufacture will appreciate that the various systems, equipment and methods may be constructed and implemented in other ways and embodiments. Accordingly, the description herein should not be read as limiting the present invention, as other embodiments also fall within the scope of the present invention.

What is claimed is:

1. An apparatus for making a cigarette smoking article, comprising:
    a cigarette maker having a garniture and a bobbin for paying out a strip of a paper wrapper to the garniture for wrapping about smokable material to form a cigarette rod;
    an adhesive applicator apparatus for applying bands of an adhesive to the paper wrapper, the adhesive applicator apparatus comprising a pair of counter-rotating rollers arranged between the bobbin and the garniture, one of the pair of rollers comprising a pattern roller, and the other of the pair of rollers comprising an application roller; and
    an adhesive feed shoe arranged to deposit the adhesive on the pattern roller immediately upstream of a nip between the rollers,
    wherein the pattern roller and the application roller each have a peripheral surface,
    wherein the rollers are adapted to contact the peripheral surfaces with one another for transferring the adhesive from the pattern roller to the application roller, and
    wherein the application roller and the paper wrapper are adapted to contact the peripheral surface of the application roller with the paper wrapper for applying the adhesive transferred from the pattern roller to the paper wrapper.

2. The apparatus of claim 1, further comprising a drip box enclosing a lower portion of the rollers for catching adhesive from the rollers.

3. The apparatus of claim 1, further comprising a means for engaging the peripheral surfaces of the rollers.

4. The apparatus of claim 1, wherein the application roller is positioned to bear against the paper wrapper to transfer the adhesive to the wrapper.

5. The apparatus of claim 1, wherein the pattern roller further comprises a plurality of transverse grooves spaced circumferentially about the peripheral surface of the pattern roller.

6. The apparatus of claim 5, wherein each groove is adapted to contain a predetermined amount of the adhesive.

7. The apparatus of claim 1, wherein the bands comprise a longitudinally spaced, cross-directional pattern, the bands having a predetermined width and spacing.

8. The apparatus of claim 1, further comprising a dryer arranged between the adhesive applicator apparatus and the garniture for drying the adhesive applied to the paper.

9. The apparatus of claim 8, wherein the dryer comprises an infrared dryer.

10. The apparatus of claim 1, further comprising a heater arranged between the bobbin and the adhesive applicator apparatus for preheating the paper wrapper.

11. The apparatus of claim 10, wherein the heater comprises an infrared heater.

12. The apparatus of claim 1, the paper wrapper having an inside surface and an outside surface, wherein the adhesive applicator apparatus is arranged to apply the bands of adhesive to the inside surface of the paper wrapper.

13. The apparatus of claim 1, the paper wrapper having an inside surface and an outside surface, wherein the adhesive applicator apparatus is arranged to apply the bands of adhesive to the outside surface of the paper wrapper.

14. An apparatus for making a cigarette smoking article, comprising:
a cigarette maker having a garniture and a bobbin for paying out a strip of a paper wrapper to the garniture for wrapping about a rod of smokable material to form a cigarette rod; and
an adhesive applicator apparatus arranged between the bobbin and the garniture for applying bands of an adhesive to the paper wrapper, the adhesive applicator apparatus further comprising
(a) a pattern roller having a peripheral surface with a plurality of transverse grooves spaced circumferentially about the peripheral surface of the pattern roller, each groove adapted to contain a predetermined amount of the adhesive,
(b) an application roller having a peripheral surface,
(c) an adhesive feed shoe arranged to deposit the adhesive on the pattern roller immediately upstream of a nip between the rollers,
(d) the rollers being adapted to contact the peripheral surfaces with one another for transferring the adhesive from the pattern roller to the application roller, and
(e) the application roller and the paper wrapper being adapted to contact the peripheral surface of the application roller with the paper wrapper for applying the adhesive transferred from the pattern roller to the paper wrapper,
wherein the bands comprise a predetermined width and spacing and a longitudinally spaced, cross-directional pattern.

15. An apparatus for applying bands of an adhesive to a paper wrapper in a cigarette maker having a garniture and a bobbin for paying out a strip of the paper wrapper to the garniture for wrapping about smokable material to form a cigarette rod, the apparatus comprising:
a pair of counter-rotating rollers arranged between the bobbin and the garniture, one of the pair of rollers comprising a pattern roller, and the other of the pair of rollers comprising an application roller; and
an adhesive feed shoe arranged to deposit the adhesive on the pattern roller immediately upstream of a nip between the rollers,
wherein the pattern roller and the application roller each have a peripheral surface,
wherein the rollers are adapted to contact the peripheral surfaces with one another for transferring the adhesive from the pattern roller to the application roller, and
wherein the application roller and the paper wrapper are adapted to contact the peripheral surface of the application roller with the paper wrapper for applying the adhesive transferred from the pattern roller to the paper wrapper.

16. The apparatus of claim 15, further comprising a means for engaging the peripheral surfaces of the rollers.

17. The apparatus of claim 15, wherein the application roller is positioned to bear against the paper wrapper to transfer the adhesive to the wrapper.

18. The apparatus of claim 15, wherein the pattern roller further comprises a plurality of transverse grooves spaced circumferentially about the peripheral surface of the pattern roller.

19. The apparatus of claim 18, wherein each groove is adapted to contain a predetermined amount of the adhesive.

20. The apparatus of claim 15, wherein the bands comprise a longitudinally spaced, cross-directional pattern, the bands having a predetermined width and spacing.

21. An apparatus for applying bands of an additive material to a strip of a paper wrapper within a cigarette maker having a garniture and a bobbin for paying out the strip of a paper wrapper to the garniture for wrapping about smokable material to form a cigarette rod, the apparatus comprising:
a pair of counter-rotating rollers arranged between the bobbin and the garniture, one of the pair of rollers comprising a transfer roller having a peripheral surface and the other of the pair of rollers comprising an application roller having a peripheral surface;
a means for supplying the additive material to a portion of the peripheral surface of the transfer roller immediately upstream of a nip between the rollers;
a means for transferring the additive material from the peripheral surface of the transfer roller to predetermined locations on the peripheral surface of the application roller by contacting the peripheral surfaces of the transfer roller and the application roller; and
a means for transferring the additive material from the predetermined locations on the peripheral surface of the application roller to predetermined locations on the paper wrapper strip by contacting the peripheral surface of the application roller with the paper wrapper.

* * * * *